(12) United States Patent
Ebrahimi Afrouzi et al.

(10) Patent No.: US 12,312,018 B1
(45) Date of Patent: *May 27, 2025

(54) AUTONOMOUS VERSATILE VEHICLE SYSTEM

(71) Applicants: Ali Ebrahimi Afrouzi, Henderson, NV (US); Lukas Robinson, York (CA); Shahin Fathi Djalali, San Leandro, CA (US)

(72) Inventors: Ali Ebrahimi Afrouzi, Henderson, NV (US); Lukas Robinson, York (CA); Shahin Fathi Djalali, San Leandro, CA (US)

(73) Assignee: AI Incorporated, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/197,544

(22) Filed: May 15, 2023

Related U.S. Application Data

(63) Continuation of application No. 17/827,927, filed on May 30, 2022, now Pat. No. 11,685,449, which is a continuation of application No. 17/369,811, filed on Jul. 7, 2021, now Pat. No. 11,772,717, which is a continuation of application No. 16/230,805, filed on Dec. 21, 2018, now Pat. No. 11,091,211.

(60) Provisional application No. 62/748,921, filed on Oct. 22, 2018, provisional application No. 62/748,513, filed on Oct. 21, 2018, provisional application No.
(Continued)

(51) Int. Cl.
*B62D 33/063* (2006.01)
*B60W 60/00* (2020.01)
*G05D 1/2285* (2024.01)
*G05D 1/648* (2024.01)
*G05D 1/69* (2024.01)

(52) U.S. Cl.
CPC ..... *B62D 33/0636* (2013.01); *B60W 60/0025* (2020.02); *G05D 1/2285* (2024.01); *G05D 1/648* (2024.01); *G05D 1/69* (2024.01); *B60W 2300/34* (2013.01); *B60W 2556/65* (2020.02)

(58) Field of Classification Search
CPC .......... B62D 33/0636; B60W 60/0025; B60W 2300/34; B60W 2556/65; G05D 1/0027; G05D 1/0088; G05D 1/0287
See application file for complete search history.

(56) References Cited

U.S. PATENT DOCUMENTS 4,307,891 A * 12/1981 Doornick ................ G09F 19/08
901/14
5,170,352 A * 12/1992 McTamaney ........ G05D 1/0246
318/587
(Continued)

*Primary Examiner* — Michael J Zanelli

(57) ABSTRACT

Provided is a system for robotic collaboration, including a first robotic chassis including a memory storing instructions that when executed a processor effectuates operations including capturing data of an environment and data indicative of movement, generating a first map of the environment based on the captured data, and the robot executing a first part of a task. The system also includes a second robot including a memory storing instructions that when executed by a processor effectuates operations including capturing data of an environment and the second robot executing a second part of the task after the first robot completes the first part of the task, the completion of the first part of the task being indicated by a signal received with the processor of the second robot.

29 Claims, 31 Drawing Sheets

Related U.S. Application Data

62/731,740, filed on Sep. 14, 2018, provisional application No. 62/703,754, filed on Jul. 26, 2018, provisional application No. 62/661,926, filed on Apr. 24, 2018, provisional application No. 62/643,523, filed on Mar. 15, 2018, provisional application No. 62/617,734, filed on Jan. 16, 2018, provisional application No. 62/615,697, filed on Jan. 10, 2018, provisional application No. 62/614,104, filed on Jan. 5, 2018, provisional application No. 62/613,061, filed on Jan. 3, 2018, provisional application No. 62/610,140, filed on Dec. 22, 2017.

(56) References Cited

U.S. PATENT DOCUMENTS

| | | | | |
|---|---|---|---|---|
| 5,229,941 A * | 7/1993 | Hattori | | G05D 1/0217 701/28 |
| 6,151,539 A * | 11/2000 | Bergholz | | G01S 15/931 701/472 |
| 6,431,078 B2 * | 8/2002 | Serrano | | B61B 13/00 104/106 |
| 6,836,701 B2 * | 12/2004 | McKee | | G05D 1/0297 701/25 |
| 8,073,564 B2 * | 12/2011 | Bruemmer | | G05D 1/0027 700/245 |
| 8,352,112 B2 * | 1/2013 | Mudalige | | G08G 1/22 342/458 |
| 8,430,192 B2 * | 4/2013 | Gillett | | B60N 2/14 180/2.2 |
| 9,552,564 B1 * | 1/2017 | Martenis | | G07C 9/00571 |
| 9,681,046 B2 * | 6/2017 | Adsumilli | | H04N 23/611 |
| 9,821,455 B1 * | 11/2017 | Bareddy | | G06Q 10/06 |
| 2008/0007203 A1 * | 1/2008 | Cohen | | A47L 9/2805 320/104 |
| 2012/0323431 A1 * | 12/2012 | Wong | | G05D 1/0297 701/25 |
| 2014/0254896 A1 * | 9/2014 | Zhou | | G06Q 20/3829 705/16 |
| 2015/0149022 A1 * | 5/2015 | Harvey | | G05D 1/0297 701/23 |
| 2015/0279210 A1 * | 10/2015 | Zafiroglu | | G08G 1/143 340/932.2 |
| 2015/0338852 A1 * | 11/2015 | Ramanujam | | B60K 35/00 701/2 |
| 2015/0346727 A1 * | 12/2015 | Ramanujam | | B62D 15/0285 701/23 |
| 2016/0129592 A1 * | 5/2016 | Saboo | | B25J 5/007 700/248 |
| 2018/0001476 A1 * | 1/2018 | Tan | | B61G 7/04 |
| 2018/0073265 A1 * | 3/2018 | Goldenberg | | G05D 1/0219 |
| 2018/0232839 A1 * | 8/2018 | Heinla | | G05D 1/0282 |
| 2018/0253107 A1 * | 9/2018 | Heinla | | G06T 7/73 |
| 2018/0311815 A1 * | 11/2018 | Shaw | | B25J 9/1671 |
| 2018/0361586 A1 * | 12/2018 | Tan | | B61J 99/00 |
| 2019/0034858 A1 * | 1/2019 | Ferguson | | G06Q 20/127 |
| 2019/0212752 A1 * | 7/2019 | Fong | | G05D 1/0274 |
| 2019/0217474 A1 * | 7/2019 | Tang | | B25J 11/0085 |
| 2019/0310655 A1 * | 10/2019 | Voorhies | | G05D 1/0287 |
| 2022/0036310 A1 * | 2/2022 | Heinla | | G06Q 10/08 |

* cited by examiner

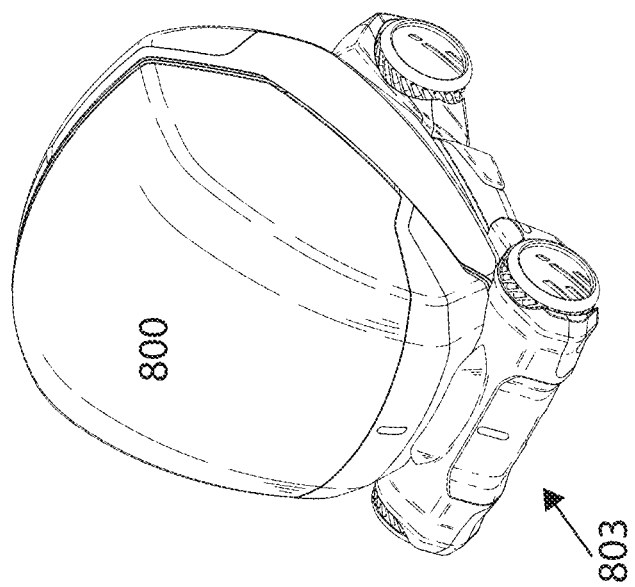

AUTONOMOUS VERSATILE VEHICLE SYSTEM

CROSS-REFERENCE TO RELATED APPLICATIONS

This application is a Continuation of U.S. Non-Provisional patent application Ser. No. 17/827,927, filed May 30, 2022, which is a Continuation of U.S. Non-Provisional patent application Ser. No. 17/369,811, filed Jul. 7, 2021, which is a Continuation of U.S. Non-Provisional patent application Ser. No. 16/230,805, filed Dec. 21, 2018, which claims the benefit of U.S. Provisional Patent Application Nos. 62/610,140, filed Dec. 22, 2017, 62/615,697, filed Jan. 10, 2018, 62/731,740, filed Sep. 14, 2018, 62/748,921, filed Oct. 22, 2018, 62/613,061, filed Jan. 3, 2018, 62/614,104, filed Jan. 5, 2018, 62/617,734, filed Jan. 16, 2018, 62/748,513, filed Oct. 21, 2018, 62/643,523, filed Mar. 15, 2018, 62/661,926, filed Apr. 24, 2018, and 62/703,754, filed Jul. 26, 2018, each of which is hereby incorporated by reference.

In this patent, certain U.S. patents, U.S. patent applications, or other materials (e.g., articles) have been incorporated by reference. Specifically, U.S. patent application Ser. Nos. 15/272,752, 15/949,708, 16/048,179, 16/048,185, 16/163,541, 16/163,562, 16/163,508, 16/185,000, 62/681,965, 62/614,449, 16/109,617, 16/051,328, 15/449,660, 16/041,286, 15/406,890, 14/673,633, 16/163,530, 62/746,688, 62/740,573, 62/740,580, 15/955,480, 15/425,130, 15/955,344, 15/048,827, 15/981,643, 15/986,670, 62/664,389, 15/447,450, 15/447,623, 62/665,942, 62/617,589, 62/620,352, 15/951,096, 16/130,880, 14/948,620, 62/626,867, 62/616,326, and 16/127,038 are hereby incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

FIELD

This disclosure relates to autonomous vehicle systems.

BACKGROUND

Autonomous mobile robotic devices are increasingly used to automate tasks within environments. However, autonomous robotic devices are often built to serve only a particular type of function and to execute their function individually. A versatile autonomous robotic device that can be customized based on its intended function can be advantageous. Further, an autonomous mobile robotic device that can collaboratively execute functions with other autonomous mobile robotic devices can be advantageous, particularly as the number of autonomous robotic devices used within society increases.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Some aspects provide a system for robotic collaboration, including: a first robot including: a chassis; a set of wheels; a power supply; at least one sensor; a processor; and memory storing instructions that when executed by the processor of the first robot effectuates operations including: capturing, with the at least one sensor of the first robot, data of an environment of the first robot; generating or updating, with the processor of the first robot, a first map of the environment based on at least a portion of the captured data; and executing, with the first robot, a first part of a task; and a second robot including: a chassis; a set of wheels; a power supply; at least one sensor; a processor; and a memory storing instructions that when executed by the processor of the second robot effectuates operations including: capturing, with the at least one sensor of the second robot, data of an environment of the second robot; and executing, with the second robot, a second part of the task after the first robot completes the first part of the task, the completion of the first part of the task being indicated by a signal received with the processor of the second robot; and wherein: an application of a communication device is paired with the first robot and the second robot; the application of the communication device is configured to: display at least a battery level of the first robot and the second robot, the first map generated by the processor of the first robot, and obstacle data; and receive at least one input designating an instruction for the first robot or the second robot to navigate to a particular area to perform work; and the first robot and the second robot provide different services.

Some aspects include a method for collaboration between a first robot and a second robot, including: capturing, with at least one sensor of the first robot, data of an environment; generating or updating, with a processor of the first robot, a first map of the environment based on at least a portion of the captured data; executing, with the first robot, a first part of a task; capturing, with at least one sensor of the second robot, data of the environment; executing, with the second robot, a second part of the task after the first robot completes the first part of the task, the completion of the first part of the task being indicated by a signal received with the processor of the second robot; displaying, with an application of a communication device paired with the first robot and the second robot, at least a battery level of the first robot and the second robot, the first map, and obstacle data; and receiving, with the application, at least one input designating an instruction for the first robot or the second robot to navigate to a particular area to perform work; wherein the first robot and the second robot provide differing services.

Some aspects provide a memory storing instructions that when executed by a processor of a first robot effectuates operations including: capturing, with at least one sensor of the first robot, data of an environment of the first robot; generating or updating, with the processor of the first robot, a first map of the environment based on at least a portion of the captured data; and executing, with the first robot, a first part of a task; wherein: a second robot executes a second part of the task after the first robot completes the first part of the task, the completion of the first part of the task being indicated by a signal received with a processor of the second robot; an application of a communication device is paired with the first robot and the second robot; the application of the communication device is configured to: display at least a battery level of the first robot and the second robot, the first map generated by the processor of the first robot, and obstacle data; and receive at least one input designating an instruction for the first robot or the second robot to navigate to a particular area to perform work; and the first robot and the second robot provide different services.

BRIEF DESCRIPTION OF DRAWINGS

FIGS. 8A-8G illustrate an example of a sequence of steps for loading a pod onto a mobile robotic chassis according to some embodiments.

DETAILED DESCRIPTION OF SOME EMBODIMENTS

Figure 1:
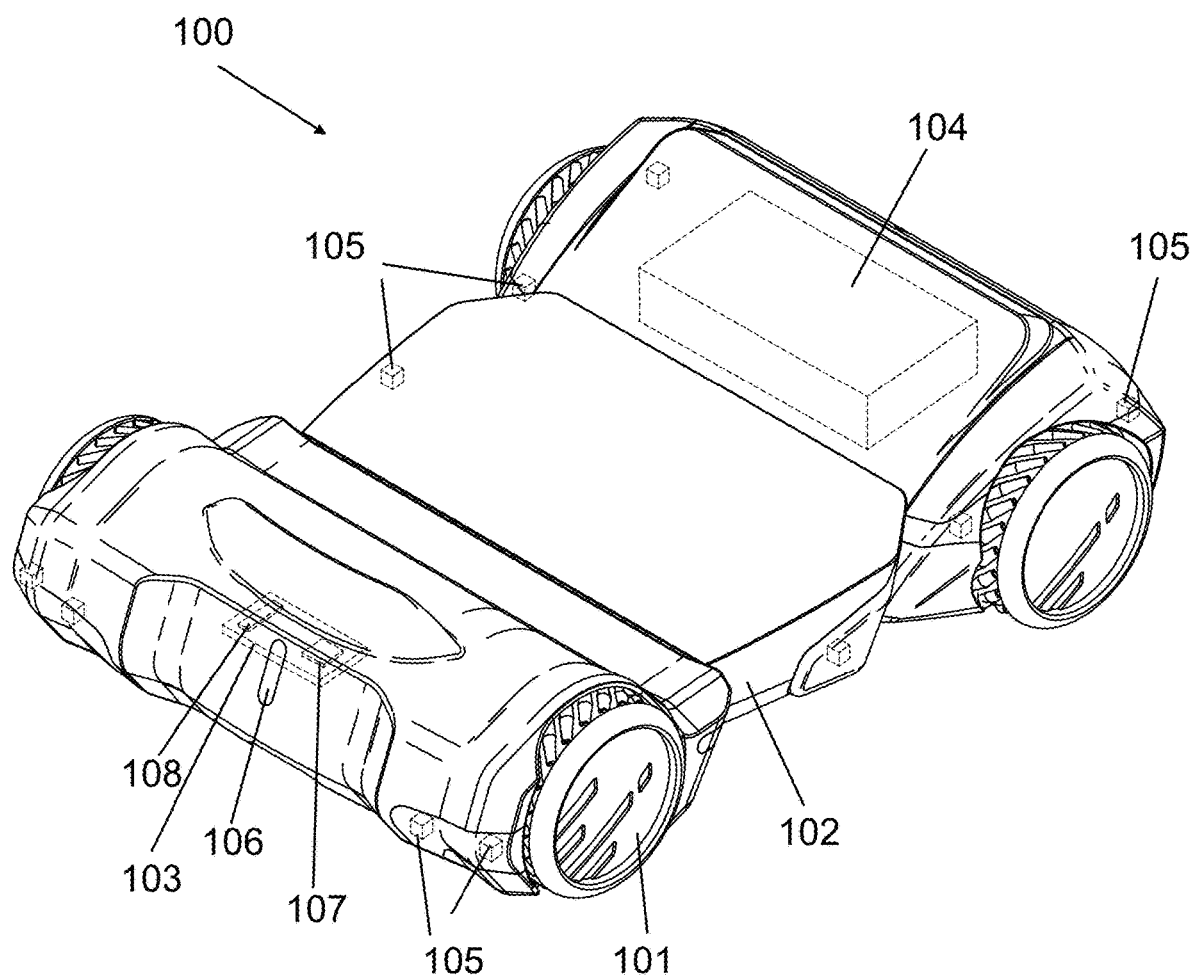
FIG. 1 illustrates an example of a versatile mobile robotic chassis customized with a platform for carrying items according to some embodiments.

The present techniques will now be described in detail with reference to a few embodiments thereof as illustrated in the accompanying drawings. In the following description, numerous specific details are set forth in order to provide a thorough understanding of the present inventions. It will be apparent, however, to one skilled in the art, that the present techniques may be practiced without some or all of these specific details. In other instances, well known process steps and/or structures have not been described in detail in order to not unnecessarily obscure the present inventions. Further, it should be emphasized that several inventive techniques are described, and embodiments are not limited to systems implementing all of those techniques, as various cost and engineering tradeoffs may warrant systems that only afford a subset of the benefits described herein or that will be apparent to one of ordinary skill in the art.

Some embodiments provide one or more autonomous versatile mobile robotic chassis that can be customized to provide a variety of different functions. For example, a mobile robotic chassis can be customized to include a platform for transporting items, a loading and unloading mechanism for transporting passenger pods, a cleaning tool for cleaning a surface (e.g., a vacuuming tool for vacuuming a surface or a mopping tool for mopping a surface), a shovel for plowing, a wheel lift for towing vehicles, robotic arms for garbage pickup, and a forklift for lifting vehicles. In some embodiments, a mobile robotic chassis includes, but is not limited to, wheels, motors, a power source, internal and external sensors, one or more processors, one or more controllers, a mapping module, a localization module, and a path planning module. In some embodiments, the wheels are mecanum wheels and allow movement in any direction. Examples of mecanum wheels are described in U.S. patent application Ser. Nos. 62/664,389, 15/447,450, and Ser. No. 15/447,623, the entire contents of which are hereby incorporated by reference. In some embodiments, the one or more processors include the mapping, localization, and path planning modules. In some embodiments, sensors include, but are not limited to, sonar sensors, light detection and ranging (LIDAR) sensors, laser detection and ranging (LADAR) sensors, cameras, stereo and structured light sensors, odometry sensors, inertial measurement units (IIU), global positioning systems (GPS), structure from motion sensors and gyroscopes. In some embodiments, the mobile robotic chassis further includes a suspension system such as those described in U.S. patent application Ser. Nos. 62/665,942, 62/617,589, 62/620,352, and Ser. No. 15/951,096, the entire contents of which are hereby incorporated by reference. In some embodiments, the mobile robotic chassis further includes one or more electrical ports (e.g., electrical socket, mobile device charging port, home assistant charging port, etc.) that are supplied electricity using a separate or the same rechargeable battery as the main rechargeable battery of the mobile robotic chassis or solar energy.

In some embodiments, the mapping module or the one or more processors create a map of the environment using methods similar to those described in U.S. patent application Ser. Nos. 16/048,179, 16/048,185, 16/163,541, 16/163,562, 16/163,508, 16/185,000, 62/681,965, and 62/614,449, the entire contents of which are hereby incorporated by reference. For example, in some embodiments a camera, installed on a robotic device with at least one processor, for example, perceives depths from the camera to objects within a first field of view, e.g., such that a depth is perceived at each specified increment. The robot and attached camera may rotate to observe a second field of view partly overlapping the first field of view. The processor may compare the depths for the second field of view to those of the first field of view. An area of overlap may be identified when a number of consecutive depths from the first and second fields of view are similar. For example, similarities in the value of depths from the first and second fields of view can be identified when the values of the depths are within a tolerance range of one another or by recognizing matching patterns among the depths from the first and second fields of view, such as a pattern of increasing and decreasing values. Once an area of overlap is identified, in some embodiments, the processor uses it as an attachment point between the two sets of depths perceived and the two fields of view are attached to form a larger field of view. This method may be repeated such that the camera perceives depths within consecutively overlapping fields of view as it moves, and the processor identifies the area of overlap and combines overlapping depths to construct a map of the environment. In some instances, the two sets of depths perceived using cameras installed on different robots or two maps generated by processors of different robots are combined similarly, using overlapping areas as attachment points. In some embodiments, the localization module or the one or more processors localize the mobile robotic chassis using methods similar to those described in U.S. patent application Ser. Nos. 62/746,688, 62/740,573, 62/740,580, 15/955,480, 15/425,130, and Ser. No. 15/955,344 the entire contents of which are hereby incorporated by reference. In some embodiments, the path planning module or the one or more processors determine a route of the mobile robotic chassis using methods similar to those described in U.S. patent application Ser. Nos. 16/041,286, 15/406,890, and Ser. No. 14/673,633, the entire contents of which are hereby incorporated by reference. For example, some embodiments dynamically adjust a coverage pattern within regions based on sensed attributes of the environment. For instance, any movement path may be devised with path elements, such as vertices, edges, and their associated properties. For example, a boustrophedon movement path, characterized by back and forth movement, may be considered equivalent to a set of vertices linked by edges, the vertices having properties defining position and angular orientation of linked vertices and the edges having properties defining edge type, such as a line, with given length, angular orientation and connecting vertices. In this way, the number and properties of vertices and edges may be chosen such that the route plan is adapted to the real-time working environment.

In some embodiments, the mobile robotic chassis further includes an operating system and an operating system interface. In some embodiments, the operating system interface is displayed on a touch screen of the robotic chassis. In some embodiments, different types of hardware can be installed and detected by the operating system such that the versatile mobile robotic chassis can be customized based on the function of the chassis. In some embodiments, wherein the installed hardware is not detected by the operating system, the operating system interface displays a message to a user requesting the driver file of the hardware. In some embodiments, the versatile mobile robotic chassis includes expansion slots for different types of hardware, such as imaging sensors, movement sensors, RAM, hard drives, controllers, etc., such that different types of hardware can be added and removed as needed. For example, a mobile robotic chassis customized with a platform and carrying case for delivering food is equipped with high-resolution sensors and additional RAM since the processor must recognize and respond to street signs (e.g., speed limits, stop signs and stop lights) and environmental conditions (e.g., speed bumps or potholes) while travelling at a relatively quick speed. In another example, a mobile robotic chassis customized with a platform transports a trash can from a back of a house to a front of the house for pickup. In this instance, the mobile robotic chassis is only equipped with low-resolution sensors as high-speed travel is not required and navigation is limited to moving from the back to the front of the house. In a further example, a mobile robotic chassis customized with a loading and unloading mechanism capable of loading a pod transports persons in a pod from a home environment to an office. Since the functionality involves transportation of humans, the robotic chassis is equipped with high resolution sensors to provide the highest safety standards. In some embodiments, hardware is installed on an as need basis depending on, for example, the transported item, the payload, and the function of the versatile mobile robotic chassis. In some embodiments, the hardware and operating system of the versatile mobile robotic chassis are calibrated or recalibrated for their intended function. For example, if a mobile robotic chassis was not initially calibrated for transportation of shipping containers from a shipyard to a train yard, new hardware (e.g., cameras, sensors, memory, processors, hard drives, etc.) and mechanical structures (e.g., tow bar, extended platform, etc.) required in transporting shipping containers are added. In some embodiments, additional software is used to meet functionality requirements of the versatile mobile robotic chassis.

In some embodiments, a mobile robotic chassis recharges its batteries at a charging station. In some embodiments, a mobile robotic chassis is partially or fully powered using solar energy and/or fuel. In some embodiments, a mobile robotic chassis recharges or refuels when the power remaining is below a predetermined threshold. In some embodiments, the mobile robotic chasses recharges or refuels at the nearest located recharging or refueling station.

In some embodiments, a processor of a mobile robotic chassis performs a self-test (e.g., using installed software). In some embodiments, the processor instructs the mobile robotic chassis to navigate to a repair station if damage is detected. In some embodiments, a processor of a mobile robotic chassis instructs the robotic chassis to navigate to a repair station after a predetermined amount of time, a predetermined amount of run time, a predetermined mileage, or based on another metric. In some embodiments, a robotic chassis autonomously navigates to a charging station when battery charge reaches below a predetermined level.

In some embodiments, the versatile robotic chassis is customized based on, for example, the transported item, payload or the intended functionality of the mobile robotic chassis. For example, a mobile robotic chassis can be customized to further include a platform of particular size for transporting items, a loading and unloading mechanism that allows for transportation of passenger pods, a shovel for plowing, a wheel lift for towing vehicles, robotic arms for garbage pickup, and a forklift for lifting vehicles. In some embodiments, the mobile robotic chassis is customized to include clasps, magnets, straps, cords or other securing mechanisms to secure items to the robotic chassis.

FIG. 1 illustrates an example of versatile mobile robotic chassis 100, which may be of various shapes or sizes, with wheels 101 customized with platform 102 for transporting items such as, food, bicycles, groceries, delivery packages, building supplies, warehouse stock boxes, luggage, and the like. In some embodiments, the mobile robotic chassis is customized to include clasps, magnets, straps, cords, bolts and screws, pins, or other securing mechanisms to secure items to the robotic chassis. The versatile mobile robotic chassis 100 includes a control system 103, a power supply 104, sensors 105 including camera 106, a processor 107, a tangible, non-transitory, machine readable medium 108, and a microphone 109.

Figure 2:
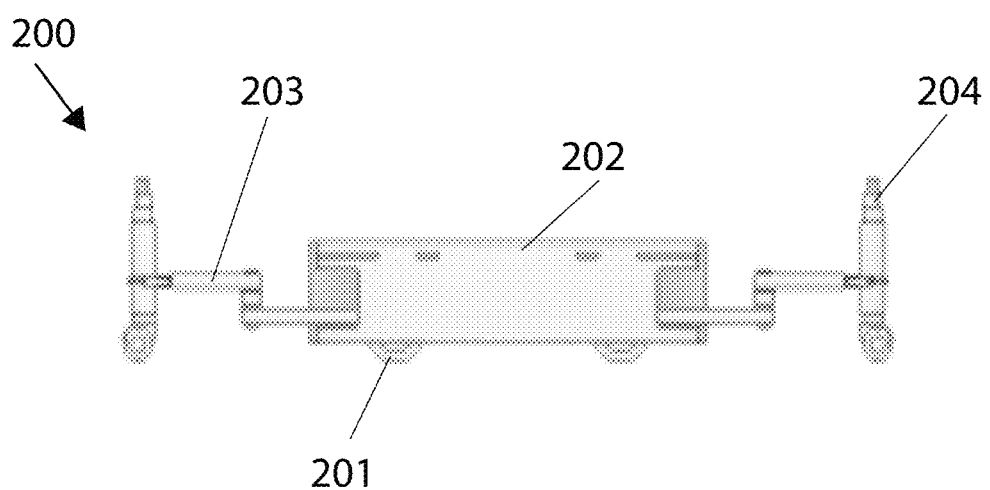
FIG. 2 illustrates an example of a versatile mobile robotic chassis customized with retractable pins and arms for towing vehicles according to some embodiments.

FIG. 2 illustrates an example of versatile mobile robotic chassis 200 with wheels 201 customized with cover 202, and retractable robotic arms 203 with hydraulic lifts 204 for towing a vehicle. Other components may be added to the chassis.

Figure 3:
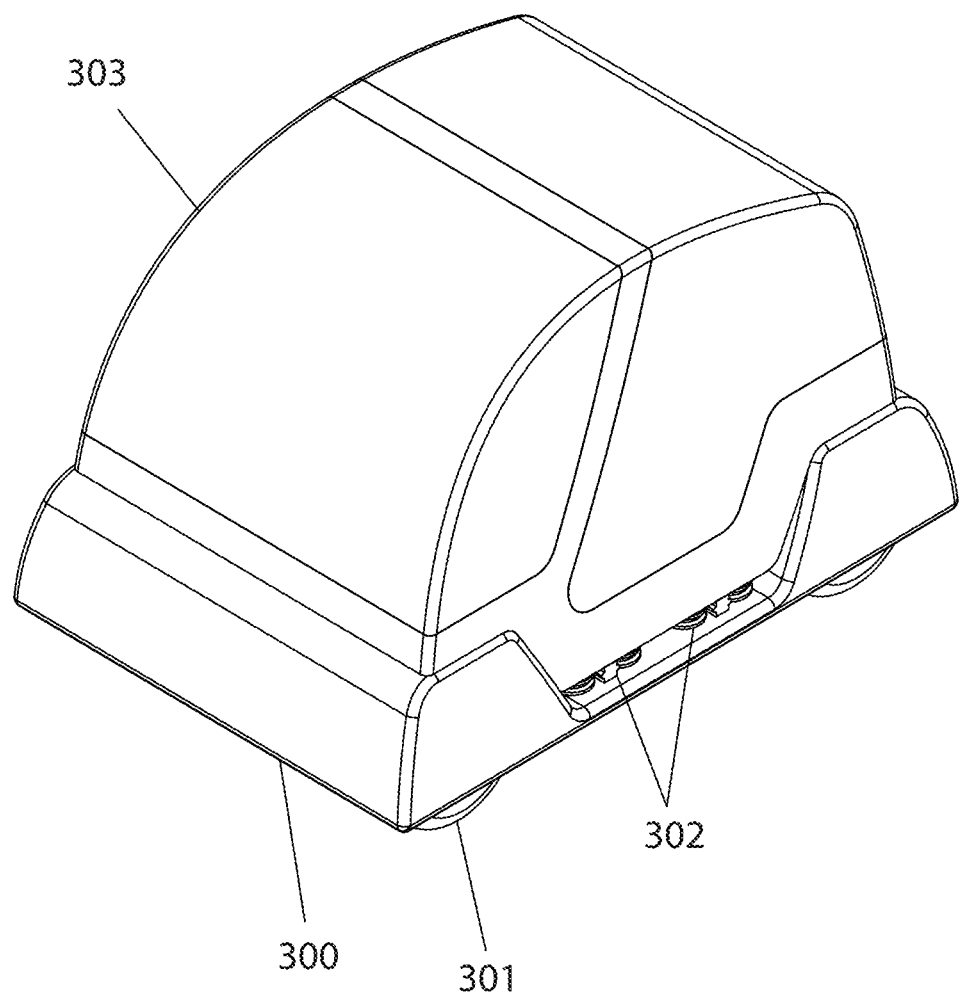
FIG. 3 illustrates an example of a versatile mobile robotic platform customized with a pod loading and unloading mechanism and a pod loaded in the mobile robotic chassis according to some embodiments.

FIG. 3 illustrates an example of versatile mobile robotic chassis 300 with wheels 301 customized with loading and unloading mechanism 302 for pod 303, which may be of various shapes or sizes and within which products, items, animals, and/or persons may be transported.

In some embodiments, the mechanism for loading and unloading a pod to and from a mobile robotic chassis includes: a mobile robotic chassis with a front, rear and middle part wherein the middle part includes one or more pins on a front, back and top side, and wherein the front and rear part include a pair of wheels and one or more rails into which the one or more pins from the front and back side of the middle part fit; a pod including one or more rails on a bottom side; a transfer part including one or more pins on a front, back and top side, the one or more pins of the top side fitting into the one or more rails of the pod; a pod station with one or more rails into which the one or more pins on the front and back side of the transfer part fit. In some embodiments, the transfer part and the middle part of the mobile robotic chassis are exactly the same part and hence the distance between the rails on the front and rear parts of the mobile robotic chassis and the distance between the rails of the pod station are equal. In some embodiments, the front and rear parts of the mobile robotic chassis are configured such that two middle parts are slidingly coupled to the front and rear parts. In some embodiments, the pod is configured such that two middle parts are slidingly coupled to the bottom of the pod.

In some embodiments, a pod is slidingly coupled with a transfer part wherein one or more pins on a top side of the transfer part fit into one or more rails on a bottom side of the pod. In some embodiments, the transfer part is locked into place, such as in the center of the pod, such that it may not slide along the rails on the bottom side of the pod. In some embodiments, a locking mechanism includes locking pins driven by a motor connected to a gear box wherein locking pins are extended on either side of top pins of the transfer part. For example, the locking pins mechanism is implemented into the rails of the pod such that the locking pins extend through holes in the rails of the pod on either side of top pins of the transfer part to lock the transfer part in place relative to the pod. In some embodiments, the transfer part with coupled pod is slidingly coupled to a pod station wherein one or more pins on a front and back side of the transfer part fit into one or more rails of the pod station. In some embodiments, the transfer part is locked into place, such as in the center of the pod station, such that it may not slide along the rails of the pod station. In some embodiments, a locking mechanism includes locking pins driven by a motor connected to a gear box wherein locking pins are extended on either side of front and back pins of the transfer part. For example, the locking pins mechanism is implemented into the rails of the pod station such that locking pins extend through holes in the rails on either side of the front and back pins of the transfer part to lock the transfer part in place relative to the pod station. In some embodiments, the pod is located at a pod station when the pod is not required. In some embodiments, wherein the pod is required, the pod is loaded onto a mobile robotic chassis. In some embodiments, the mobile chassis includes a front and rear part with driving wheels and one or more rails, and a middle part with one or more pins on a front, back, and top side. The middle part is slidingly coupled with the front and rear parts wherein one or more pins of the front and back side fit into one or more rails of the front and rear part. In some embodiments, the mobile robotic chassis aligns itself adjacent to a pod station such that the pod can be loaded onto the mobile chassis when, for example, the pod is required for transportation of items and/or passengers. In some embodiments, the mobile robotic chassis is aligned with the pod station when the middle part of the mobile robotic chassis and the transfer part, and hence the rails of the mobile robotic chassis and pod station, are aligned with one another. In some embodiments, prior to loading the pod the middle part of the mobile robotic chassis is positioned towards the side of the mobile robotic chassis furthest away from the pod station. In some embodiments, the middle part is locked in place using similar mechanisms as described above. In some embodiments, the transfer part with locked-in pod slides along the rails of the pod station towards the mobile robotic chassis, and with the rails of the mobile robotic chassis aligned with those of the pod station, the pins of the transfer part with attached pod fit directly into the rails of front and rear parts of the mobile robotic chassis. In some embodiments, the pins on the front and back side of the transfer part retract when transferring from the pod station to the mobile robotic chassis and extend into the rails of the front and rear of the mobile robotic chassis once transferred to the mobile robotic chassis. In some embodiments, the pins on the top side of the middle part retract when transferring the pod from the pod station to the mobile robotic chassis and extend into the rails of the bottom of the pod once transferred to the mobile robotic chassis. In some embodiments, the middle part of the mobile robotic chassis and the transfer part are locked into place using similar mechanisms as described above. After the transfer is complete, the pod slides to either side such that it is aligned with the robotic chassis and is locked in place. In some embodiments, different locking mechanisms, such as those described above, are used to unlock/lock components that are slidingly coupled to one another such that components can freely slide relative to one another when unlocked and remain in place when locked.

In some embodiments, the pod is unloaded from the mobile robotic chassis when no longer required for use. In some embodiments, the mobile robotic chassis aligns itself adjacent to a pod station such that the pod can be loaded onto the pod station. In some embodiments, the pod slides towards the transfer part such that is it centrally aligned with the transfer part and is locked in place. The transfer part with pod slides along the rails of the mobile robotic chassis towards the pod station, and with the rails of the mobile robotic chassis aligned with those of the pod station, the pins of the transfer part with attached pod fit directly into the rails of the pod station. In some embodiments, the pins on the front and back side of the transfer part retract when transferring from the mobile robotic chassis to the pod station and extend into the rails of the front and rear of the pod station once transferred to the pod station. In some embodiments, the pins on the top side of the middle part retract when transferring the pod from the mobile robotic chassis to the pod station. In some embodiments, the transfer part is locked in place once the transfer is complete. In some embodiments, sets of rollers operated by one or more motors are used to force components to slide in either direction.

In some embodiments, pods and pod stations are located at homes of users or in public areas. In some embodiments, after unloading a pod at a pod station the mobile robotic chassis navigates to the closest or a designated mobile robotic chassis parking area or storage area.

Figure 4A:
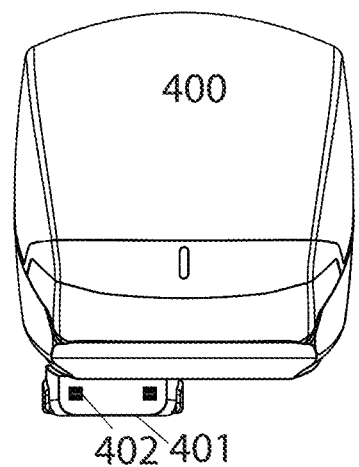
FIGS. 4A-4C illustrate an example of a pod and transfer part of a pod loading and unloading mechanism according to some embodiments.
Figure 4B:
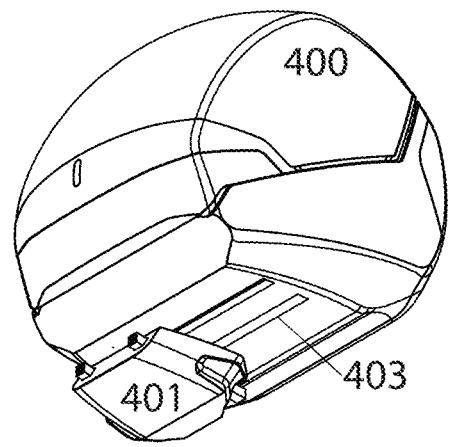
Figure 4C:
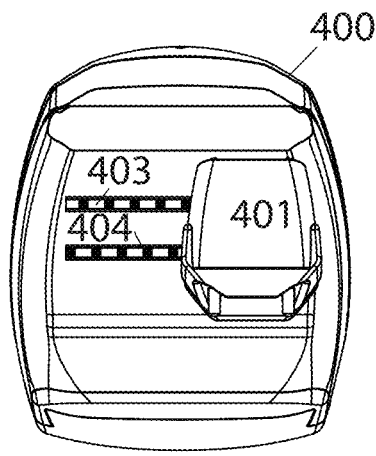

FIG. 4A illustrates an example of a front view of a pod 400 with transfer part 401. Transfer part 401 includes front pins 402, back pins (not shown) and top pins (not shown). FIG. 4B illustrates a perspective view of pod 400 with rails 403 on the bottom side of pod 400. Top pins of transfer part 401 fit within rails 403 such that transfer part 401 slides back and forth along rails 403. FIG. 4C illustrates a bottom view of pod 400 with rails 403 and rollers 404. Top pins of transfer part 401 fit into rails 403 such that transfer part 401 slides along rails 403. In some cases, rollers 404 are operated by a motor and when operated cause transfer part 401 to slide along rails 403. In some embodiments, the rollers in the rails of the pod have gear teeth and the top side of the top pins of the transfer part have gear grooves, such that the gear teeth of the rollers fit into the gear grooves of the top side of the top pins and when operated cause linear movement of the transfer part.

Figure 5A:
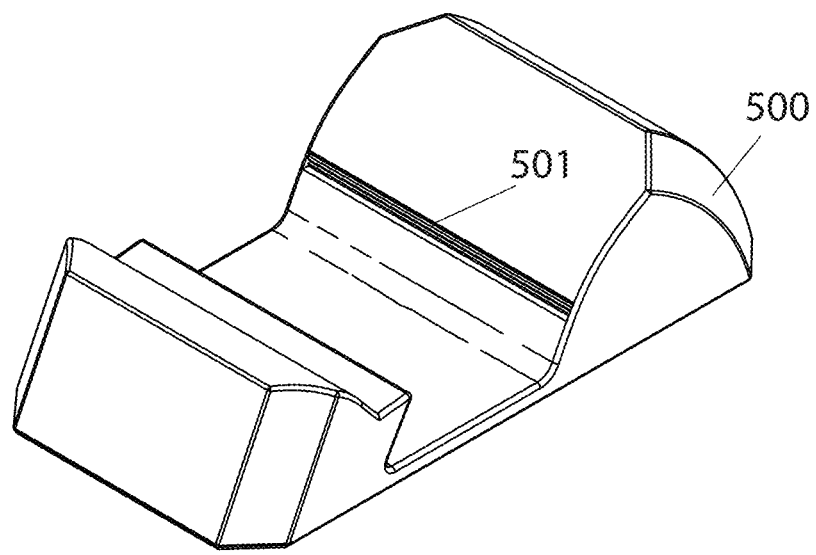
FIGS. 5A and 5B illustrate an example of a pod station with and without a docked pod and transfer part of a pod loading and unloading mechanism, respectively, according to some embodiments.
Figure 5B:
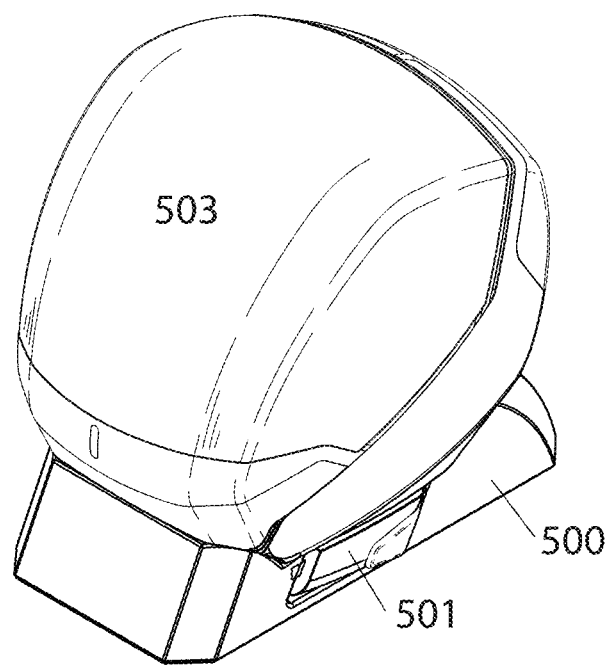

FIG. 5A illustrates an example of a pod station 500 with back rails 501 and front rails (not shown) within which back and front pins of a transfer part fit within such that the transfer part slides back and forth along front and back rails 501. FIG. 5B illustrates pod station 500 with transfer part 502 with pod 503 coupled to transfer part 502.

Figure 6:
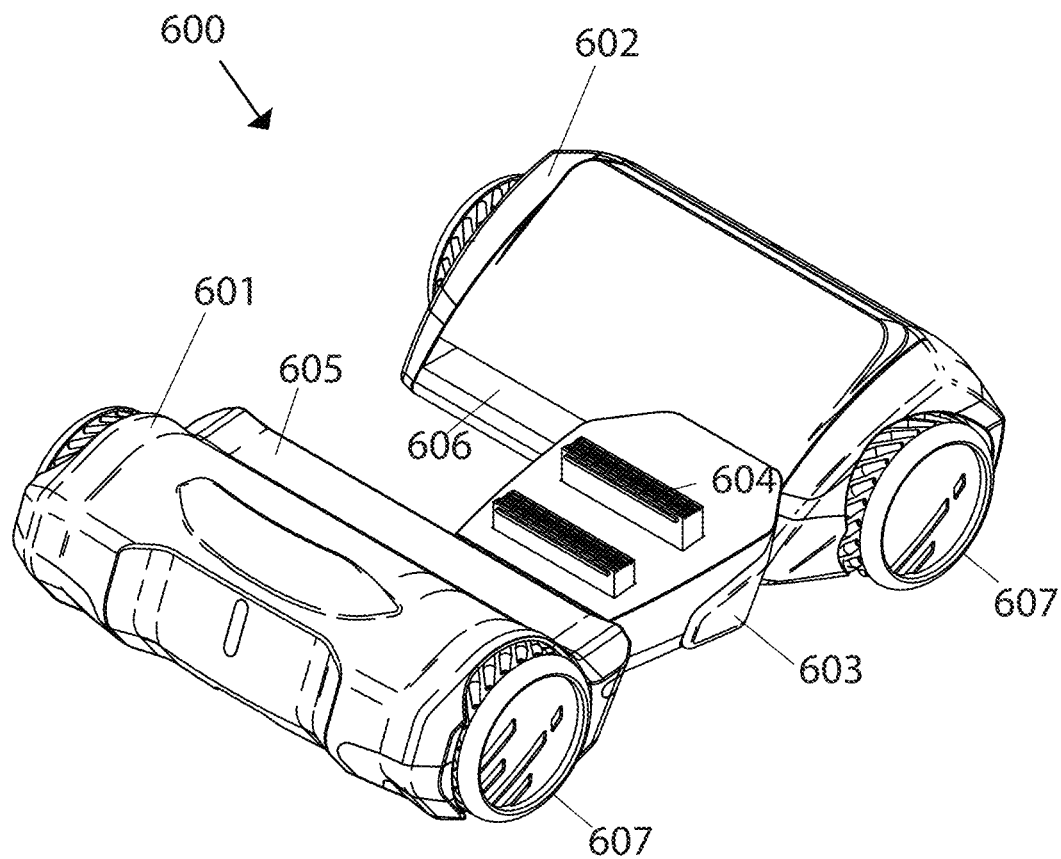
FIG. 6 illustrates an example of a mobile robotic chassis customized to transport pods according to some embodiments.

FIG. 6 illustrates an example of a mobile robotic chassis 600 with front part 601, rear part 602 and middle part 603. Middle part 603 includes top pins 604, front pins (not shown) and back pins (not shown). Front and back pins of middle part 603 fit into front rails 605 and back rails 606 of front part 601 and rear part 603, respectively, such that middle part 603 slides along rails 605 and 606. Front part 601 and rear part 602 further include wheels 607.

Figure 7A:
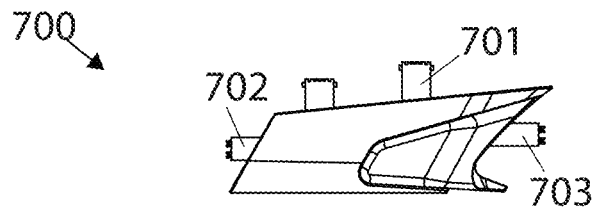
FIGS. 7A-7D illustrate an example of a middle or transfer part of a pod loading and unloading mechanism with extended and retracted pins according to some embodiments.
Figure 7B:
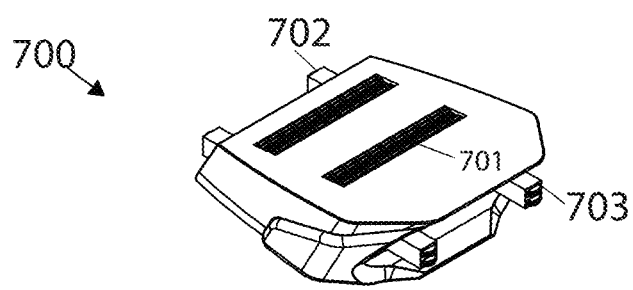
Figure 7C:
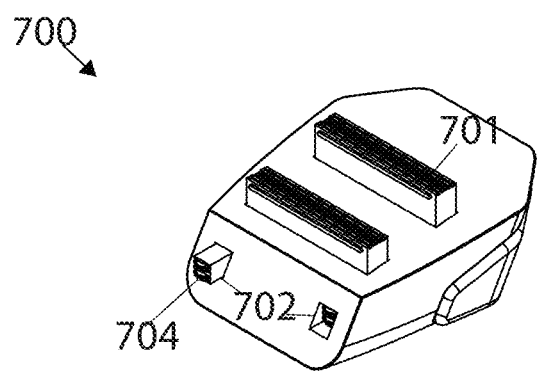
Figure 7D:
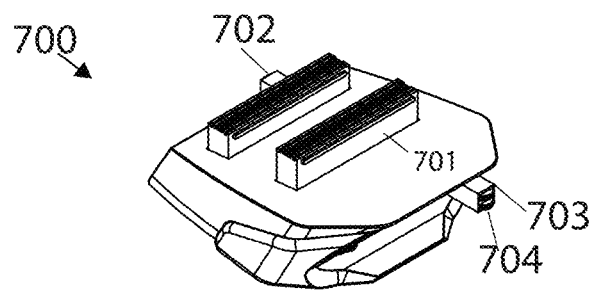

FIG. 7A illustrates an example of a middle or transfer part 700 (assuming they are the same design) with extended top pins 701, front pins 702 and back pins 703. Top pins 701, front pins 702 and back pins 703 are retracted in some instances. For example, front pins 702 and back pins 703 are retracted when transferring transfer part 700 with coupled pod from a pod station to a mobile chassis or top pins 701 of middle part 700 are retracted when transferring a pod on top of middle part 700. FIG. 7B illustrates an example of a middle or transfer part 700 (assuming they are the same design) with retracted top pins 701. FIG. 7C illustrates an example of a middle or transfer part 700 (assuming they are the same design) with one retracted and one extended front pin 702. FIG. 7D illustrates an example of a middle or transfer part 700 (assuming they are the same design) with one retracted and one extended back pin 703. Once transfer is complete, the pins are extended once again such that they fit into a set of rails. Front pins 702 and back pins 703 include rollers 704 operated by a motor. When rollers 704 are operated they cause transfer part 700 to slide along the rails of a pod station or mobile robotic chassis. In some embodiments, the rollers of the transfer part have gear teeth and the rails of the pod station and mobile robotic chassis have gear grooves, such that the gear teeth of the rollers fit into the gear grooves of the rail and when operated cause linear movement of the transfer part.

Other methods for loading and unloading the pod to and from the mobile robotic chassis can be used. For example, in some embodiments, the mobile robotic chassis aligns itself adjacent to a pod station such that the pod can be loaded onto the mobile robotic chassis. In some embodiments, the mobile robotic chassis is aligned with the pod station when the middle part of the mobile robotic chassis and the transfer part, and hence the rails of the mobile robotic chassis and pod station, are aligned with one another. In some embodiments, prior to loading the pod the middle part of the mobile robotic chassis is positioned towards the side of the mobile robotic chassis closest to the pod station. In some embodiments, the pod, initially centrally aligned with the transfer part, slides towards the mobile robotic chassis such that the transfer part and the middle part of the mobile robotic chassis are both positioned beneath the pod. In some embodiments, the pins on the top side of the middle part retract when transferring the pod onto the middle part and extend into the rails of the bottom of the pod once positioned on top of the transfer part and middle part. In some embodiments, the pod is locked in place. In some embodiments, the middle part of the mobile robotic chassis and the transfer part slide towards the mobile robotic chassis such that both are coupled to the front and rear parts of the mobile robotic chassis and the pod is centrally aligned with the mobile robotic chassis. In some embodiments, the pins on the front and back side of the transfer part retract when transferring from the pod station to the mobile robotic chassis and extend into the rails of the front and rear of the mobile robotic chassis once transferred to the mobile robotic chassis. In some embodiments, the middle part of the mobile robotic chassis and the transfer part are locked in place. In some embodiments, different locking mechanisms, such as those described above, are used to unlock/lock components that are slidingly coupled to one another such that components freely slide relative to one another when unlocked and remain in place when locked (e.g., transfer part relative to pod station or mobile robotic chassis, middle part relative to mobile robotic chassis, transfer part relative to pod). In some embodiments, the pod is unloaded from the mobile robotic chassis when no longer required for use. In some embodiments, the mobile robotic chassis aligns itself adjacent to a pod station such that the pod can be loaded onto the pod station. In some embodiments, the transfer part and middle part of the robotic chassis, to which the pod is locked, slide in a direction towards the pod station until the transfer part is coupled and centrally aligned with the pod station. In some embodiments, the transfer part is locked in place. In some embodiments, the pod slides towards the pod station until centrally aligned with the pod station and is locked in place. After unloading the pod at the pod station the mobile robotic chassis navigates to the closest or a designated parking area. In some embodiments, sets of rollers operated by one or more motors are used to force components to slide in either direction. In some embodiments, a pod is unloaded from a robotic chassis using an emergency button or switch within the pod.

Figure 8B:
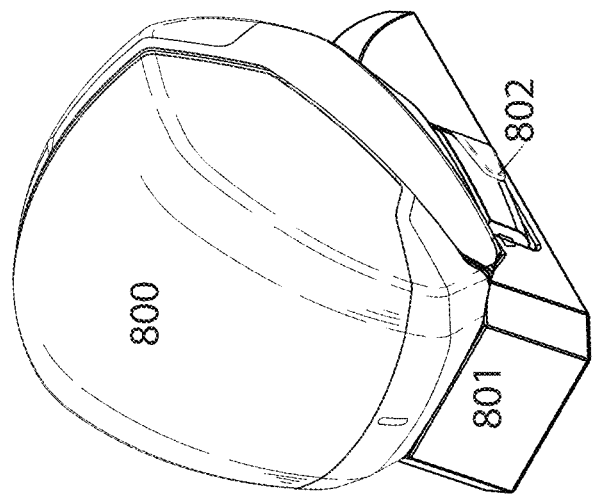
Figure 8A:
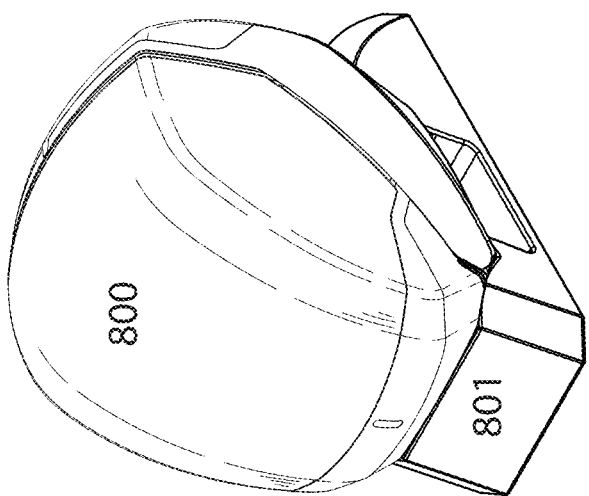
Figure 8D:
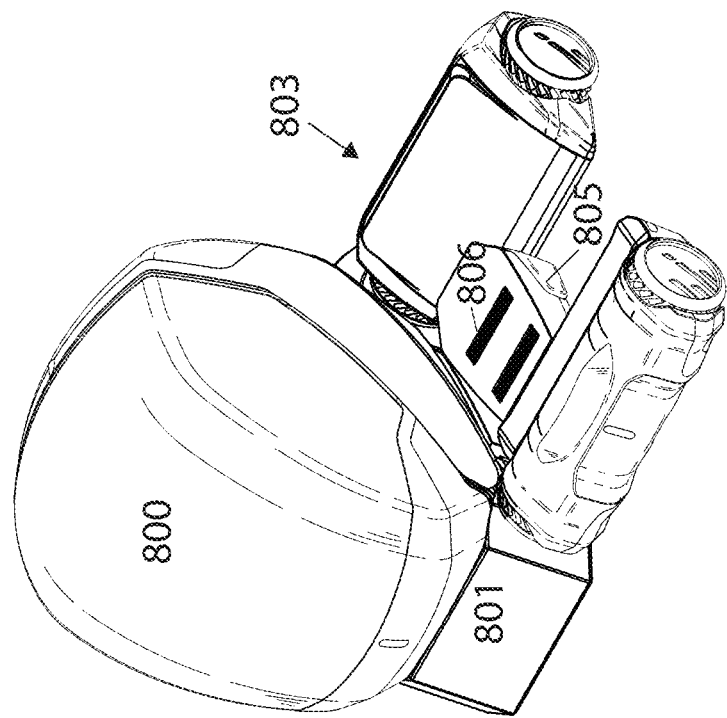
Figure 8C:
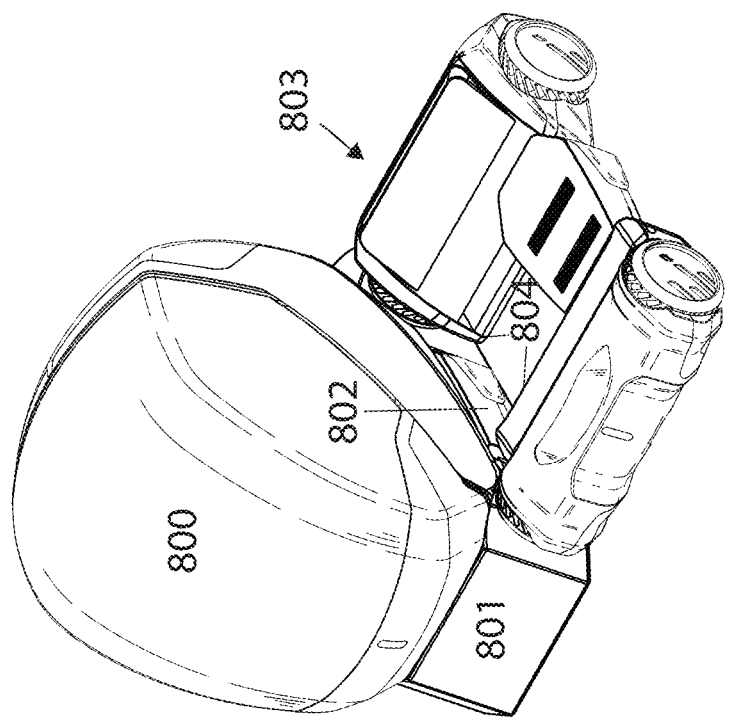
Figure 8F:
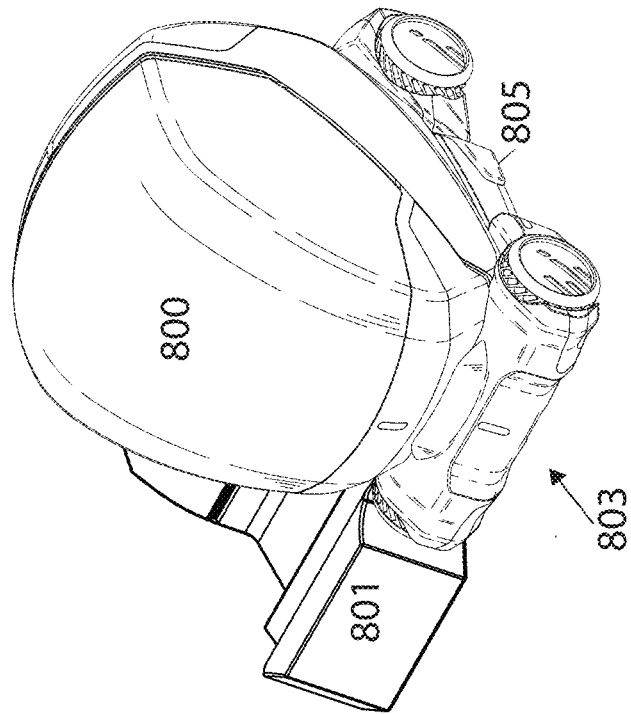
Figure 8E:
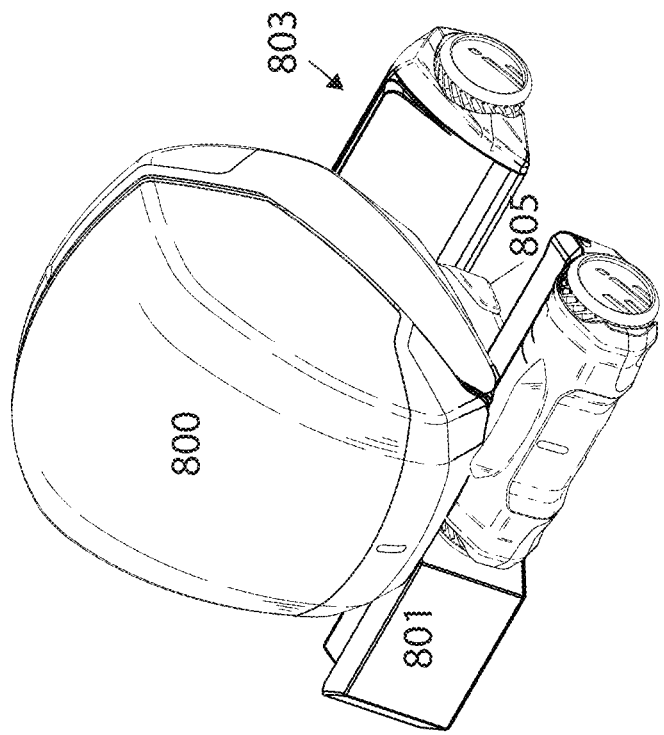

FIGS. 8A-8F illustrate an example of a sequence of steps for loading a pod onto a mobile robotic chassis. In FIG. 8A pod 800 is initially docked at pod station 801. A transfer part (not shown) is coupled to pod 800, the pins of which fit within rails on the bottom of pod 800 (not shown) such that the transfer part can slide back and forth along the rails of pod 801. In this position, the transfer part is positioned at the center of pod 800 and is locked in place. In FIG. 8B, transfer part 802 is unlocked and is moved as far as possible to one side of pod station 800 using, for example, rollers powered by a motor. Transfer part 802 is locked in place. In FIG. 8C, mobile robotic chassis 803 aligns with pod station 801 on the side closest to transfer part 802 to prepare for loading pod 800 onto mobile robotic chassis 803. The rails of pod station 801 (not shown) and rails 804 of mobile robotic chassis 803 align with one another. In FIG. 8D, middle part 805 of mobile robotic chassis 803 is unlocked and moved as far as possible in a direction towards transfer part 802 (not shown) and is locked in place. Middle part 805 can be moved in a similar way as transfer part 802. Top pins 806 of middle part 805 are retracted to prepare for loading of pod 800. In FIG. 8E, pod 800 is moved in a direction towards middle part 805 such that pod 800 is equally supported by transfer part 802 (not shown) and middle part 805. Once in place, top pins of middle part 805 are extended and pod 800 is locked in place. In FIG. 8F, transfer part 802 (not shown) and middle part 805 simultaneously move in a direction away from pod station 801 until pod 800 has been loaded onto mobile robotic chassis 803. Front and back pins of transfer part 802 (not shown) are retracted one by one as transfer part 802 is transferred from pod station 501 to mobile robotic chassis 803. Once each pin of transfer part 802 is adjacent with a rail of mobile robotic chassis 803 they are extended once again. In FIG. 8G, pod 800 is loaded onto mobile robotic chassis 803 and is used for, for example, transportation of items or humans or animals. In this example, transfer part 802 and middle part 805 are of the same design, however, in other embodiments they can be of different design.

Figure 9A:
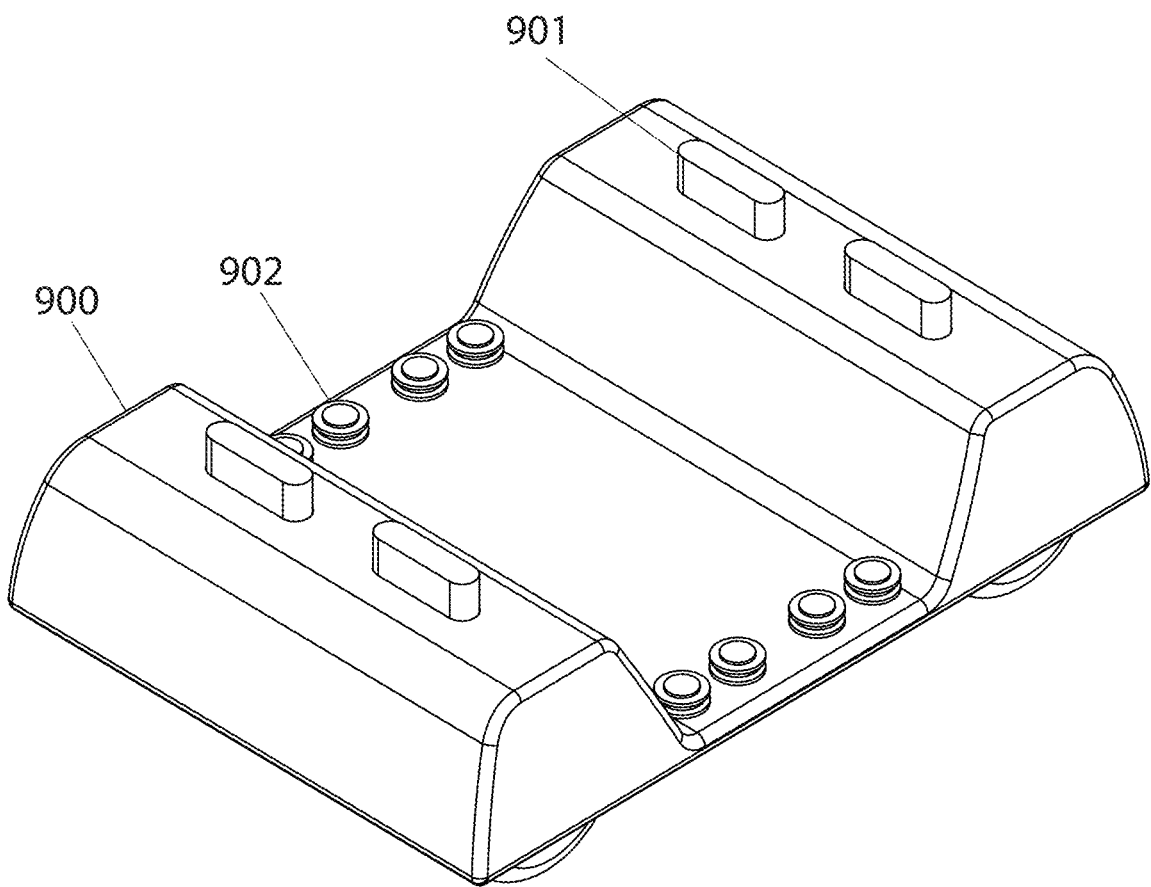
FIGS. 9A-9F illustrate an example of a sequence of steps for loading a pod onto a mobile robotic chassis according to some embodiments.
Figure 9B:
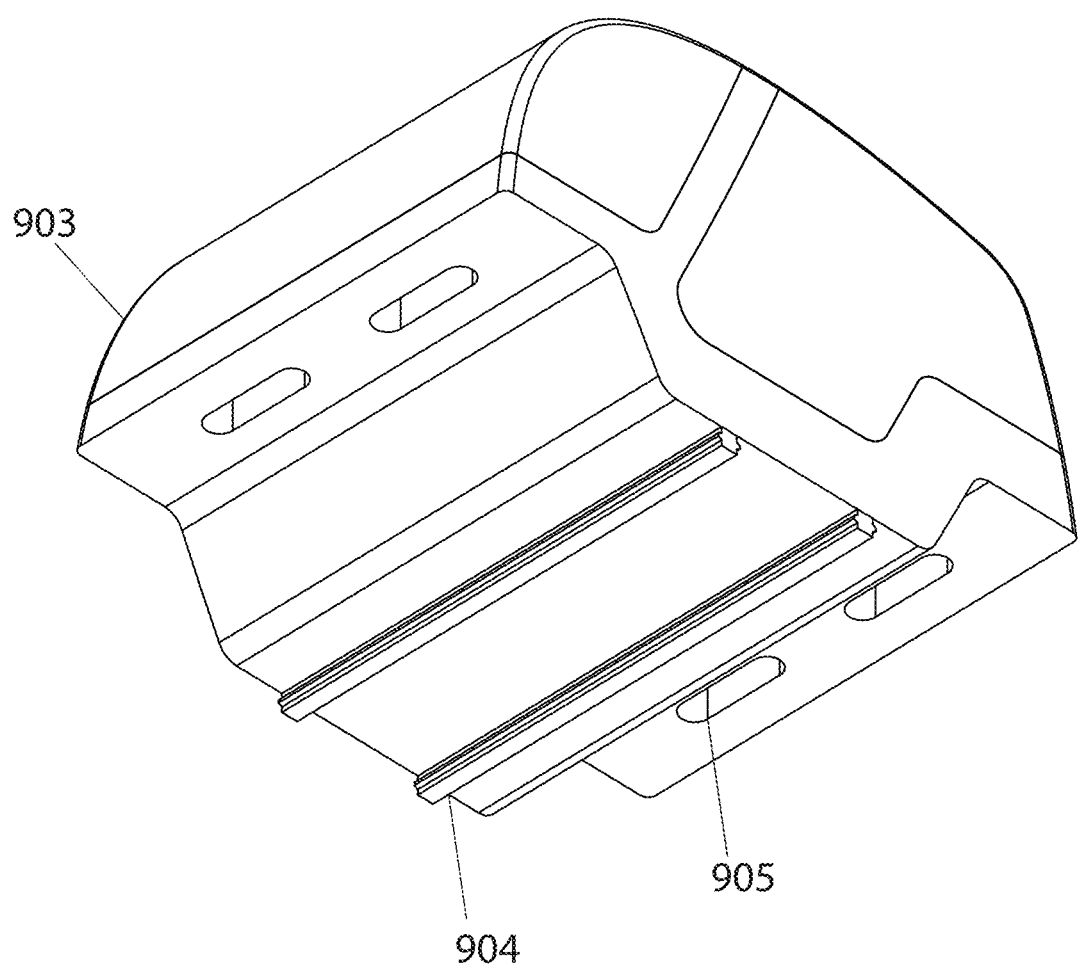
Figure 9C:
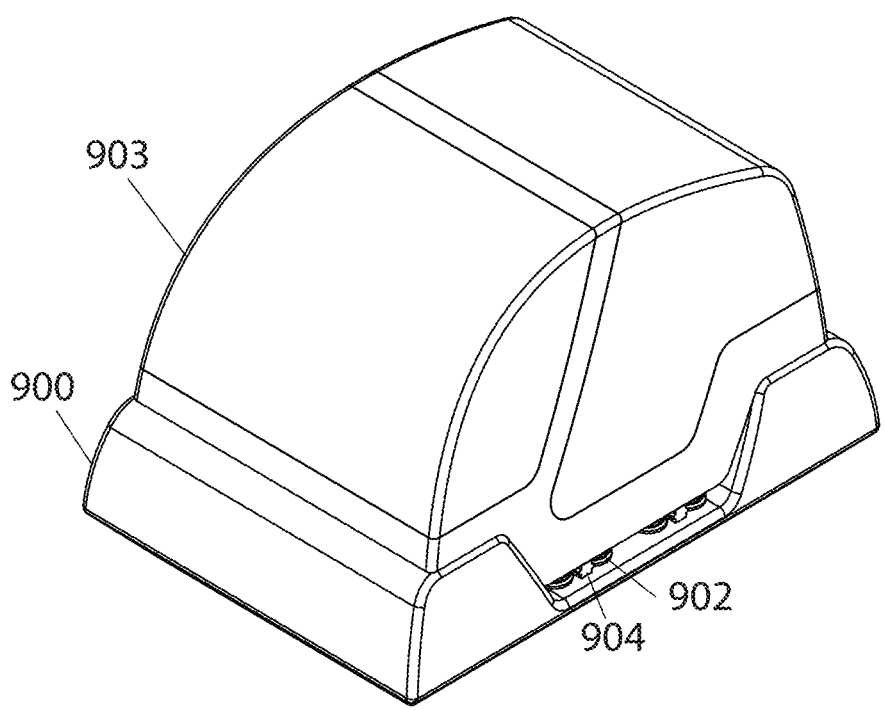
Figure 9D:
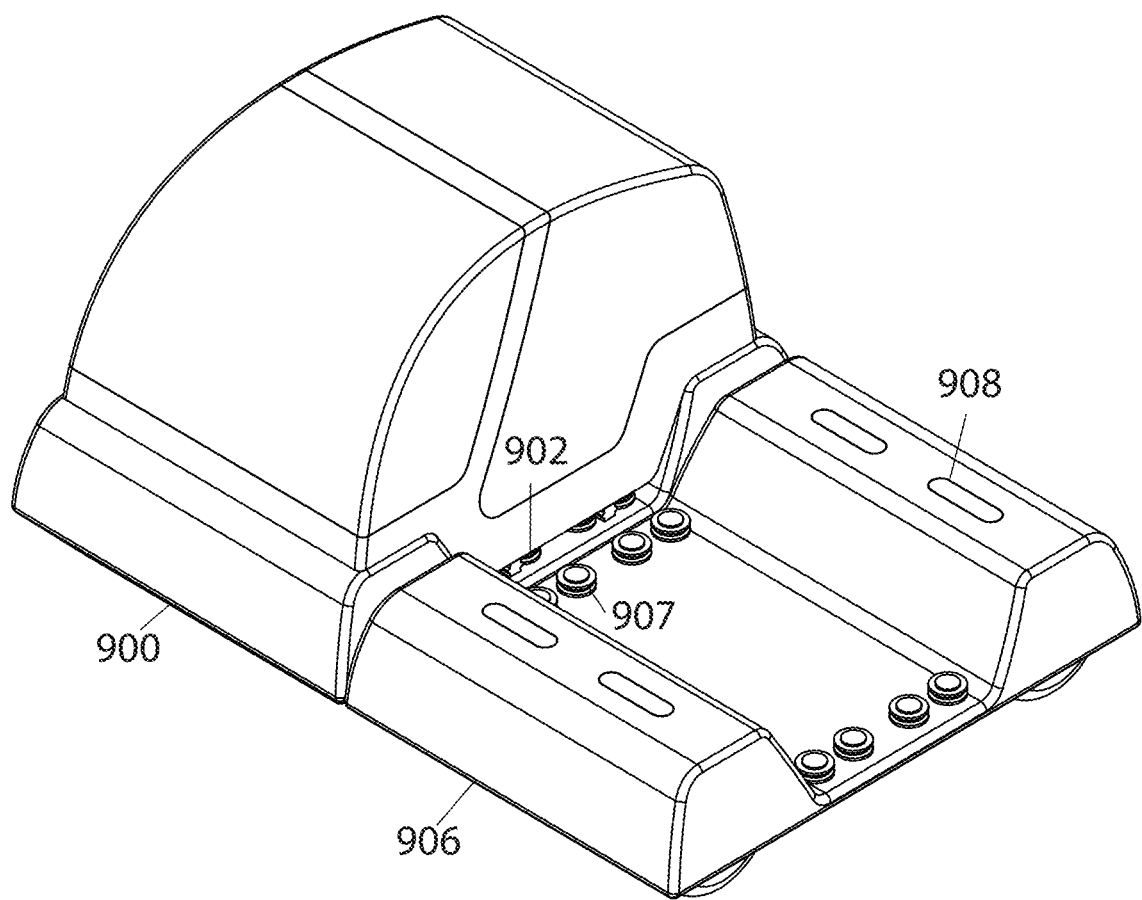
Figure 9E:
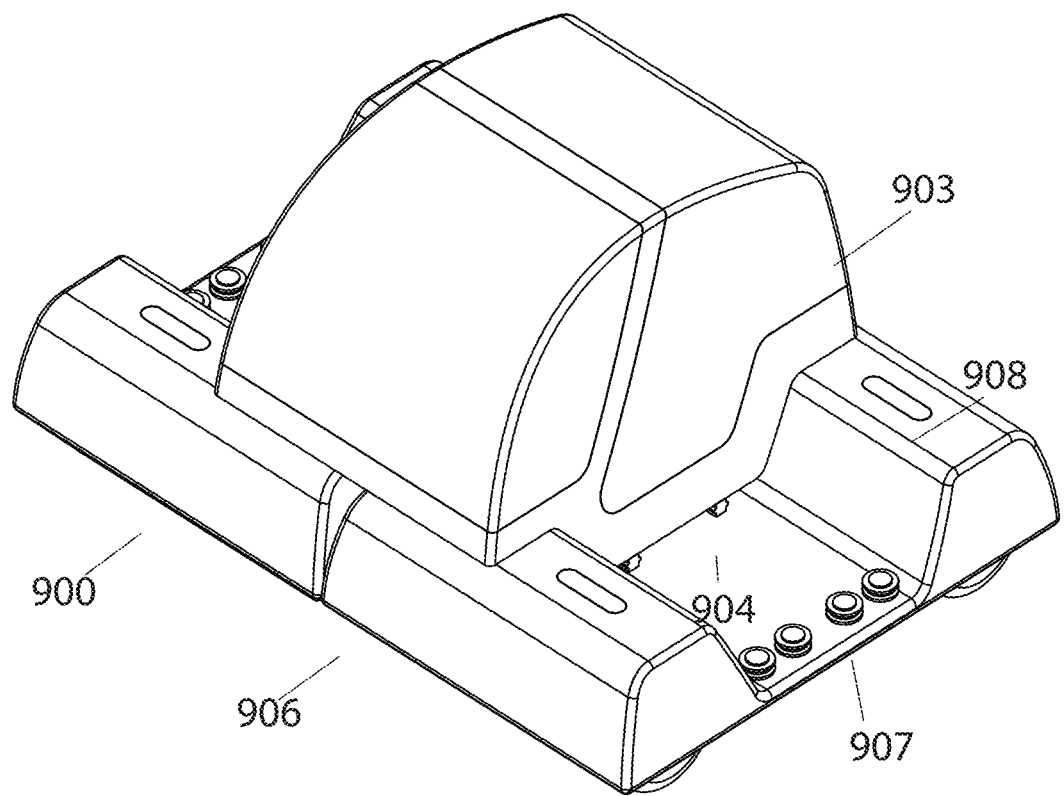
Figure 9F:
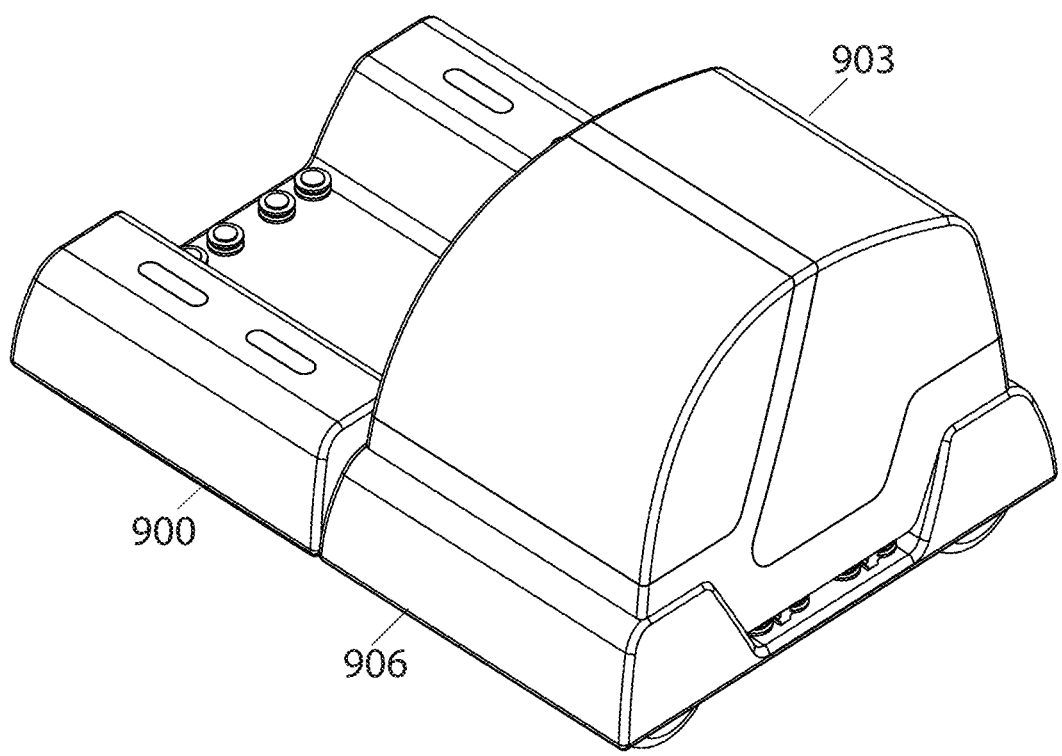

In other embodiments, different types loading and unloading mechanisms can be used. For example, a pod includes two (or more) rails positioned along the width of a bottom side the pod and a pod station and mobile robotic chassis each include eight guiding pins, four guiding pins positioned on either side of the pod station and mobile robotic chassis such that the two rails of the pod fit within and are guided by two pins on both sides and both ends of each rail (i.e., total of four pins per rail). In some embodiments, the pod station and robotic chassis include a locking mechanism. In some embodiments, the locking mechanism includes locking pins of the pod station and robotic chassis that extend into holes positioned on the pod to hold the pod in place. In some embodiments, the pins retract during pod transfer. In some embodiments, the locking pins are driven by one or more motors. In some embodiments, the guiding pins include teeth and rotate and the rails include grooves within which the teeth fit within such that rotation of the guiding pins causes linear sideways movement of the pod. In some embodiments, rollers placed elsewhere cause linear movement of the pod. In some embodiments, a robotic chassis aligns with a side of a pod station holding a pod. The robotic chassis is aligned with the pod station when the guiding pins of the robotic chassis and the pod station are aligned. In some embodiments, the pod station and robotic chassis retract their respective locking pins. The pod is transferred from the pod station to the robotic chassis by moving towards the robotic chassis, the rails of the pod fitting between the guiding pins of the robotic chassis. The transfer is complete when the pod is aligned with robotic chassis and the locking pins of the robotic chassis are extended. In other embodiments, a similar process is executed for transfer of the pod from a robotic chassis to a pod station or from one robotic chassis to another. FIGS. 9A-9F illustrate an example of the loading and unloading mechanism. FIG. 9A illustrates pod station 900 with locking pins 901 extended and guiding pins 902. FIG. 9B illustrates pod 903 with rails 904 that fit within guiding pins 902 (shown in FIG. 9A) and holes 905 within which locking pins 901 (shown in FIG. 9A) fit within. FIG. 9C illustrates pod 903 in pod station 900 with rails 904 positioned between guiding pins 902. FIG. 9D illustrates mobile robotic chassis 906 aligned with pod station 900 as guiding pins 902 of pod station 900 are aligned with guiding pins 907 of robotic chassis 906. FIG. 9E illustrates the transfer of pod 903 from pod station 900 to robotic chassis 906 as pod 903 moves sideways towards robotic chassis 906 and is guided by rails 904 fitting within guiding pins 907 of robotic chassis 906. Locking pins 901 (not shown) of pod station 900 and locking pins 908 of robotic chassis 906 are retracted during pod transfer. FIG. 9F illustrates pod 903 in robotic chassis 906 after transfer is complete. Although not shown, locking pins 908 of robotic chassis 906 are extended to lock pod 903 in place. In some embodiments, the processor of the mobile robotic chassis detects alignment between the mobile robotic chassis and pod station when a receiver positioned on the mobile robotic chassis receives a signal from a transmitter positioned on the pod station, wherein the transmitter and receiver are positioned such that the receiver only receives the signal when the mobile robotic chassis and pod station are aligned. In some embodiments, the pod station detects alignment in a similar manner. In some embodiments, the processors of the mobile robotic chassis and pod station actuate their respective locking pins to retract and their respective guiding pins to rotate once alignment between the mobile robotic chassis and pod station is detected causing the pod to transfer from the pod station to mobile robotic chassis. In some embodiments, the release or activation of a switch is used to indicate unloading or loading of the pod is complete.

In another example of a loading and unloading mechanism, a pod is slidingly coupled with rollers of a pod station and a mobile robotic chassis. In some embodiments, the pod station and mobile robotic chassis each include eight (or more) rollers with teeth, four rollers positioned in a straight line along the length of the pod station and mobile robotic chassis on both sides. In some embodiments, the rollers are operated using one or more motors. In some embodiments, the pod includes two (or more) rails with grooves positioned on a bottom side of the pod. In some embodiments, the rollers of the pod station and mobile robotic chassis align with the rails of the pod and the teeth of the rollers fit within the grooves of the rails such that when the rollers rotate they cause linear motion of the pod in a direction of rotation of the rollers. In some embodiments, the rollers and rails operate in a similar manner as a rack and pinion gear system. In some embodiments, the pod station and mobile robotic chassis include a locking mechanism. In some embodiments, a locking mechanism includes locking pins driven by a motor wherein locking pins extend from the pod station or mobile robotic chassis into holes positioned on the pod to lock the pod into place. In some embodiments, the locking pins extend from the pod station into holes in the rails of the pod to lock the pod into place. In some embodiments, the locking pins extend from the pod station into holes positioned at the sides of the pod to lock the pod in place. In some embodiments, other locking configurations are possible. In some embodiments, the pod is located at a pod station when the pod is not required. In some embodiments, a mobile robotic chassis aligns itself in front or behind the pod station such that the pod can be loaded onto the mobile robotic chassis when the pod is required. In some embodiments, the mobile robotic chassis is aligned with the pod station when the rollers of the mobile robotic chassis and rollers of the pod station are aligned with one another. In some embodiments, the rollers of the pod station rotate and move the pod linearly towards the robotic chassis as teeth of the rollers fit into the grooves of the rails of the pod. In some embodiments, the rollers of the mobile robotic chassis rotate as well to move the pod linearly until it is aligned with the robotic chassis. In some embodiments, the locking pins retract when transferring the pod from the pod station to the mobile robotic chassis and extend into the pod once the pod is aligned with the mobile robotic chassis. In some embodiments, a similar operation is executed to transfer the pod from the robotic chassis to a pod station or from one robotic chassis to another robotic chassis.

Figure 10A:
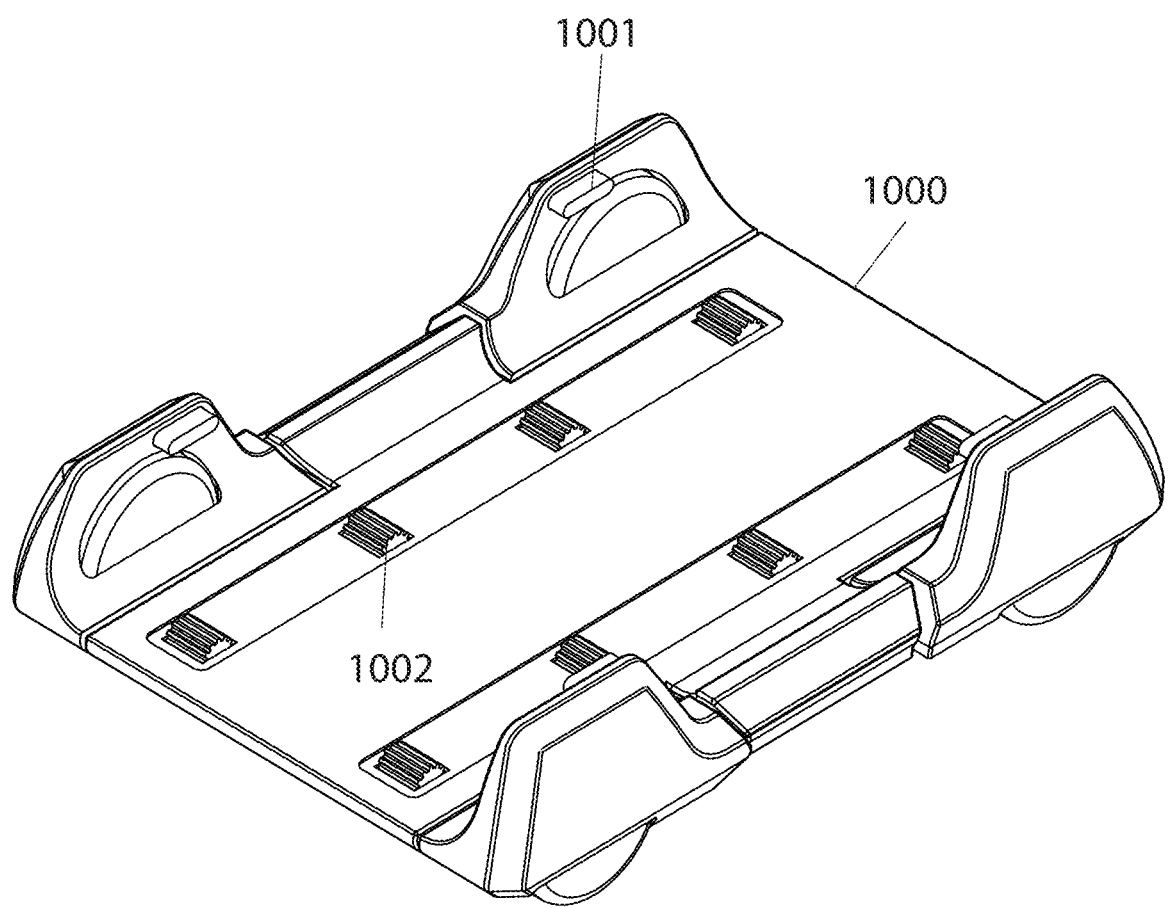
FIGS. 10A-10F illustrate an example of a sequence of steps for loading a pod onto a mobile robotic chassis according to some embodiments.
Figure 10B:
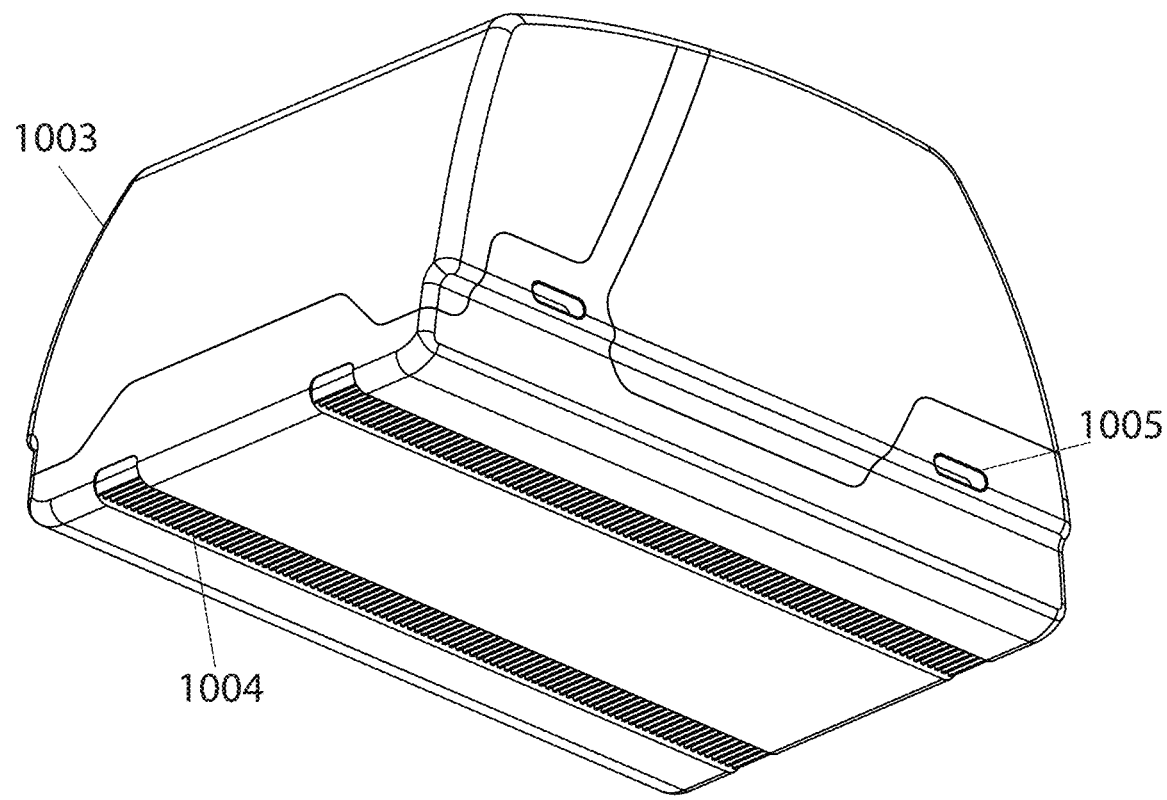
Figure 10C:
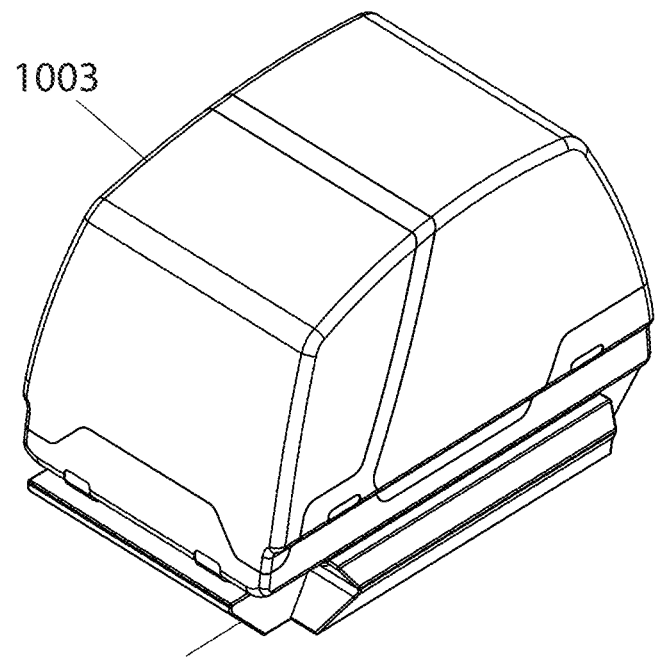
Figure 10D:
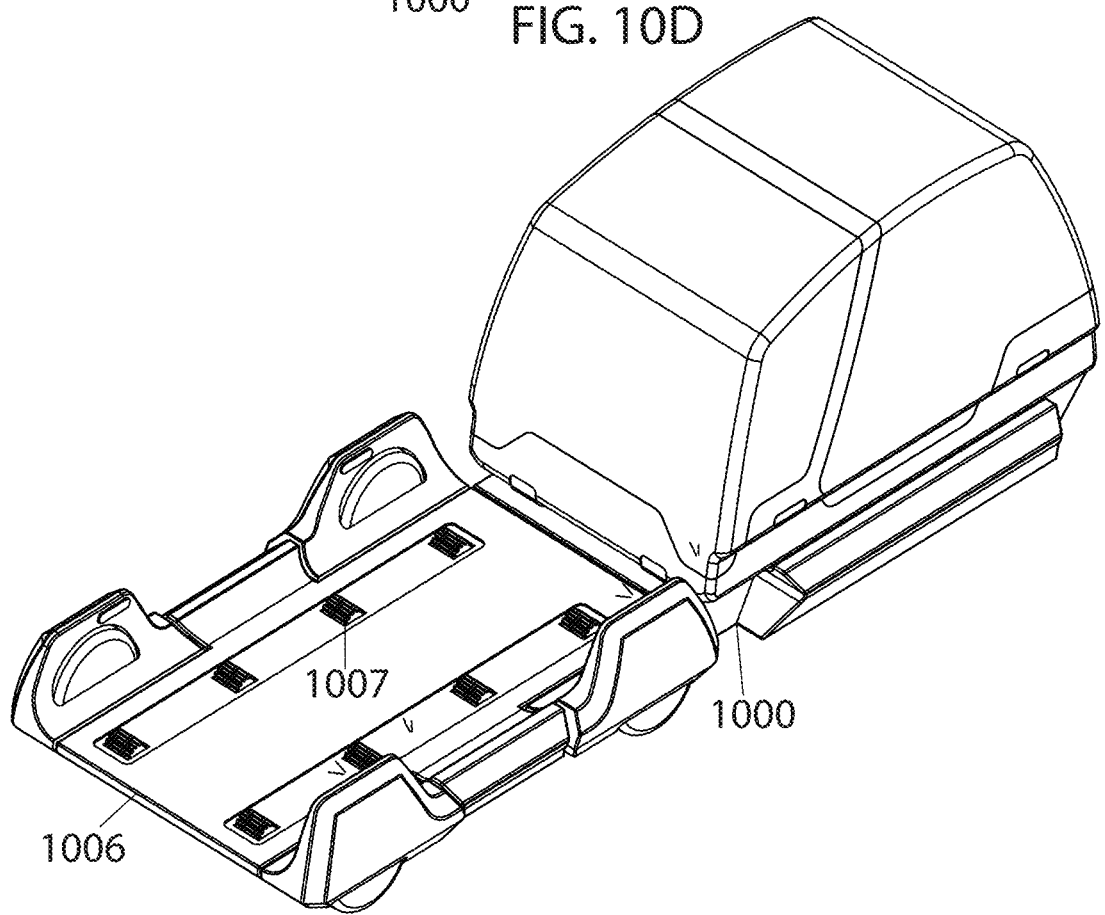
Figure 10E:
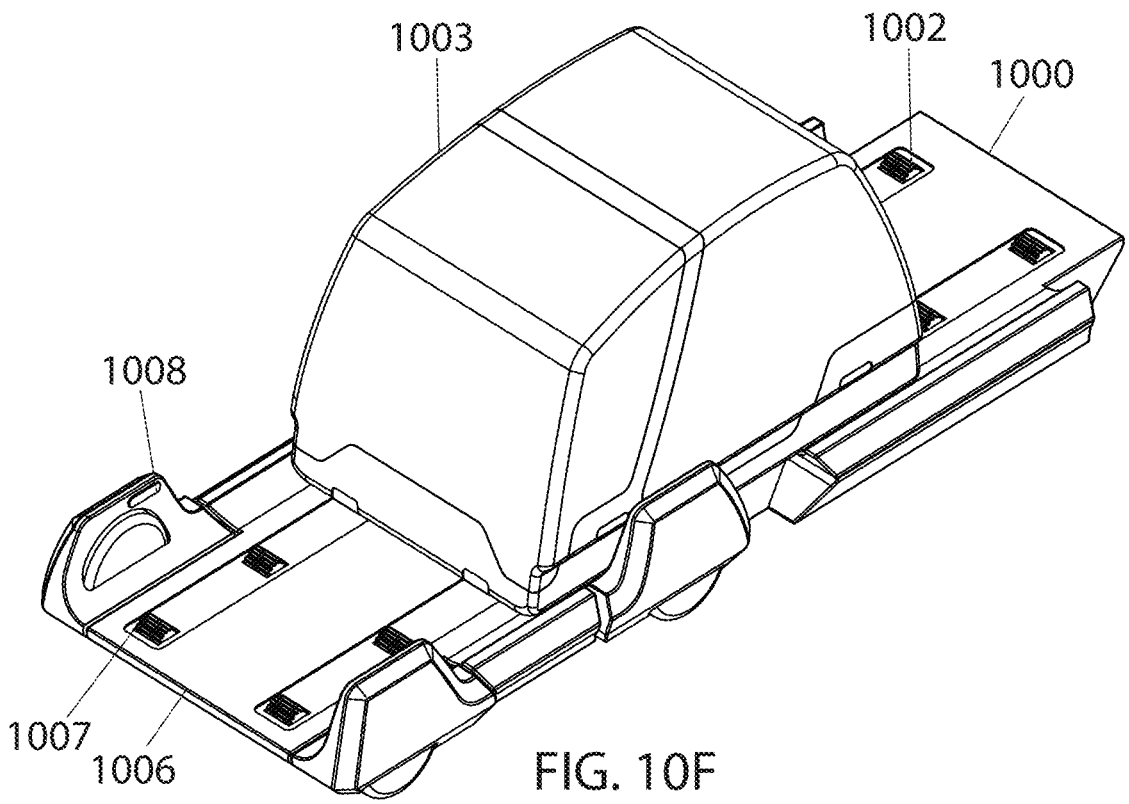
Figure 10F:
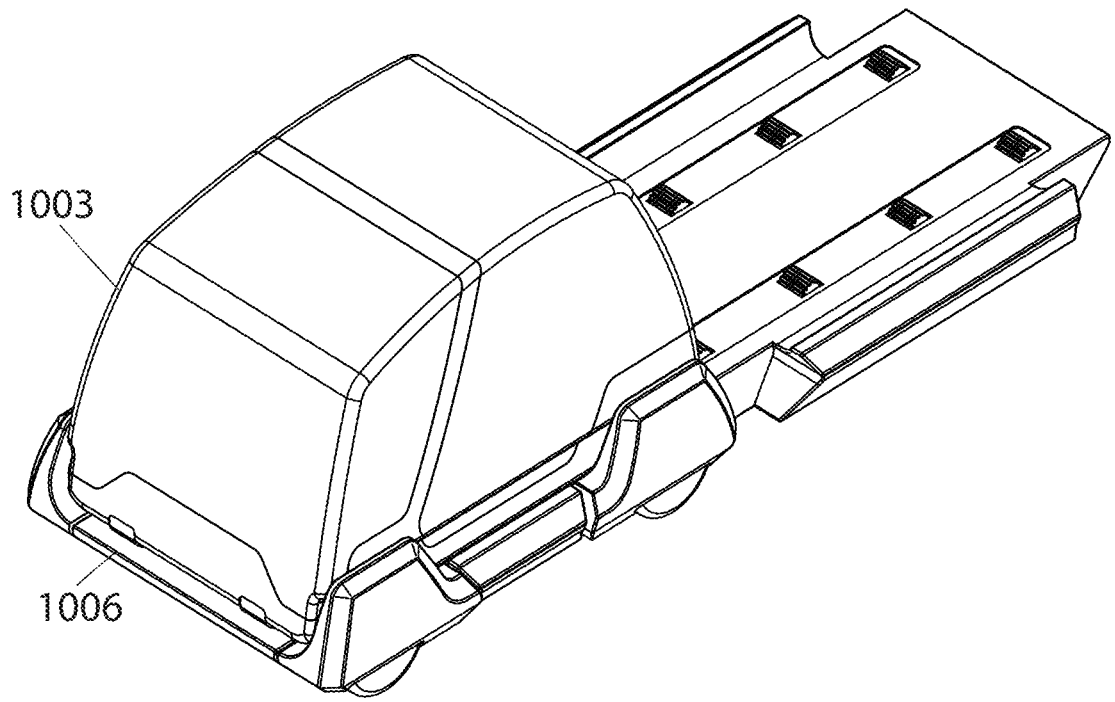

In some embodiments, rails and rollers have different configurations (e.g., orientation, position, etc.). For example, the rails and rollers are oriented along the width of the pod, and pod station and mobile robotic chassis, respectively, such that the pod is transferred by sliding towards a side of the pod station or robotic chassis. FIGS. 10A-10F illustrate an example of the roller and rail loading and unloading mechanism. FIG. 10A illustrates pod station 1000 with locking pins 1001 extended and rollers with teeth 1002. FIG. 10B illustrates pod 1003 with grooved rails 1004 within which teeth of rollers 1002 (shown in FIG. 10A) fit within and holes 1005 within which locking pins 1001 (shown in FIG. 10A) fit within. FIG. 10C illustrates pod 1003 in pod station 1000. FIG. 10D illustrates mobile robotic chassis 1006 aligned with pod station 1000 as rollers 1002 of pod station 1000 are aligned with rollers 1007 of robotic chassis 1006. FIG. 10E illustrates the transfer of pod 1003 from pod station 1000 to robotic chassis 1006 as pod 1003 moves forwards towards robotic chassis 1006 as rollers 1002 (shown in FIG. 10A) of pod station 1000 and rollers 1007 of robotic chassis 1006 rotate in a counter clock wise direction and their teeth fit within grooves of rails 1004 (not shown) of pod 1003, moving it linearly forward. Locking pins 1001 of pod station 1000 (not shown) and locking pins 1008 of robotic chassis 1006 are retracted during pod transfer. FIG. 10F illustrates pod 1003 in robotic chassis 1006 after transfer is complete. Although not shown, locking pins 1008 of robotic chassis 1006 are extended to lock pod 1003 in place.

In some embodiments, a pod is transferred from one robotic chassis to another while stationary or while operating using similar loading and unloading mechanisms described above. In some embodiments, a first mobile robotic chassis with a pod, the pod being coupled to a transfer part coupled to the front and rear of the robotic chassis, aligns adjacent to a second mobile robotic chassis. In some embodiments, the first mobile robotic chassis is aligned with the second mobile robotic chassis when the middle part of the first mobile robotic chassis and the middle part of the second mobile robotic chassis, and hence the rails of the first mobile robotic chassis and second mobile robotic chassis, are aligned with one another. In some embodiments, the transfer part coupled to the pod slides along the rails of the first mobile robotic chassis towards the second mobile robotic chassis until the transfer part is coupled to front and rear rails of the second mobile robotic chassis. In some embodiments, the first mobile robotic chassis with pod is low on battery at which point the second mobile robotic chassis aligns itself with the first mobile robotic chassis to load the pod onto the second mobile robotic chassis and complete the transportation. In some embodiments, the first pod with low battery navigates to the nearest charging station.

In some embodiments, the size of a mobile robotic chassis is adjusted such that two or more pods can be transported by the robotic chassis. In some embodiments, pods are of various sizes depending on the item or number of persons to be transported within the pods. In some embodiments, robotic chassis are of various sizes to accommodate pods of various sizes. In some embodiments, two or more pods link together to transport larger items and the required number of mobile robotic chassis are coupled to the two or more linked pods for transportation. In some embodiments, two or more mobile robotic chassis link together to form a larger vehicle to, for example, transport more items or passengers or larger items. In some embodiments, pods and/or mobile robotic chassis temporarily link together during execution of a task for, for example, reduced power consumption (e.g., when a portion of their paths are the same) or faster travel speed. In some embodiments, two or more robotic chassis without loaded pods stack on top of one another to minimize space (e.g., when idle or when a portion of their routes match). In some embodiments, the two or more robotic chassis navigate to a stacking device capable of stacking robotic chassis by, for example, providing a lift or a ramp.

In some embodiments, a processor of a mobile robotic chassis inspects a pod for physical damage using computer vision technology and displays any discovered damages on a screen of the pod. In some embodiments, the processor of the mobile robotic chassis uses imaging devices or other types of sensors to observe the pod and infers features of the pod from the observations collected by the imaging devices. In some embodiments, the processor compares the inferred features of the current pod to stored features of an undamaged pod and identifies discrepancies between the inferred features of the current pod and the stored features of an undamaged pod as physical damage. In other embodiments, other methods may be used to detect physical damage. In some embodiments, the severity level of the damage is displayed on the screen of the pod. In some embodiments, the damage and the severity of damage are sent to an application of a communication device paired with the pod.

In some embodiments, an application of a communication device is paired with a control system that manages multiple mobile robotic chassis. In some embodiments, the application of the communication device is paired with a robotic chassis upon loading of a pod or selection of the robotic chassis to provide the service. In some embodiments, a pod is paired with a robotic chassis upon loading. In some embodiments, pairing methods such as those described in U.S. patent application Ser. No. 16/109,617, the entire contents of which are hereby incorporated by reference, are used to wirelessly pair pods, robotic chassis, and applications of communication devices. Examples of communication devices include, but are not limited to, a mobile phone, a tablet, a laptop, a remote control, and a touch screen of a pod. In some embodiments, the application of the communication device transmits a request to the control system for a mobile robotic chassis for a particular function (e.g., driving service, food delivery service, item delivery service, plowing service, etc.). For example, the application of the communication device requests a mobile robotic chassis for transportation of persons or items (e.g., food, consumer goods, warehouse stock, etc.) in a pod (i.e., a driving service) from a first location to a second location. In another example, the application of the communication requests snow removal in a particular area at a particular time or garbage pickup at a particular location and time or for a vehicle tow from a first location to a second location immediately. In some embodiments, the application of the communication device is used to designate a pickup and drop off location and time, service location and time, service type, etc. In some embodiments, the application of the communication device is used to set a schedule for a particular function. For example, the application of the communication device is used to set a schedule for grocery pickup from a first location and delivery to a second location every Sunday at 3 pm by a robotic chassis customized to transport items such as groceries. Examples of methods for setting a schedule are described in U.S. patent application Ser. Nos. 16/051,328 and 15/449,660, the entire contents of which are hereby incorporated by reference. For example, some embodiments disclose a robotic floor-cleaning device, including: a shell; a chassis; a set of wheels; at least one motor to drive the wheels and move the robotic floor-cleaning device in a direction on a surface; a control device to activate and control the robotic floor-cleaning device's movement, a clock, a memory unit to store data, an input/output means connected to the control unit and a cleaning unit connected to the chassis. In some embodiments, the control unit is configured to save a date and time set by a user when the robotic floor-cleaning device should be turned on. In some embodiments, the control unit is further configured to suggest a work schedule based on the saved data to the user using the input/output means.

Some embodiments disclose a method for setting a work schedule for a robotic floor-cleaning device including: monitoring use times of a robotic floor-cleaning device over a preset period of time; storing the times and dates the robotic floor-cleaning device was turned on in a database; developing a suggested work schedule based on the stored data; and proposing the suggested work schedule to users through an input/output device.

Some embodiments provide a method including: monitoring use times of a robotic floor-cleaning device over a preset period of time; storing the times and dates the robotic floor-cleaning device was turned on in a database; devising a suggested work schedule from the stored data using a machine learning technique; proposing the suggested work schedule to users through an input/output device; accepting user adjustments to the suggested work schedule through the input/output device; and adding the user adjustment data to the database for use in devising future work schedules.

One skilled in the art will appreciate that different embodiments of the invention may use different machine learning techniques such as, but not limited to, supervised learning, unsupervised learning, reinforcement learning, semi-supervised learning, etc.

In some embodiments, the input/output device may be wireless and may send and receive signals to and from remote devices, such as, for example, remote controls and smartphones.

In some embodiments, the floor-cleaning device may be scheduled directly via a user interface positioned thereon.

In some embodiments, inputs from a user and outputs from the robotic floor-cleaning device may be provided through a software application installed on an internet-connected device, such as a smartphone, a computer, or a tablet.

An example of a process for devising a suggested work schedule includes monitoring activation dates and times, storing the dates and times in a database, developing a suggested work schedule based on the stored data, and proposing the suggested work schedule.

In some embodiments, the application of the communication device provides information relating to the robotic chassis performing the function such as battery level, average travel speed, average travel time, expected travel time, navigation route, current location, drop off location, pick up location, etc. In some embodiments, some parameters are modified using the application of the communication device. For example, a navigation route or travel speed or a delivery location of a robotic chassis delivering food is modified using the application of the communication device. In some embodiments, the current location, pickup location, drop off location, and navigation route of the mobile robotic chassis is viewed in a map using the application of the communication device. In some embodiments, the application also provides an estimated time of arrival to a particular location and cost of the service if applicable.

In some embodiments, the application of the communication device includes a graphical user interface such as the GUI described in U.S. patent application Ser. Nos. 15/272,752 and 15/949,708, the entire contents of which are hereby incorporated by reference. For example, in some embodiments, once a map is established, it may be sent to a user interface. Maps may be sent to a user interface at any stage; they do not need to be complete. In some embodiments, through the interface, a user may view the map and take any of a variety of actions. In embodiments, a user interface may be provided through a software application on a computer, tablet, smartphone, or a dedicated remote control. In some embodiments, a user may adjust or correct the map boundaries within the user interface by selecting all or part of a boundary line using a cursor, pointer, stylus, mouse, the user's finger, a button or buttons, or other input device on the user interface. In some embodiments, once a boundary line is selected, a user may be provided with various options, such as, but not limited to, deleting, trimming, rotating, elongating, redrawing, moving in a left direction, moving in a right direction, moving in an upward direction, moving in a downward direction, etc. In some embodiments, a user may be given the option to redraw a boundary line using a cursor, pointer, stylus, mouse, the user's finger, a button or buttons, or other input devices.

In some embodiments, maps generated by robotic devices may contain errors, be incomplete, or simply not reflect the areas that a user wishes a robotic floor-cleaning device to service. By adjusting the map, a user may improve the accuracy of the information that the robotic device has about its environment, thereby improving the device's ability to navigate through the environment. A user may, for example, extend the boundaries of a map in areas where the actual boundaries are further than those identified by the system, or trim boundaries where the system identified boundaries further than the actual or desired boundaries. Even in cases where a system creates an accurate map of an environment, a user may prefer to adjust the map boundaries to keep the device from entering some areas.

In some embodiments, data may be sent between the robotic floor-cleaning device and the user interface through one or more network communication connections. Any type of wireless network signals may be used, including, but not limited to, radio signals, Wi-Fi signals, or Bluetooth signals. In some embodiments, map data collected by sensors of the robotic floor-cleaning device is sent to the user interface, where a user may make adjustments and/or apply or adjust settings. In some embodiments, changes made by a user in the user interface are sent to the robotic floor-cleaning device through the one or more network communication connections.

In some embodiments, robotic floor-cleaning devices may have a plurality of tools that can be used concurrently or independently, such as, but not limited to, a suction tool, a mopping tool, and a UV light for killing bacteria. In some embodiments, robotic floor-cleaning devices may also have various settings, such as a deep cleaning setting, a regular cleaning setting, speed settings, movement pattern settings, cleaning frequency settings, etc. In some embodiments, a user is enabled to adjust all of these settings through the user interface. In some embodiments, a user may select with a cursor, pointer, stylus, mouse, the user's finger, a button or buttons, a keyboard, or other input devices any portion of the workspace and select one or more settings to be applied to the area.

An example of a process for creating a two-dimensional map and utilizing an interactive user interface includes in a first step, the system collects data about the environment with sensors positioned on the robotic floor-cleaning device. In a next step, the system generates a two-dimensional map of the workspace based on the collected data. Any available methods may be used to create a two-dimensional map of the environment, including, but not limited to, simultaneous localization and mapping (SLAM) techniques. In some methods, measurement systems, such as LIDAR, are used to measure distances from the robotic device to the nearest obstacle in a 360 degree plane in order to generate a two-dimensional map of the area. In a next step, the two-dimensional map is sent to the user interface via one or more network communication connections. In a next step, the system checks for changes made by a user on the user interface. If any changes are detected (to either the map boundaries or the operation settings), the method proceeds to a next step to send the user changes to the device. If no changes to the map boundaries or the operation settings are detected, the method proceeds to continue working without any changes.

An example of a process for customizing robotic device operation through a user interface includes in a first step, a user selects the area of the workspace map in which he or she wants to designate robotic device operation settings. A user may select any size area; the area selected could be comprised of a small portion of the workspace or could encompass the entire workspace. In a next step, a user selects desired settings for the selected area. The particular functions and settings available may be dependent on the capabilities of the particular robotic floor-cleaning device in question. For example, in some embodiments, a user may select any of: cleaning modes, frequency of cleaning, intensity of cleaning, navigation methods, driving speed, etc. In a next step, the selections made by the user are sent to the robotic floor-cleaning device. In a next step, a processor of the robotic floor-cleaning device processes the received data and applies the user changes.

In an example, obstacles may be detected by a robotic floor-cleaning device, such as the walls of the workspace and a piece of furniture. An overhead view of a two-dimensional map created by a robotic floor-cleaning device of the workspace includes these obstacles. Because the methods for generating the map are not 100% accurate, the two-dimensional map generated is approximate and not perfect. A robotic floor-cleaning device may devise navigation plans based on the generated map, and thus performance may suffer as a result of imperfections in the generated map. A user may desire to correct the boundary lines to match the actual obstacles. By changing the boundary lines of the map created by the robotic floor-cleaning device, a user is enabled to create a two-dimensional map of the workspace that accurately identifies obstacles and boundaries in the workspace. Furthermore, as discussed previously, a user may identify areas within the two-dimensional map to be treated in specific ways. By delineating a portion of the map, a user may select settings for that area. For example, a user may identify the area and select weekly cleaning, as opposed to daily or standard cleaning, for that area. In a like manner, a user may define the area and turn on a mopping function for that area. The remaining area may be treated in a default manner. Additionally, in adjusting the boundary lines of the two-dimensional map, a user is permitted to create boundaries anywhere desired, regardless of whether an actual boundary exists in the workspace. In the example shown, the boundary line in the corner 308 has been redrawn to exclude the area near the corner. The robotic floor-cleaning device will thus be prevented from entering the area. This may be useful for keeping a robotic floor-cleaning device out of areas that a user does not want the device to service. For example, a user might exclude areas from a map with fragile objects, pets, cables or wires, etc.

An example of a user interface may display that the user has delineated sections of the workspace to be serviced in different ways by the robotic floor-cleaning device. The user delineates four sections. The user may select the settings of the robotic floor-cleaning device within each section independently of the other sections using the user interface. In the example shown, a user uses his or her finger to manipulate the map through a touchscreen; however, various other methods may be employed depending on the hardware of the device providing the user interface.

Additionally, in some embodiments, a real-time robotic floor-cleaning device manager may be provided on the user interface to allow a user to instruct the real-time operation of the robotic floor-cleaning device regardless of the device's location within the two-dimensional map. In some embodiments, instructions may include any of turning on or off a mop tool, turning on or off a UV light tool, turning on or off a suction tool, turning on or off an automatic shutoff timer, increasing speed, decreasing speed, driving to a user-identified location, turning in a left or right direction, driving forward, driving backward, stopping movement, commencing one or a series of movement patterns, or any other preprogrammed action.

Figure 11:
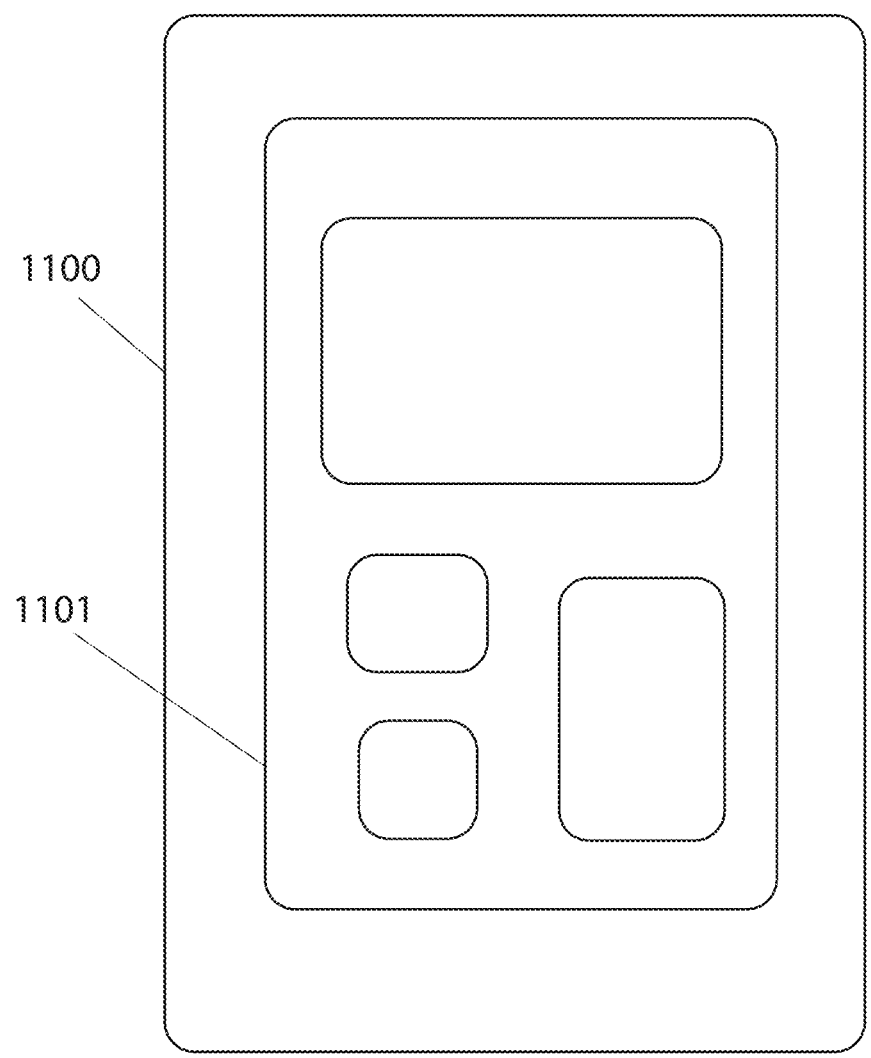
FIG. 11 illustrates an example of a communication device according to some embodiments.

In some embodiments, the application of the communication device is a downloaded application, a web application or a downloaded software. FIG. 11 illustrates an example of a communication device 1100 with graphical user interface 1101 that a user may use to adjust settings of or provide instructions to a mobile robotic chassis or pod. Communication device 1100 may be paired and communicate with a pod, robotic chassis or control system using, for example, a pairing method similar to the pair method described in U.S. patent application Ser. No. 16/109,617, the entire contents of which are hereby incorporated by reference.

In some embodiments, the application of the communication device is used to request a robotic chassis customized for transportation of pods within which persons or items are transported (e.g., FIGS. 3-10). In some embodiments, the robotic chassis is requested to meet at a location of the pod (e.g., a garage, a designated parking area, etc.). In some embodiments, persons navigate the robotic chassis from within the pod while in other embodiments, the robotic chassis autonomously navigates. In some embodiments, the mobile robotic chassis determines a navigation route using methods such as those described in U.S. patent application Ser. Nos. 16/041,286, 15/406,890, and 14/673,633, the entire contents of which are hereby incorporated by reference. In one example, the mobile robotic chassis leaves a parking area and navigates to a location of a pod, loads the pod onto the chassis, transports items or passengers within the pod to a requested drop off location, unloads the pod at a nearby pod station or at the pickup location of the pod, then navigates back to the parking area and autonomously parks. In another example, the robotic chassis leaves its designated parking area and navigates to a location of a pod, loads the pod onto the chassis from a pod station, transports passengers within the pod to a requested parking area, autonomously parks, navigates back to the pickup location of the pod, unloads the pod into the pod station, and navigates back to its designated parking area (or closest robotic chassis parking area) until requested for another task. In some embodiments, robotic chassis are permanently equipped with pods for transportation of items or persons. In some embodiments, robotic chassis load a pod along their route to a requested pickup location. In some embodiments, robotic chassis load the nearest available pod located along a route to the pickup location. In some embodiments, wherein all pods along a route to the pickup location are unavailable or nonexistent, the route is altered such that the mobile robotic chassis passes a location of the nearest available pod. In some embodiments, the application of the communication device is used to select one or more pick up or drop off locations and times, travel speed, audio level, air temperature, seat temperature, route, service schedule, service type, etc. In some embodiments, the application of the communication device provides information such as the payload, battery level, wheel pressure, windshield washer fluid level, average travel speed, current speed, average travel time, expected travel time, navigation route, traffic information, obstacle density, etc. In some embodiments, the mobile robotic chassis includes a user activated voice command such that operational commands, such as those related to direction, speed, starting and stopping, can be provided verbally to a microphone of the mobile robotic chassis.

In some embodiments, a mobile robotic chassis completes a service or task when completion of the service or task is confirmed by the application of the communication device whereby the application communicates the completion to a processor of the robotic chassis or a control system managing the robotic chassis (which then relays the information to the processor of the robotic chassis). In some embodiments, a mobile robotic chassis completes a service or task when completion of the service or task is confirmed by activating a button or switch positioned on the robotic chassis. In some embodiments, a mobile robotic chassis completes a service or task when completion of the service or task is confirmed by scanning of a barcode positioned on the robotic chassis whereby the scanner communicates the completion to a processor of the robotic chassis or a control system managing the robotic chassis (which then relays the information to the processor of the robotic chassis). In some embodiments, a processor of mobile robotic chassis or a control system managing a mobile robotic chassis autonomously detects completion of a task or service using sensors, such as imaging devices (e.g., observing position at a particular location such as tow yard), weight sensors (e.g., delivery of persons or items is complete when the weight has decreased by a particular amount), and inertial measurement units (e.g., observing coverage of roads within a particular area for tasks such as snow plowing or sweeping). In some embodiments, a processor of mobile robotic chassis or a control system managing a mobile robotic chassis autonomously detects completion of a task or service after being located at a final drop off location for a predetermined amount of time.

In some embodiments, a control system manages mobile robotic chassis (e.g., execution tasks and parking in parking areas) within an environment by monitoring and providing information and instructions to all or a portion of mobile robotic chassis. An example of such a control system that manages robotic devices is described in U.S. patent application Ser. No. 16/130,880, the entire contents of which is hereby incorporated by reference. In some embodiments, the control system receives all or a portion of sensor data collected by sensors of a mobile robotic chassis from a processor of the mobile robotic chassis and from sensors fixed within the environment. In some embodiments, sensor data includes (or is used by the control system to infer) environmental characteristics such as road conditions, weather conditions, solar conditions, traffic conditions, obstacle density, obstacle types, road type, location of perimeters and obstacles (i.e., a map), and the like. In some embodiments, sensor data includes (or is used by the control system to infer) information relating to the function and operation of a robotic chassis such as the weight of any transported item or person, number of items being transported, travel speed, wheel conditions, battery power, solar energy, oil levels, wind shield fluid levels, GPS coordinates, fuel level, distance travelled, vehicle status, etc. In some embodiments, the control system receives information for all or a portion of robotic chassis within the environment relating to a current operation being executed, upcoming operations to execute, scheduling information, designated storage or parking location, and hardware, software, and equipment available, etc. from processors of all or a portion of robotic chassis.

In some embodiments, the control system evaluates all or a portion of sensor data received and all or a portion of information pertaining to the mobile robotic chassis in choosing optimal actions for the robotic chassis. For example, a control system managing mobile robotic chassis customized to transport passenger pods receives wheel condition information indicating a tire with low pressure from a processor of a mobile robot chassis transporting passengers in a passenger pod. The control system determines that the robotic chassis cannot complete the transportation and instructs the robotic chassis to stop at a particular location and instructs another available nearby robotic chassis to load the pod and pick up the passengers at the particular location and complete the transportation. In another example, a control system instructs a processor of a mobile robotic chassis to modify its route based on continuous evaluation of traffic data received from various sensors of mobile robotic chassis and fixed sensors within the environment. In another instance, a control system instructs a processor of a mobile robotic chassis to modify its route based on continuous evaluation of road condition data received from various sensors of mobile robotic chassis and fixed sensors within the environment.

In some embodiments, the control system receives all or a portion of requests for mobile robotic chassis services from, for example, an application of a communication device paired with the control system, and instructs particular mobile robotic chassis to respond to the request. For example, the application of the communication device requests the control system to provide instructions to a mobile robotic chassis to plow a driveway at a particular location on Monday at 1 µm. In another example, the application of the communication device requests the control system to provide immediate instruction to a mobile robotic chassis to pick up an item at a provided pick up location and drop off the item at a provided drop off location and to drive at a speed of 60 km/h when executing the task. In some embodiments, the control system instructs the closest mobile robotic chassis equipped with the necessary hardware, software and equipment to complete the task or service. In some embodiments, the control system instructs mobile robotic chassis to park in a particular parking area after completion of a task. In some embodiments, the application of the communication device is used to monitor one or more robotic chassis managed by the control system. In some embodiments, the application of the communication device is used to request the control system to provide instructions to or modify settings of a particular mobile robotic chassis.

In some embodiments, a mobile robotic chassis alerts a control system when an unanticipated obstacle blocking a path of the robotic chassis is encountered, particularly when the robotic chassis cannot overcome the obstacle by maneuvering around or driving over the obstacle. In some embodiments, the processor of the robotic chassis or the control system alerts a user by sending a message to an application of a communication device paired with the robotic chassis or the control system, generating a noise, displaying a message on a screen of the robotic chassis or pod, illuminating lights, and the like. In some embodiments, the control system or the application of the communication device is used to instruct the robotic chassis to carry and transport the obstacle to a particular location and in some cases, unload the obstacle.

In some embodiments, the control system has an action queue for each mobile robotic chassis that stores a sequence of actions to be executed (e.g., drive to a particular location, load/unload a particular pod, charge battery, etc.). In some embodiments, the control system iterates in a time step manner. In some embodiments, the time step structure, in the particular case of a control system managing robotic chassis customized to transport pods, includes: checking, for running tasks, if corresponding pods are at their final destination, and if so, removing the tasks, and finding suitable robotic chassis for pods corresponding to new tasks, and adding the required actions to the suitable chassis action queues (e.g. drive to pod, load the pod, drive to final destination, and unload pod); checking the top of the action queue for all robotic chassis and if the action is to load/unload a pod, executing the action; handling special cases such as, robotic chassis with low battery level, critical battery level, or idle; computing a next action for robotic chassis that have a driving action at the top of their queue; and, checking the top of the action queue for all robotic chassis and if the action is to load/unload a pod, executing the action. In some embodiments, similar time step structure is used for robotic chassis customized for other functions.

In some embodiments, the control system uses a graph $G=(V, E)$ consisting of a set of nodes V and a set of edges E to compute the next action for a robotic chassis that has a driving action at the top of their queue. Nodes represent locations within the environment and are connected by edges, the edges representing a possible driving route from one node to another. In some embodiments, the control system uses an undirected graph wherein edges have no orientation (i.e., the edge (x, y) is identical to the edge (y, x)), particularly in cases where all roads in the environment are two-way. In some cases, not all roads are two-way (e.g. one-ways), therefore, in some embodiments, the control system uses a directed graph where directed edges indicate travel in one direction (i.e. edge (x, y) allows travel from node x to y but not vice versa). In some embodiments, the control system assigns each edge a weight corresponding to the length of the edge. In some embodiments, the control system computes the next driving action of a robotic chassis navigating from a first location to a second location by determining the shortest path in the directed, weighted graph. In other embodiments, the weight assigned to an edge depends on one or more other variables such as, traffic within close proximity of the edge, obstacle density within close proximity of the edge, road conditions, number of available charged robotic chassis within close proximity of the edge, number of robotic chassis with whom linking is possible within close proximity of the edge, etc.

In some embodiments, the control system uses the number of robotic chassis with whom linking is possible in determining the next driving action of a robotic chassis as linking multiple chassis together reduces battery consumption and travel time. Further, reduced battery consumption increases the range of the linked robotic chassis, the availability of robotic chassis, and the number of pod transfers between robotic chassis. Thus, in some situations a slightly longer (time and distance) route is preferable. In some embodiments, the control system estimates battery consumption. For example, the control system may use a discount factor $\alpha(n)$, wherein n represents the number of chassis linked. The discount factor for different numbers of linked robotic chassis may be provided below as shown below:

$$\alpha(n)=\{1, \text{ if } n=1 0.8, \text{ if } n=2 0.6, \text{ if } n=3$$

Therefore, for two robotic chassis linked together (n=2), the battery consumption of each chassis is only 80% the normal battery discharge. In some embodiments, the control system solves the optimal route for reducing battery consumption using the strong product of graph G. In other embodiments, the control system checks the vicinity of a robotic chassis for other robotic chassis navigating in a similar direction. In some embodiments, the control system links two robotic chassis if the two are located close to one another and either their destinations are located close to one another, or the destination of one robotic chassis lies close to the travel path of the other robotic chassis. In some embodiments, the control system selects the next driving action of the robotic chassis to be along the edge that results in the minimum of the sum of distances to the destination from all edges of the current node. In some embodiments, the control system instructs the robotic chassis to unlink if the next action increases the distance to the destination for either robotic chassis.

In some embodiments, the control system computes a distance table including distances between all nodes of the graph and the control system chooses moving a robotic chassis to a neighbour node of the current node that minimizes the distance to the destination as the next driving action of the robotic chassis. In some embodiments, assuming all edge lengths are equal, the control system determines if a first robotic chassis waits for a second robotic chassis to form a link if they are within a predetermined distance from one another by: checking, when the distance between the robotic chassis is zero, if there is a neighbor node for which the distances to respective destinations of both robotic chassis decreases, and if so, linking the two robotic chassis; checking, when the distance between the two robotic chassis is one edge length, if the final destination of the first robotic chassis is roughly in the same direction as the final destination of the second robotic chassis by checking if the first robotic chassis has a neighbor node towards its final destination which also decreases the distance to the destination of the second chassis, and if so, instructing the first robotic chassis to wait for the second robotic chassis to arrive at its node, the second robotic chassis to travel to the node of the first robotic chassis and both robotic chassis to link; and, checking, when the distance between the two robotic chassis is two edge lengths, if the first robotic chassis is located along a path of the second robotic chassis, and if so, instructing the first robotic chassis to wait for the second robotic chassis to arrive at its node and both robotic chassis to link.

Figure 12:
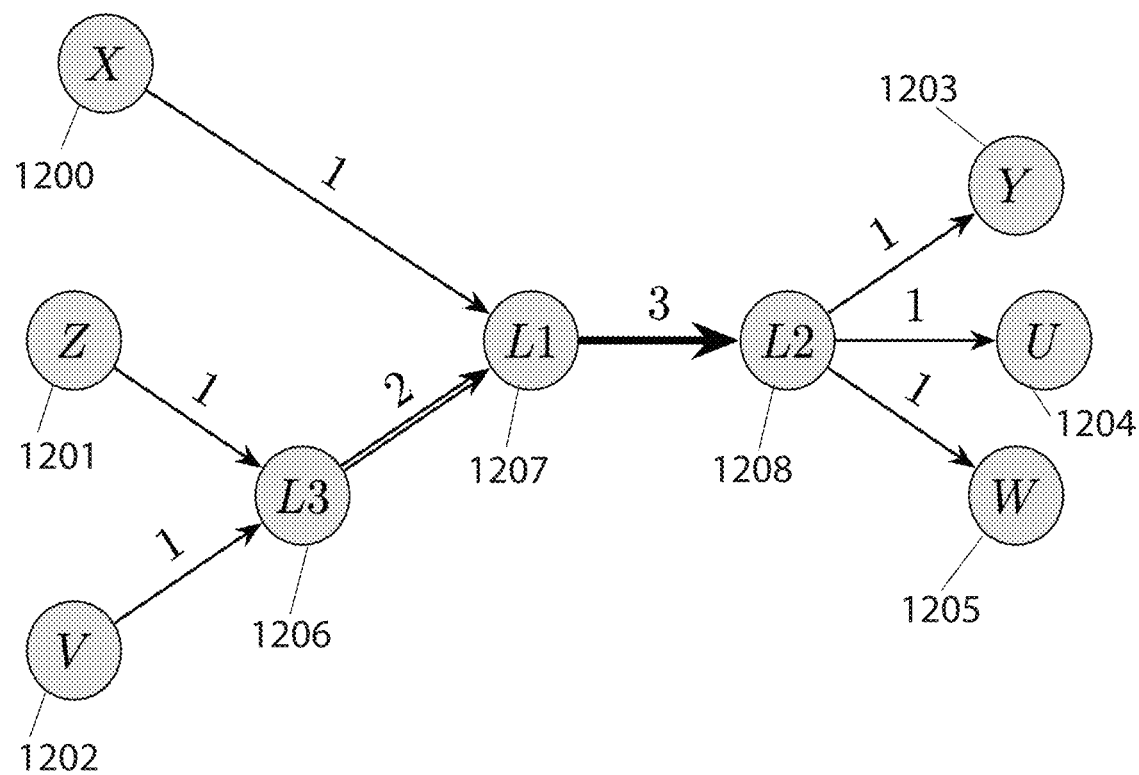
FIG. 12 illustrates an example of mobile robotic chassis paths when linking and unlinking together according to some embodiments.

In some embodiments, the control system specifies the route of a mobile robotic chassis by a list of nodes that each robotic chassis passes to reach its final destination. In some embodiments, the control system chooses edges between nodes with shortest length as the driving path of the robotic chassis. In some embodiments, the control system composes route plans of robotic chassis such that they share as many edges as possible and therefore can link for travelling along shared driving paths to save battery and reduce operation time. For example, a first robotic chassis drives from node X to node Y via nodes L1 and L2 and a second robotic chassis drives from node Z to node U via nodes L1 and L2. In this example, the first and second robotic chassis link at node L1, drive linked along the edge linking nodes L1 and L2, then unlink at node L2 and the first robotic chassis drives to node Y while the second robotic chassis drives to node U. FIG. 12 illustrates paths of three robotic chassis initially located at nodes 1200 (X), 1201(Z), and 1202 (V) with final destination at nodes 1203 (Y), 1204 (U), and 1205 (W), respectively. The robotic chassis initially located at nodes 1201 (Z) and 1202 (V) link at node 1206 (L3) and travel linked to node 1207 (L1). At node 1207 (L1), the robotic chassis initially located at node 1200 (X) links with them as well. All three linked robotic chassis travel together to node 1208 (L2), at which point the three robotic chassis become unlinked and travel to their respective final destinations.

In some embodiments, the control system minimizes a cost function to determine a route of a robotic chassis. In some embodiments, the cost function accounts for battery consumption and time to reach a final destination. In some embodiments, the control system may determine the cost C(S) of travelling along route S using:

$$C(S) = \sum_{(x \to y) \in S} c(x \to y) + \beta \sum_{i\, chassis} \Delta t_i$$

$$c(x \to y) = n\alpha(n)d(x, y)\gamma$$

wherein c(x→y) is the cost of travelling along an edge from a first node x to a second node y, n is the number of chassis linked together, α(n) is the discount factor for battery discharge, d(x, y) is the length of the edge, y is a constant for battery discharge per distance unit, β is a weight, $\Delta t_i$ is the time difference between the time to destination for linked chassis and the individual chassis i. In some embodiments, the control system uses individual weights $\beta_i$ with values that, in some instances, are based on travel distance. In some embodiments, the control system uses non-linear terms in the cost function. In some embodiments, the control system minimizes the cost function C(S).

In some embodiments, the control system initially chooses a route and identifies it as a current route. In some embodiments, the control system evolves the current route, and if the evolved route has a smaller cost than the current route, the evolved route becomes the current route and the previous current route is discarded. In some embodiments, the evolution of a route includes: merging driving segments of robotic chassis by finding overlaps in driving segments in a current route graph and identifying nodes where robotic chassis can link and drive the overlapping segment together and unlink; unlinking segments when, for example, a new robotic chassis begins a task nearby and splitting the robotic chassis into two groups provides more efficient routing; and, considering neighbouring nodes of start and end nodes of segments as the start and end nodes of the segments to determine if the cost lowers. In some embodiments, the control system iterates through different evolved routes until a route with a cost below a predetermined threshold is found or for a predetermined amount of time. In some embodiments, the control system randomly chooses a route with higher cost to avoid getting stuck in a local minimum.

Figure 13A:
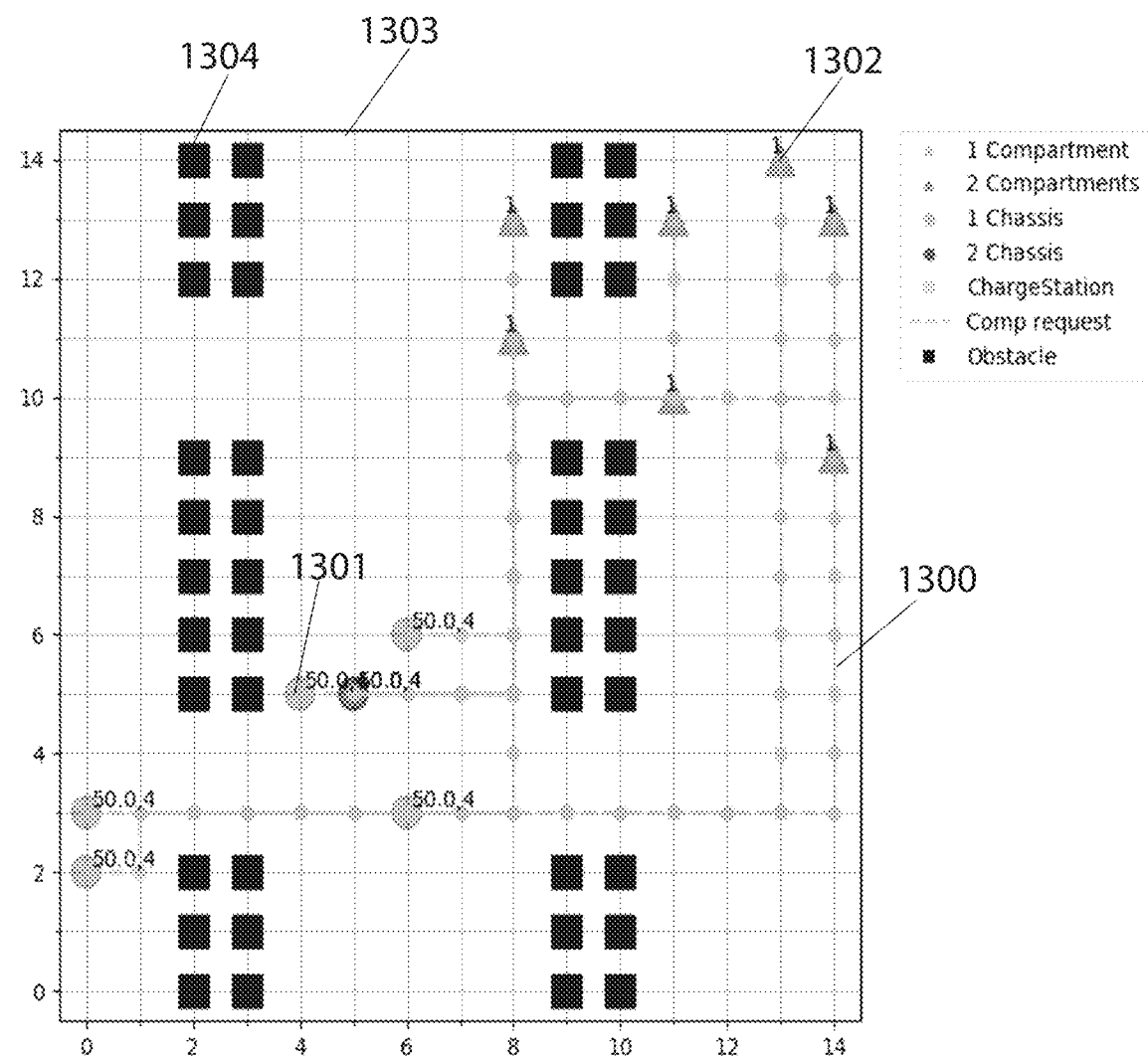
FIGS. 13A and 13B illustrate results of method for finding matching route segments between two robotic chassis according to some embodiments.
Figure 13B:
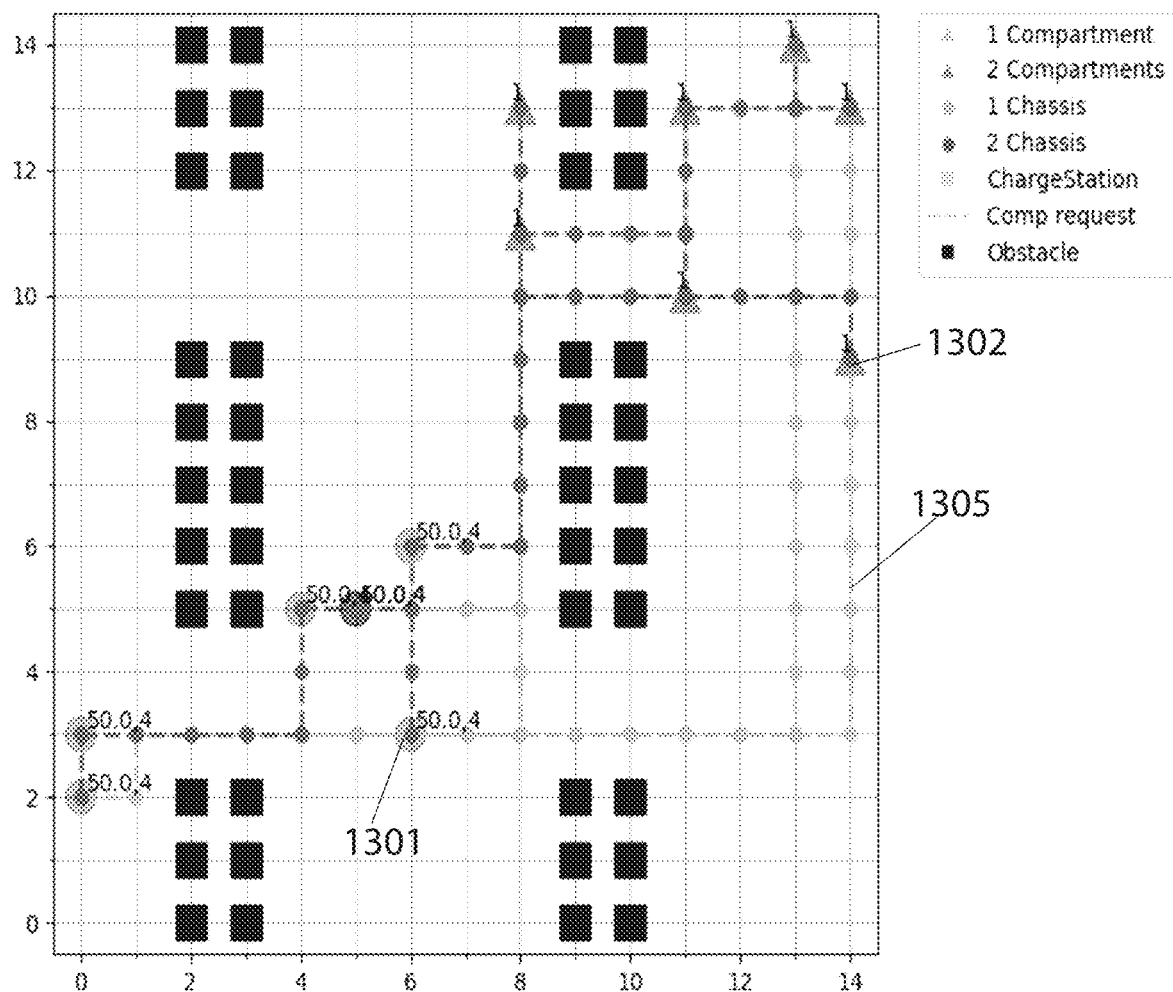

In some embodiments, the control system identifies if a pair of route segments (e.g., X→U, Y→V) match by computing an estimated cost of combined routing, and subtracting it from the cost of individual routing. The larger the difference, the more likely that the segments overlap. In some embodiments, the control system merges the route segments if the difference in combined routing and individual routing cost is greater than a predetermined threshold. In some embodiments, the estimated cost of combined routing is calculated as the minimum cost of four routing paths (e.g., X→Y→U→V; X→Y→V→U; Y→X→U→V; Y→X→V→U). FIGS. 13A and 13B illustrate an example of the implementation of the described method for matching route segments. FIG. 13A illustrates individual routes 1300 of seven robotic chassis 1301 from their current position to seven pods 1302 within environment 1303 with obstacles 1304 while FIG. 13B illustrates the updated routes 1305 to pods 1302 of robotic chassis 1301 including segments where robotic chassis are linked based on matching route segments identified using the approach described. In some embodiments, the control system identifies matching route segments of robotic chassis without pods and evaluates stacking those pods during navigation along matching route segments to minimize occupied space. In some embodiments, the control system uses a cost function to evaluate whether to stack robotic chassis. In some embodiments, the control system evaluates stacking idle robotic chassis without pods. In some embodiments, robotic chassis navigate to a stacking station to be stacked on top of one another. In some embodiments, the stacking station chosen is the stacking station that minimizes the total distance to be driven by all robotic chassis to reach the stacking station.

In some embodiments, an individual robotic chassis among a group of robotic chassis all driving along a same path is designated as a leader vehicle while the remaining robotic chassis in the group are designated follower vehicles. In some embodiments, the follower vehicles establish a connection with the leader vehicle and the leader vehicle provides intelligence to the follower vehicles. In some embodiments, the follower vehicles mimic the actions of the leader vehicle while within the driving group to automate driving of vehicles driving along the same path. An example of a method to automate driving of robotic devices driving along a same path is described in U.S. patent application Ser. No. 14/948,620, the entire contents of which is hereby incorporated by reference.

Figure 14:
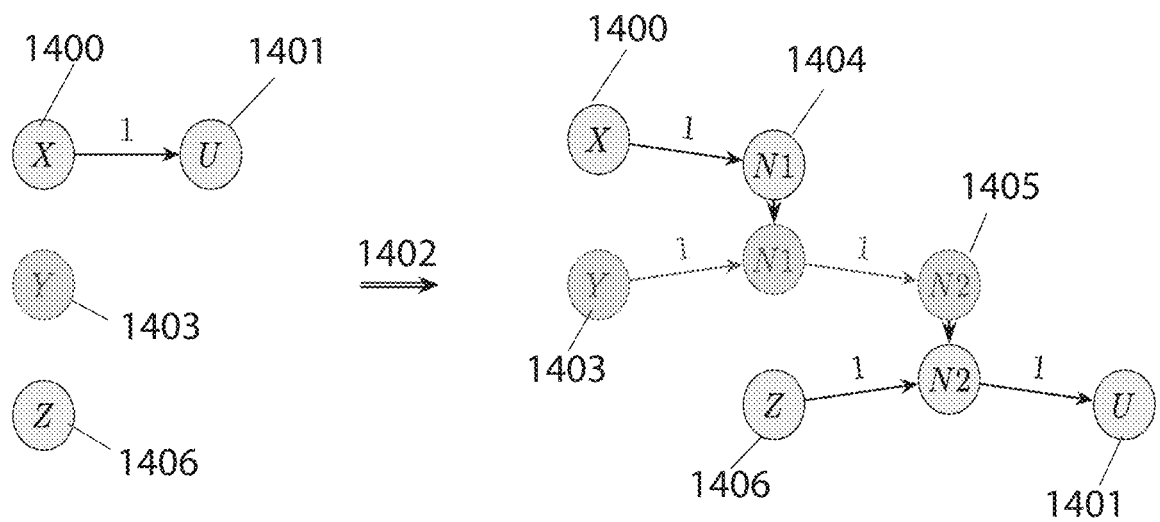
FIG. 14 illustrates an example of mobile robotic chassis paths when transferring pods between one another according to some embodiments.

In some embodiments, the control system evaluates switching robotic chassis by transferring a pod from one robotic chassis to another during execution of a route as different robotic chassis may have different routing graphs, different nodes and edges (e.g., highways that may only be entered by certain robotic chassis), etc. that may result in reducing the overall route cost. In some embodiments, the control system evaluates switching robotic chassis during the route evolution step described above. For example, a first set of slower robotic chassis operate using routing graph G1=(V1, E1) and a second set of fast highway robotic chassis operate using routing graph G2=(V2, E2). In this example, at least the edge weights of G1 and G2 are different, otherwise there is no advantage in choosing a robotic chassis from either set of robotic chassis. Also, there is a subset N=V1∩V2 of nodes which are in both G1 and G2 and are accessible to both types of robotic chassis. These nodes serve as locations where pods can switch from one type of robotic chassis to the other. In FIG. 14, a slower robotic chassis from the first set of robotic chassis transports a pod from a location 1400 (X) to a location 1401 (U). During the route evolution step 1402, the control system identifies a close by faster robotic chassis from the second set of robotic chassis located at 1403 (Y) and a nearby transfer node 1404 (N1∈N). The control system evolves 1402 the route such that at 1404 (N1), the pod transfers from the slower robotic chassis to the faster robotic chassis. The faster robotic chassis drives the pod from 1404 (N1) to 1405 (N2∈N), then the pod transfers to another slower robotic chassis coming from a location 1406 (Z) that transports the pod to its final destination 1401 (U). In some embodiments, the pod is loaded and unloaded using mechanisms described above.

In some embodiments, the control system chooses two or more robotic chassis to complete a task during the first step of the time step structure described above wherein the control system checks, for running tasks, if corresponding pods are at their final destination, and if so, removes the tasks, and finds suitable robotic chassis for pods corresponding to new tasks, and adds the required actions to the suitable chassis action queues (e.g. drive to pod, load the pod, drive to final destination, and unload pod). In some embodiments, the control system uses other methods for choosing two or more chassis to completion of a task such as Multi-Modal Bellmann-Ford or Multi-Modal Dijkstra algorithms.

In some embodiments, the control system chooses the best robotic chassis for a task by evaluating a battery level of the robotic chassis, a required driving distance of the task, and a distance of the robotic chassis to the pickup location. In some embodiments, the control system assigns an idle chassis to a task by: determining a score for each robotic chassis in the environment having at least 50% battery power by calculating the distance of the robotic chassis to the pod; determining for each of the robotic chassis if their battery level is sufficient enough to complete the full task (e.g., driving the distance to the pod, then from the pod to the final destination), and, if so, subtracting three (or another reasonable number) from their score; and, choosing the robotic chassis with the lowest score. In this way, a closer robotic chassis scores better than a further robotic chassis, and a robotic chassis with enough charge to complete the task scores higher than a robotic chassis with not enough charge. In other embodiments, the control system evaluates other variables in determining the best robotic chassis for a task. In some embodiments, the control system chooses the best robotic chassis for a task during the first step and/or the route evolution step of the time step structure described above.

Figure 15:
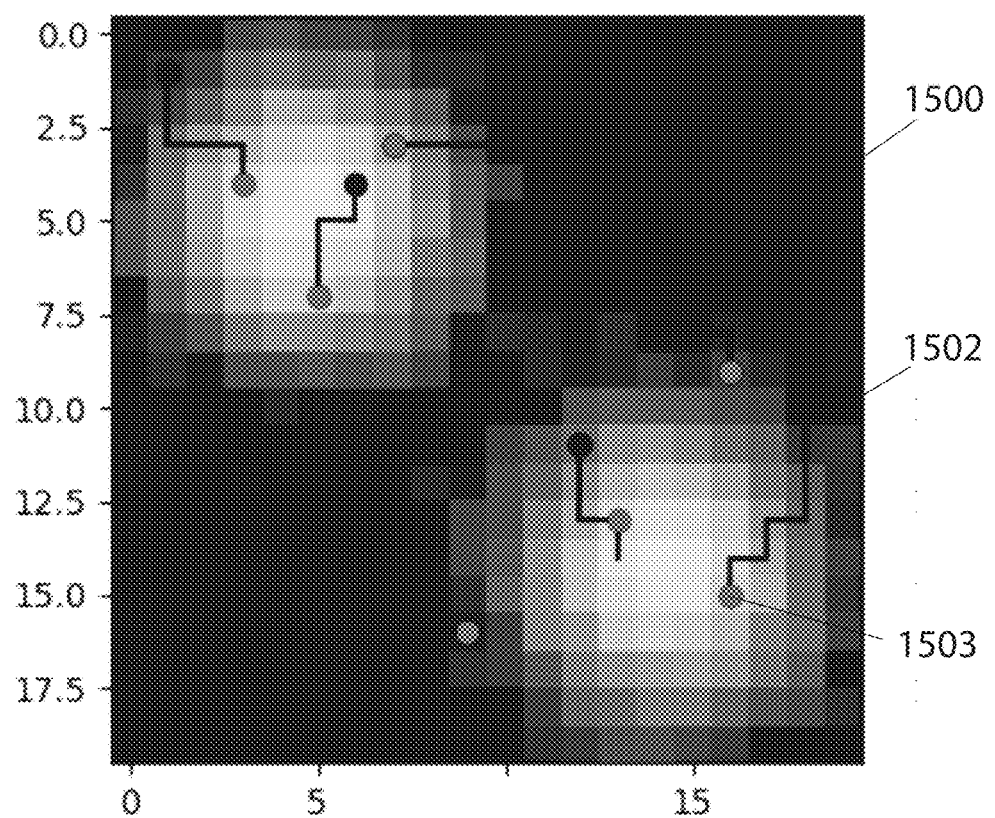
FIG. 15 illustrates how pod distribution changes after minimization of a cost function according to some embodiments.
Figure 15:
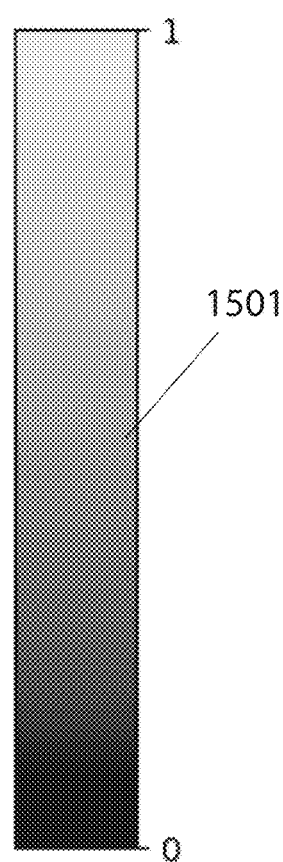

In some embodiments, the control system distributes robotic chassis throughout the environment based on, for example, demand within different areas of the environment. In some embodiments, wherein an abundance of robotic chassis exists, the control system positions a robotic chassis close to every pod, has excess robotic chassis that are fully charged distributed throughout the environment, and immediately transfers pods from low battery robotic chassis to fully charged robotic chassis. In some embodiments, the control system may distribute robotic chassis throughout the environment using the cost function:

$$C(x, p) = \sum_{N_i} p_i d(N_i, x_i)$$

wherein $N_i$ is a node in the routing graph, $p_i$ is the probability that a task will start from node $N_i$ at the next time frame, and $d(N_i, xi)$ is the distance of the closest available robotic chassis from the node $N_i$, assuming there are n idle robotic chassis at positions xi. The control system determines distribution of the robotic chassis by minimizing the cost function. For example, FIG. 15 illustrates results of minimizing the cost function to determine optimal distribution of seven idle robotic chassis within environment 1500. The color of the graph corresponds to the probability that a task will start from the particular node of the graph at the next time frame indicated by the colors on scale 1501. Darker dots 1502 represent initial position of idle robotic chassis and lighter dots 1503 represent their position after minimization of the cost function. After optimization, idle robotic chassis are closer to areas with nodes having a higher probability of a task starting.

In some embodiments, the processors of mobile robotic chassis collaborate by exchanging intelligence with one other, the information relating to, for example, current and upcoming tasks, completion or progress of tasks (particularly in cases where a task is shared), delegation of duties, preferences of a user, environmental conditions (e.g., road conditions, traffic conditions, weather conditions, obstacle density, etc.), battery power, maps of the environment, and the like. For example, a processor of a mobile robotic chassis transmits traffic conditions to processors of nearby mobile robotic chassis with whom a connection has been established such that the nearby mobile robotic chassis can avoid the high trafficked area. In another example, a processor of a mobile robotic chassis unable to complete garbage pickup of an area due to low battery level communicates with a processor of another nearby mobile robotic chassis capable of performing garbage pickup, providing the mobile robotic chassis with current progress of the task and a map of the area such that it may complete the task. In some embodiments, processors of mobile robotic chassis exchange intelligence relating to the environment (e.g., environmental sensor data) or results of historical actions such that individual processors can optimize actions at a faster rate. For example, processors of mobile robotic chassis share depth data of objects within an environment to collaboratively build a map of the environment, as is described in U.S. patent application Ser. No. 16/185,000, the entire contents of which is hereby incorporated by reference. In some embodiments, processors of mobile robotic chassis collaborate to complete a task. In some embodiments, mobile robotic chassis collaborate using methods such as those described in U.S. patent application Ser. Nos. 15/981,643, 15/986,670, and 15/048,827, the entire contents of which are hereby incorporated by reference.

Some of the embodiments described herein provide processes and systems for collaborative construction of a map, floor plan, spatial model, or other topographical representation of an environment using data collected by sensing devices, such as cameras, depth measurement devices, LIDARs, sonars, or other sensing devices, mounted on autonomous or semi-autonomous vehicles, such as automobiles and robotic devices, operating within the environment and/or fixed sensing devices monitoring the environment. Other types of depth sensing devices, such as at least one IR illuminator combined with at least one imaging device and an image processor, can used to measure depth to objects in the environment. Cameras such as depth cameras, stereo vision cameras, and digital cameras can also be used. In some embodiments, at least one depth measurement device and at least one camera are installed on, for example, an autonomous vehicle. A vehicle in this context can be thought of as any non-living mode of transportation. Examples of vehicles include automobiles, robotic devices, all-terrain vehicles, planetary vehicles, carts, hovercraft, drone, etc. The depth measurement device takes depth readings from the depth measurement device to objects within its field of view while the camera captures visual readings within its field of view. As the autonomous vehicle moves within the environment, the depth measurement device takes depth readings from the depth measurement device to objects within its field of view while the camera captures visual readings of the environment within its field of view. In some embodiments, the line of sight of the at least one camera is parallel to the plane on which the autonomous vehicle moves and in other embodiments, the line of sight of the camera is at an angle to the plane on which the autonomous vehicle moves. In some embodiments, the depth measurement device takes depth readings within a 360-degree field of view of a two-dimensional plane. In other embodiments, the depth measurement device takes depth readings within a limited field of view of a two-dimensional plane, such as a 90-degree or 180-degree field of view. In some embodiments, the depth measurement device takes depth readings in three-dimension. At the same time, depth measurement devices and cameras installed on, for example, other autonomous vehicles operating within the same environment, take depth readings and capture visual readings within their respective fields of view. A processor of each autonomous vehicle shares depth readings and visual readings taken by their respective at least one depth measurement device and at least one camera, respectively, with all or a select group of other autonomous vehicles operating within the same environment with whom a wireless data transfer channel (DTC) is established. Processors of fixed sensing devices monitoring the environment and sensory devices that have previously operated within the same environment also share their readings. In some instances, a processor of an autonomous vehicle shares data from a previously constructed map of the environment. If applicable, as in the case of depth readings, for example, the processor of an autonomous vehicle adjusts data received from another processor of an autonomous vehicles based on its location with respect to the location of the autonomous vehicle sending the data. In some embodiments, sensors mounted on autonomous vehicles rotate (or otherwise scan, e.g., horizontally and vertically) independently of the vehicle. In such cases, the processor of the autonomous vehicle receiving the depth readings uses the position of its mounted sensor in relation to the position of the mounted sensor of the autonomous vehicle sending the depth readings to adjust the depth readings received.

To form a larger field of view, the sensory devices of each autonomous vehicle collects readings and its processor stores the readings and uses them to create a larger field of view map by combining overlapping readings taken within separate fields of view, using overlapping readings as attachment points. The processor of an autonomous vehicle can identify overlap in multiple ways. In some embodiments, the readings from a first field of view are compared with readings from a second field of view. An area of overlap between the two fields of view is identified (e.g., determined) when (e.g., during evaluation a plurality of candidate overlaps) a number of consecutive (e.g., adjacent in pixel space) readings from the first and second fields of view are equal or close in value. Although the value of overlapping readings from the first and second fields of view may not be exactly the same, readings with similar values, to within a tolerance range of one another, are identified (e.g., determined to correspond based on similarity of the values). For example, if a sonar and laser distance sensor produce similar outputs to within a tolerance range, the processor infers that the distances measured were to the same obstacles within the environment and combines the two sets of readings using the similar readings as connecting points. In some embodiments, the processor identifies overlap by recognizing similar patterns between two sets of readings. For example, if the processor identifies the same sequence of pixel values in two images, the processor infers that both images captured the same location within the environment and combines them at overlapping points. In some embodiments, the processor identifies patterns by taking the rate of change of readings for both sets of data and comparing them to find similar patterns in the rate of change. For example, if the processor compares the color depth of two images and they are both observed to have the greatest rates of change in similar locations, the processor hypothesizes that the two images have overlapping data points. In another example, the processor identifies the area of overlap between two sets of readings by detecting a sudden increase then decrease in the values of two sets of readings. Examples include applying an edge detection algorithm (like Haar or Canny) to readings from the different fields of view and aligning edges in the resulting transformed outputs. Other patterns, such as increasing values followed by constant values or constant values followed by decreasing values or any other pattern in the values of the readings, can also be used to estimate the area of overlap. In some embodiments, a Jacobian and Hessian matrix can be used to identify such similarities. In other embodiments, the processor identifies overlap through the detection of similar features found in both sets of readings. For example, if the processor detects a unique sign in two images the processor infers that both images were taken at the same place and overlap. In some embodiments, where images of the environment are captured, the processor stitches images together at overlapping features or pixels of a pixmap of the images. In some embodiments, the processor uses features such as edges, circles, curves, lines or other shapes to identify overlap between images. For example, a sign captured in an image from two different perspectives contains enough overlapping features to combine the two images and create a 3D field of view. In some embodiments, the processor uses a convoluted neural network to identify certain features in an image and connecting points between multiple images. This is particularly useful when, for example, images are captured from different distances causing the environment to appear differently in each of the images captured. In some embodiments, the processor uses thresholding to identify the area of overlap between two sets of readings wherein areas or objects of interest within an image are identified using thresholding as different areas or objects have different ranges of pixel intensity. For example, an object captured in an image, the object having high range of intensity, can be separated from a background having low range of intensity by thresholding wherein all pixel intensities below a certain threshold are discarded or segmented, leaving only the pixels of interest. In some embodiments, the processor uses a metric, such as the Szymkiewicz-Simpson coefficient, to indicate how good of an overlap there is between two sets of readings.

Or some embodiments determine an overlap with a convolution. Some embodiments implement a kernel function that determines an aggregate measure of differences (e.g., a root mean square value) between some or all of a collection of adjacent readings in one image relative to a portion of the other image to which the kernel function is applied. Some embodiments then determine the convolution of this kernel function over the other image, e.g., in some cases with a stride of greater than one pixel value. Some embodiments then select a minimum value of the convolution as an area of identified overlap that aligns the portion of the image from which the kernel function was formed with the image to which the convolution was applied.

When the processor of each autonomous vehicle receives new readings from a remote source (i.e. another autonomous vehicle and/or fixed sensing device monitoring the environment), it stores those readings in a memory of the autonomous vehicle and checks if the received readings overlap with readings in its map. The processor uses similar methods for identifying overlap between readings from a remote source and a local source or two sets of readings from two remote sources as those described above for identifying overlap between two sets of local readings. In some embodiments, the confidence level of the readings from a local source have higher confidence level than readings received from remote sources or vice versa. In some embodiments, the processor assigns readings from different sources different confidence levels. To check for overlap, the processor considers multiple variations of combinations, each having different overlap, in order to filter through the data, determine if and where there is overlap, and if so, the combination which results in readings with the highest confidence level. If the processor identifies a combination which results in readings with higher confidence level, the processor implements the combination into the map, otherwise the processor stores the received readings for future combinations. For example, if the processor of an autonomous vehicle receives a set of readings from a remote source which has a number of consecutive readings with values similar to the same number of consecutive readings within the map of the autonomous vehicle, the processor combines the readings and if their combination results in readings with a higher confidence level the processor implements the combination into the map. If a third set of readings happens to overlap with the two sets of readings as well, the processor considers multiple variations of combinations between the three sets of data, and if the processor finds a combination which results in readings with higher confidence level, the processor will implement it into the map. In some embodiments, prior to combining two or more sets of data observed within separate fields of view, such as two or more sets of overlapping depth readings or visual readings observed within different fields of view, the processor calculates a probability of overlap between the two or more sets of data for multiple versions of combination between the two or more sets of data, each combination having a different area of overlap between the sets of data. In one embodiment, the processor uses the overlap with highest probability of overlap for stitching the two or more sets of data together. In other embodiments, the processor does not combine two or more sets of data having a probability of overlap below a specified threshold.

In some embodiments, raw data is provided in matrix form or in an ordered list (which is not to suggest that matrices cannot be encoded as ordered lists in program state). When a processor directly uses the raw data of a sensor, extra steps are bypassed and the processor uses raw values and relations between the raw values to perceive the environment and construct the map directly without converting raw values to depth measurements with metric or imperial units prior to inference of the map (which may include inferring or otherwise perceiving or measuring a subset of a map, like inferring a shape of a piece of furniture in a room that is otherwise mapped with other techniques). For example, in some embodiments, where at least one camera coupled with at least one IR laser is used in perceiving the environment, a processor infers depth based on the position and/or geometry of the projected IR light in the image captured. For instance, some embodiments infer map geometry (or features thereof) with a trained convolutional neural network configured to infer such geometries from raw data from a plurality of sensor poses. Some embodiments apply a multi-stage convolutional neural network in which initial stages in a pipeline of models are trained on (and are configured to infer) a coarser-grained spatial map corresponding to raw sensor data of a two-or-three-dimensional scene and then later stages in the pipeline are trained on (and are configured to infer) finer-grained residual difference between the coarser-grained spatial map and the two-or-three-dimensional scene. Some embodiments include three, five, ten, or more such stages trained on progressively finer-grained residual differences relative to outputs of earlier stages in the model pipeline. In some cases, objects are detected and mapped with, for instance, a capsule network having pose invariant representations of three dimensional objects. In some cases, complexity of exploiting translational invariance is reduced by leveraging constraints where the robot is confined to two dimensions of movement, and the output map is a two dimensional map, for instance, the capsules only account for pose invariance within a plane. The processor uses a digital image from the camera to detect the position and/or geometry of IR light in the image by identifying pixels with high brightness (or outputs of transformations with high brightness, like outputs of edge detection algorithms). The processor uses the raw data directly in perceiving the surroundings and constructing a map of the environment. The processor uses the raw pixel intensity values to determine the area of overlap between data captured within overlapping fields of view to combine data and construct a map of the environment. In the case of two overlapping images, the area in which the two images overlap contain similar arrangement of pixel intensities in at least a portion of the digital image. The processor detects this similar arrangement of pixels and stitches the two overlapping images at overlapping points to create a segment of the map of the environment without processing the raw data into depth measurements.

In some embodiments, the processors of mobile robotic chassis (or a processor of a mobile robotic chassis and a control system) authenticate one another and establish a bond prior to collaborating (e.g., sharing data to collaboratively build a map, sharing data to complete a task, sharing data to autonomously park, etc.) using methods such as those described in U.S. patent application Ser. Nos. 15/981,643, 15/986,670, and 15/048,827, the entire contents of which are hereby incorporated by reference.

In some embodiments, versatile mobile robotic chassis retreat to a designated parking area until requested for a particular function or task or after completing a particular function or task. For example, a mobile robotic chassis requested for pickup of persons (e.g., using an application of a communication device) autonomously traverses an environment from a parking area to a pickup location and transports the persons to a drop off location (e.g., specified using the application of the communication device). After completing the service, the mobile robotic chassis traverses the environment from the drop off location to the nearest parking area or to a designated parking area or to another requested pickup location. The mobile robotic chassis enters a parking area and autonomously parks in the parking area.

Figure 16:
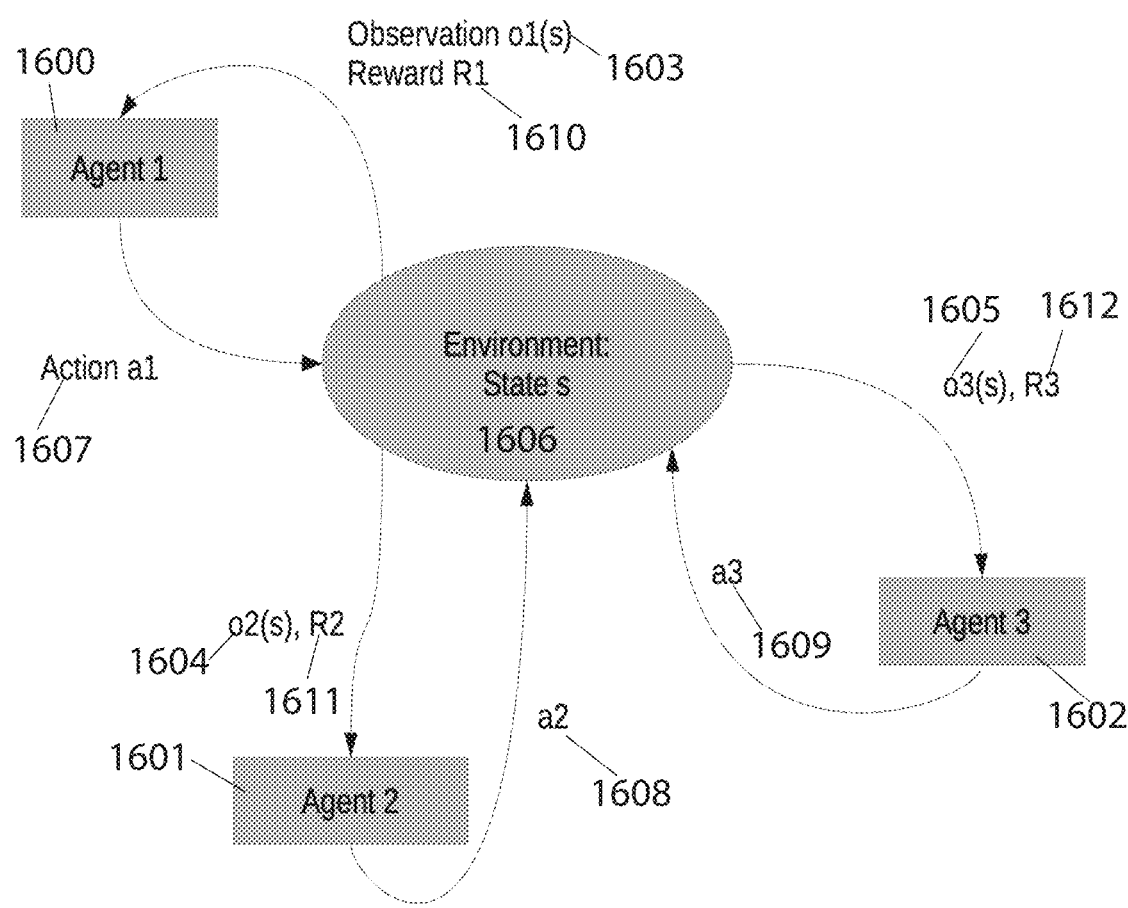
FIG. 16 illustrates an example of a multi-agent partially observable MDP according to some embodiments.

Some embodiments provide a method for autonomous parking of mobile robotic chassis. In some embodiments, the processors of mobile robotic chassis each partially observe an environment (e.g., parking area). In some embodiments, the processors of mobile robotic chassis collaborate to achieve a common goal of maximizing their performance in parking by, for example, reducing time to exit from a parking area and reducing the amount of driving within the parking area before exiting. In some embodiments, a control system (as opposed to individual processors of robotic chassis) such as the ones described and referenced to above manages all or a portion of the autonomous parking of robotic chassis in a parking area. In some embodiments, the processors of mobile robotic chassis may use a multi-agent partially observable Markov Decision Process (MDP) to maximize their performance in autonomously parking. In some embodiments, the processors represent their respective partial observation of the environment by $o^{(i)}=o^{(i)}(S)$ wherein S is the full state of the environment. FIG. 16 illustrates an example of a multi-agent partially observable MDP wherein each robotic chassis 1600, 1601, and 1602 with partial observation 1603, 1604, and 1605, respectively, interacts with environment 1606 represented by full state S by performing actions 1607, 1608, and 1609 and receiving rewards 1610, 1611, and 1612, respectively. Environment 1606 transitions from one state S to another given an action, such as actions 1607, 1608, and 1609. In this example, the full state S comprises the combined states s of each mobile robotic chassis in the parking area at a given time, and a new state of the environment is determined based on the action of each mobile robotic chassis.

In some embodiments, a map of the parking area is stored in the memories of the mobile robotic chassis. In some embodiments, the processors of mobile robotic chassis collaboratively or independently build and update a map of the parking area (and in some cases areas beyond the parking area) using methods such as those described in U.S. patent application Ser. Nos. 16/048,179, 16/048,185, 16/163,541, 16/163,562, 16/163,508, 16/185,000, 62/681,965, and 62/614,449, the entire contents of which are hereby incorporated by reference. In some embodiments, some mobile robotic chassis have a map of the parking area stored in memory and some mobile robotic chassis build a map of the parking area (and in some cases areas beyond the parking area).

Figure 17:
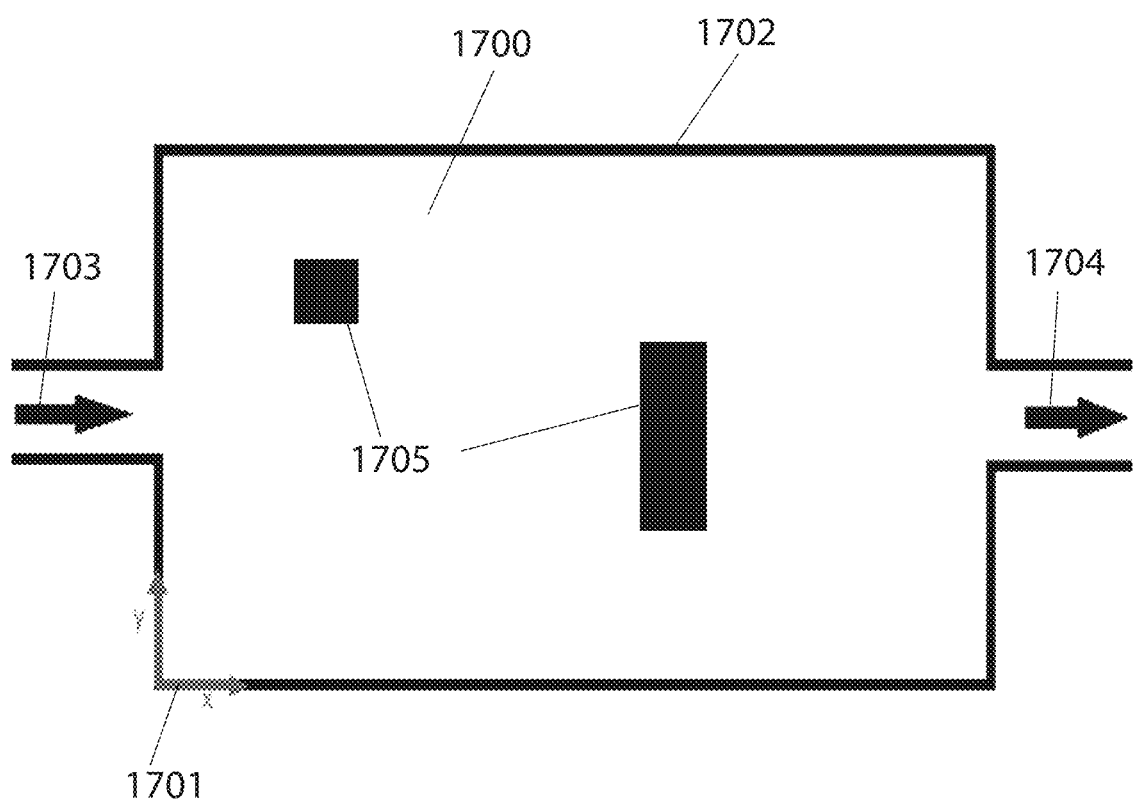
FIG. 17 illustrates an example of a parking area according to some embodiments.

In some embodiments, the map of the parking area includes at least a global coordinate system such that positions of mobile robotic chassis with respect to the global coordinate system is known, the boundaries (e.g., walls), entry and exit points, and any obstacles present within the parking area. In some embodiments, processors of mobile robotic chassis determine the total space available for driving within the parking area using the map. In some embodiments, processors of mobile robotic chassis use localization methods such as those described in U.S. patent application Ser. Nos. 62/746,688, 62/740,573, 62/740,580, 15/955,480, 15/425,130, and Ser. No. 15/955,344, the entire contents of which are hereby incorporated by reference, to determine their position within the parking area with respect to a coordinate system. FIG. 17 provides an example of a map of parking area 1700 with coordinate system 1701, boundaries 1702, entry point 1703, exit point 1704, and obstacles 1705. In some embodiments, processors of mobile robotic chassis create the map of the parking area using method referred to above. In some embodiments, processors of mobile robotic chassis collaboratively create the map of the environment using methods referred to above.

Figure 18:
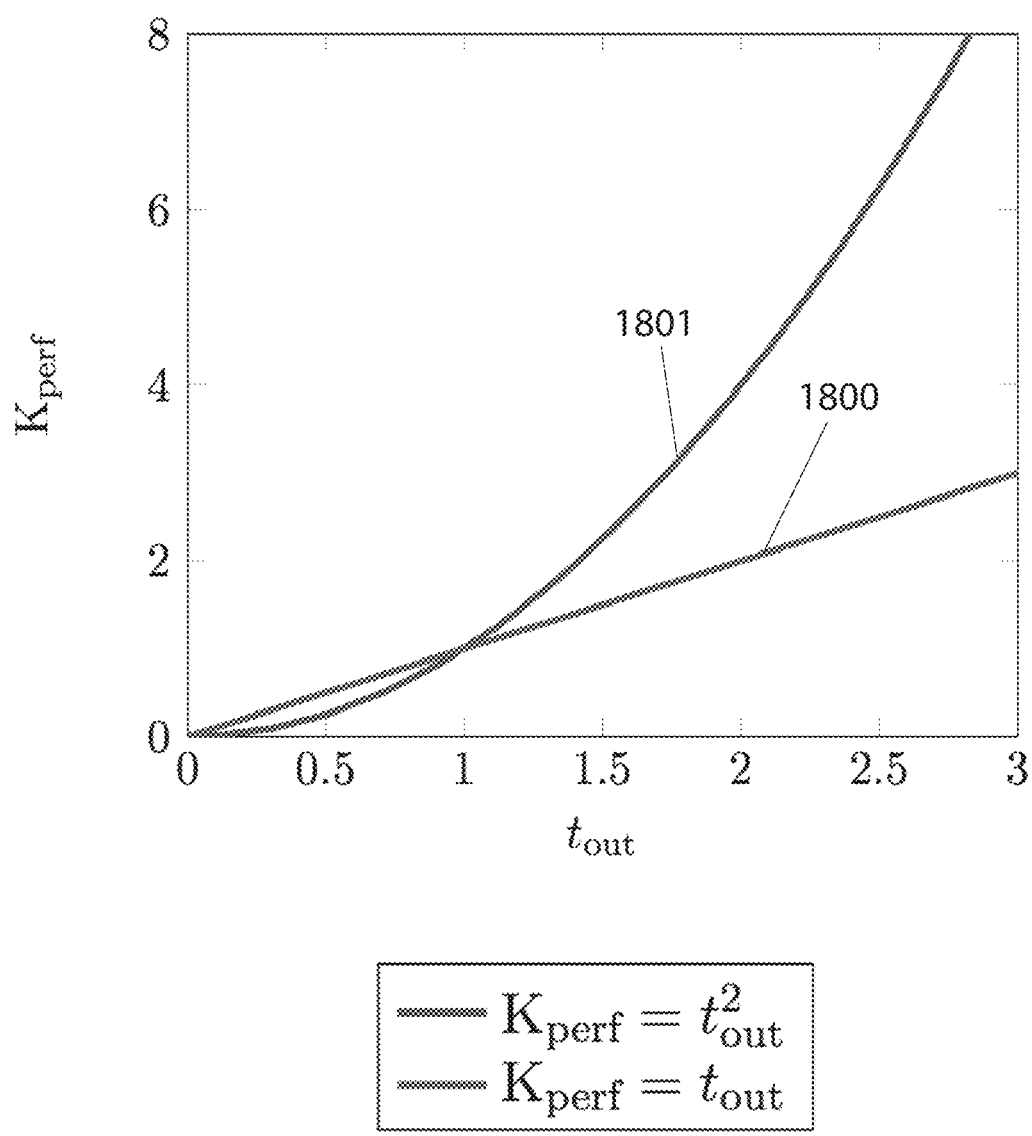
FIG. 18 illustrates an example of how a performance metric changes with increasing time to exit a parking area according to some embodiments.

In some embodiments, the processors represent the state of all mobile robotic chassis and the full state of the environment using $S=[s^{(1)}, s^{(2)}, \ldots, s^{(N)}]$ wherein N is the number of mobile robotic chassis and $s^{(i)}$ denotes the state of robotic chassis i (e.g., position, velocity, etc.). S identifies the situation in the parking area at any point in time. In some embodiments, the processors of mobile robotic chassis measure parking performance $K_{perf}$ using a linear metric wherein variables affecting performance (e.g., distance driven to exit, total time to exit, time to receive notification to exit, time to exit after receiving notification to exit, etc.) are linearly combined and are each weighted based on their importance to parking performance. For example, in some embodiments, processors calculate their parking performance $K_{perf}$ by summating $K_{perf}^{(i)}$ of each robotic chassis and dividing it by the number of robotic chassis. In some embodiments, processors determine their parking performance using non-linear metrics wherein the function $K_{perf}^{(i)}$ includes non-linear terms. For example, processors square time to exit such that time contributes quadratically and penalizes large exit times more severely. FIG. 18 illustrates $K_{perf}$ plotted against linear measure $t_{out}$ 1800 and quadratic measure $t_{out}$ 1801. For $t_{out}<1$, the difference in $K_{perf}$ is minimal, however, for $t_{out}>1$, $K_{perf}$ grows a lot faster for the quadratic measure and, as time increases, the penalty incurred becomes larger and larger whereas the penalty for the linear measure grows as a constant rate. In other embodiments, parking performance may be calculated using the worst metric recorded among all vehicles. For example, $K_{perf}$ may be calculated by summating worst recorded time to exit and distance driven to exit.

In some embodiments, processors of mobile robotic chassis assign a reward incrementally over time or at the end of the parking session (e.g., when the mobile robotic chassis exits the parking area). In some embodiments, the total reward for all mobile robotic chassis may be the sum of all the individual rewards of the mobile robotic chassis. For example, processors each assign a reward to their respective mobile robotic chassis for each time step using:

$$r^{(i)}(s^{(i)}, a^{(i)}) = \omega_1 \Delta_{dist} + \omega_2 (t_n^{(i)} - t_{exitcall}^{(i)})$$

wherein $t_{exitcall}^{(i)}$ is time of a user requesting the car to exit, and $\Delta_{dist}$ is the distance that the car has driven due to action $a^{(i)}$. The total reward of all autonomous vehicles may be then:

$$R_{sum}(S, A) = \sum_{i=1}^{N} r^{(i)}(s^{(i)}, a^{(i)})$$

In some embodiments, processors of robotic chassis train themselves on making decisions that maximize the reward using deep reinforcement learning. In some embodiments, processors used a deep Q-network with either a convolutional neural network or standard neural network. In some embodiments, processors of mobile robotic chassis collaborate to decide on the next actions to execute. In some embodiments, the collaboration process includes processors communicating with one another to gain intelligence, processors computing their current estimated action-value function, processors managing conflicting actions with one another (e.g., by choosing the actions that maximize reward), robotic chassis executing actions, processors observing their respective new state and assigning a reward, and processors updating their action-value function.

In some embodiments, managing conflicting actions includes processors selecting a conflict-free action vector, processors creating a sorted list where mobile robotic chassis are ordered based on their maximum potential gain in reward, and processors iterating through the list and choosing, for each robotic chassis, the action that maximizes its individual reward. In some embodiments, processors manage conflicting actions by negotiating with their respective current estimated action-value function. In embodiments wherein actions result in conflict (e.g., a robotic wants to move to a location occupied by another robotic intending to remain in the location, actions of two robotic chassis resulting in a frontal crash, etc.), processors attempt to resolve the conflicts without creating new conflicts. In some embodiments, processors individually attempt to optimize their action-value function until there are no processors with larger potential gain in their respective field of view. In some embodiments, processors choose a sequence of actions resulting in greatest reward by considering action-value function of all or a portion of other robotic chassis. In some embodiments, processors determine all allowed action sequences that do not result in conflict for a portion of robotic chassis (e.g., four, six, or ten) within their respective field of view. In some embodiments, processors choose the sequence of actions by, for example, maximizing the combined q-values using $\Sigma_{(i,a_i) \in I} q_i(s_i, a_i)$, wherein $I \in I$ is an allowed action sequence of the set I of all allowed action sequences; minimizing the combined q-value difference of each involved robotic chassis $\Sigma_{(i,a_i),(j,a_j) \in I} q_i(s_i,a_i)-q_j(s_j, a_j)$; or, maximizing the combined weighted q-value $\Sigma_{(i,a_i) \in I} q_i(s_i, a_i)\omega_i$ wherein $\omega_i$ is the weight of robotic chassis i. In some embodiments, processors introduce a level of randomness in choosing actions to execute in order to promote some exploration.

Figure 19A:
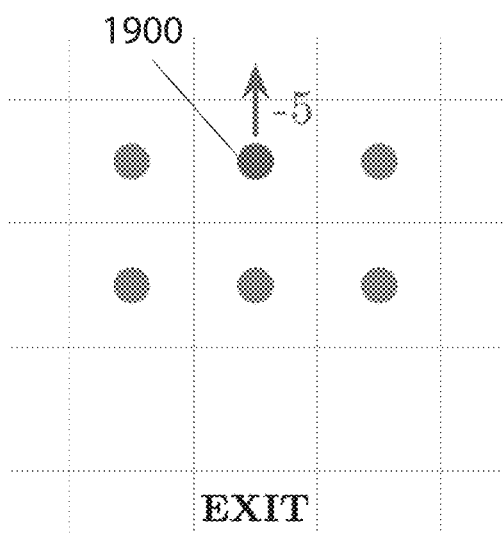
FIGS. 19A-19C illustrate examples of different action sequences of robotic chassis according to some embodiments.
Figure 19B:
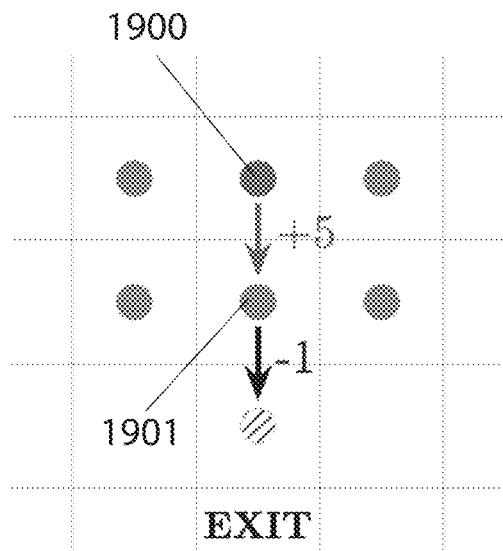
Figure 19C:
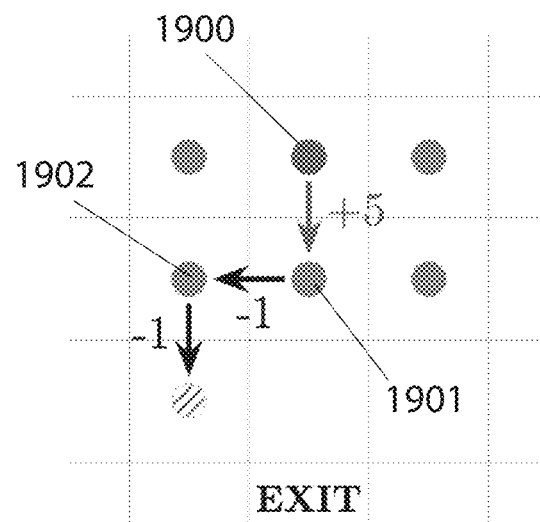

In some embodiments, processors may compute their maximum gain in q-value and list robotic chassis in descending order. In some embodiments, processors iterate, starting at the top of the list and for each robotic chassis the best action sequence may be determined (e.g., no conflict and greatest gain in q-value). For example, FIG. 19 illustrates a simple grid representing a parking area with dots representing autonomous vehicles. FIGS. 19A-19C illustrate different action sequences assuming that mobile robotic chassis 1900 wants to exit. In FIG. 19A mobile robotic chassis 1900 does not negotiate with other robotic chassis and only has the option of moving away, which decreases the reward by a certain value, for illustrative purposes, 5 (time and driving penalty), resulting in an overall reward of −5 for the action sequence. In FIG. 19B robotic chassis 1900 negotiates with other robotic chassis and moves towards the exit, increasing its reward by 5. However, for mobile robotic chassis 1900 to move, robotic chassis 1901 must move, decreasing its reward by 1 (only driving penalty). The overall reward of the action sequence is therefore 4, higher than the previous case. In FIG. 19C, robotic chassis 1900 moves towards the exit, increasing its reward by 5. However, for mobile robotic chassis 1900 to move, robotic chassis 1901 must move, decreasing its reward by 1 (only driving penalty). For robotic chassis 1901 to move, robotic chassis 1902 must also move, also decreasing its reward by 1. Therefore, the overall reward of the action sequence is 3, lower than the previous case but higher than the first case.

The processors negotiate and choose the best valued sequence of actions involving up to four cars. In this particular example, the action sequence illustrated in FIG. 19B is chosen. In some embodiments, processors only consider a portion of possible sequence actions and choose the first sequence action that results in a reward above a predetermined threshold. In some embodiments, the processors only save the action vector executed while discarding other action sequence combinations considered.

In some embodiments, processors represent the parking area using a logical matrix, wherein each entry corresponds with a location within the map of the parking area. A matrix element with a value of '1' indicates obstacles, while an element with a value of '0' indicates an empty space. Each grid cell may be identified as a two-dimensional coordinate. In some embodiments, robotic chassis only occupy a single grid cell and have five possible actions: up, down, left, right, and idle. In some embodiments, each time step may include: processors computing their action-values given their respective observation $o_n$ of state $s_n$ to find most optimal action; collaborating to manage conflicts if they occur by choosing the strategy that maximizes the overall reward of all robotic chassis; executing chosen actions; and, observing new local observations $o_{n+1}$ of new states $s_{n+1}$ and receiving individual rewards $r_{n+1}$. In some embodiments, processors compute an action-value table where for each possible action the estimated q-value may be determined in order to determine most optimal action. In some embodiments, processors compute the value of a state of a robotic chassis by determining the minimum distance to an exit and taking the negative of it. In some embodiments, processors multiply the reward by a predetermined value for robotic chassis attempting to exit the parking area in order to give them higher priority (i.e. placed higher in the ordered list, as described above) in the negotiation phase. In some embodiments, processors use more complex functions for calculating the value of a state, such as functions considering additional variables (e.g., time to exit, number of actions to exit, privacy of location, traffic of location, distance to obstacles, proximity to entry/exit points, etc.). For example, processors use a q-function that considers the distance to exit, privacy of a location, and proximity to entry/exit points. For a robotic chassis attempting to exit the processor uses the q-function $q_{out}=5(q_{distance}-0.25q_{privacy})$ and for a robotic chassis parked the q-function $q_{in}=q_{privacy}-00.1q_{distance}+$entry/exit penalty. For a robotic chassis attempting to exit, the distance to exit is more important than the privacy of the location, while the opposite is true for a parked robotic chassis. A parked robotic chassis may additionally be penalized for proximity to entry/exit points in order to reduce likelihood of parked robotic chassis blocking them. The q-value of a robotic chassis attempting to exit is multiplied by five to provide priority to robotic chassis attempting to exit. In some embodiments, processors compute probability to exit in the next step ($p_i$) (i.e., probability to get instruction to exit the parking area). In some embodiments, processors implement the probability to exit in computing q-values wherein the q-function is computed as a linear combination $q_{comb}^{(i)}=p^{(i)}q_{out}+(1-p^{(i)})q_{in}$.

In some embodiments, processors use stochastic gradient ascent to choose the best actions to execute where a combined q-value is computed by linearly combining n different q-tables $q_i$ corresponding with different parameters considered (e.g., distance to exit, privacy of locations, distance to entry, density of surrounding area, etc.) using $$q_{comb}(\vec{\omega}) = \sum\nolimits_{i=1}^{n} \omega_i q_i.$$

Processors may learn a mapping F from state s to these n parameters maximizing individual reward wherein $\vec{\omega}=F(s)$ such that $\vec{\omega}=\text{argmax}_{\omega} G(q_{comb}(\omega),s)$. $G(q_{comb}(\omega),s)$ is the return when in state s and following policy implied by $q_{comb}(\omega)$. In embodiments, processors attempt to find the best fit using $\hat{\omega}=\text{argmin}_{\omega}\Sigma_s\|V(s)-q_{comb}(s,\omega)\|^2$, wherein V(s) is the state value function, then update ω slightly in direction of $\hat{\omega}$. In some embodiments, processors may use q-learning to choose the best possible action. Processors being with preset q-values for exiting robotic chassis $q_{out}$ and parked robotic chassis $q_{in}$. With each step, the processors update their respective current action-value function $q(s_n)=(1-\alpha)q(s_n)+a(q(s_{n+1})+r_{n+1})$. In some embodiments, q-tables are updated in real time. In some embodiments, processors account for current experience in the q-function by adding $q_{current}$ to the calculated q-value. In some embodiments, processors decay $q_{current}$ to provide dynamic behaviour. For example, in each time step processors decay $q_{current}$ by $(1-\alpha)$, $\alpha<<0$ or if another robotic chassis moves into position s, the particular position is discouraged by subtracting a factor β, β>0 from $q_{current}$.

Figure 20A:
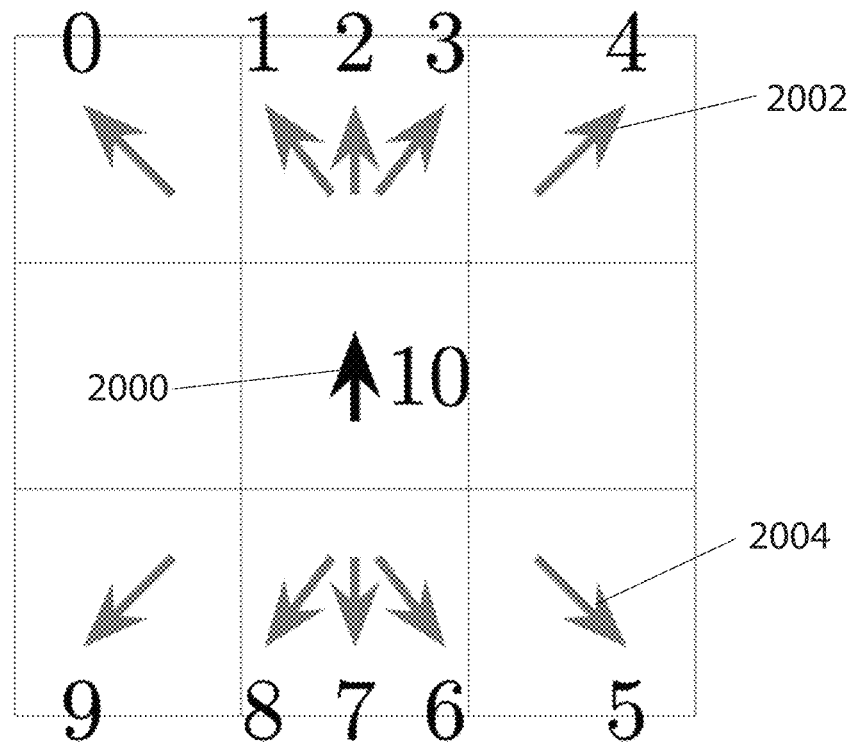
FIGS. 20A and 20B illustrate possible actions of a robotic chassis in a parking area according to some embodiments.
Figure 20B:
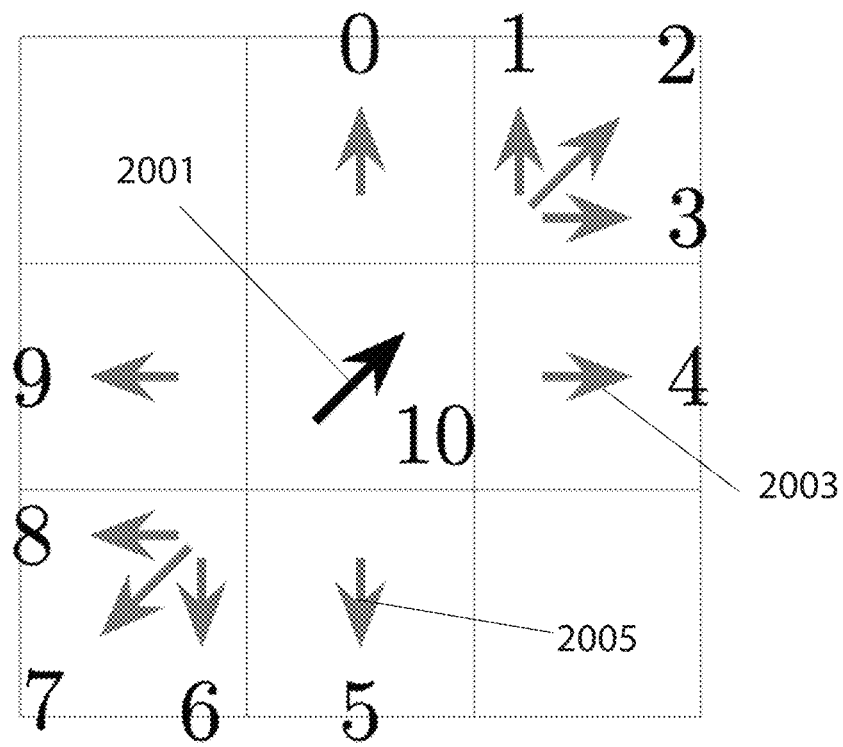

In some embodiments, processors of robotic chassis use higher resolution grids to represent the parking area, where vehicles occupy more than a single grid cell. In some embodiments, processors consider various possible actions, such as move upward, upward-right, right, downward-right, downward, downward-left, left, and upward-left. In other embodiments, other possible actions are used. For example, FIGS. 20A and 20B illustrate allowed actions in two starting directions indicated by black arrows 2000 and 2001. Grey arrows 2002 and 2003 numbered 0-4 are actions directed forwards and grey arrows 2004 and 2005 numbered 5-9 are actions directed backwards while black arrows 2000 and 2001 numbered 10 indicate idling.

Figure 21:
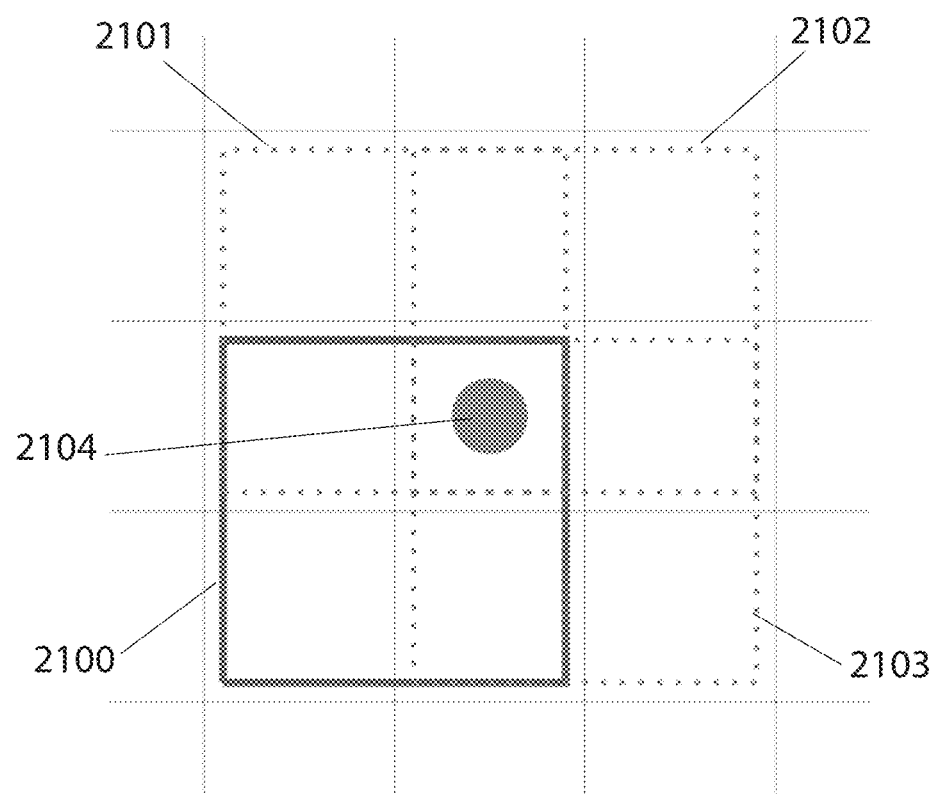
FIG. 21 illustrates four 2-by-2 blocks of a particular parking spot according to some embodiments.

In some embodiments, processors use an event driven approach wherein a mapping based on events is used to map a parking space to a reward value. In some embodiments, processors use the events, enter, exit, and optimize. The event enter describes the robotic chassis entering the parking area and finding the best valued parking spot, finding an efficient route, and driving there. In some embodiments, processors of robotic chassis determine their route using methods such as those described in U.S. patent Ser. Nos. 16/041,286, 15/406,890, 14/673,633, and Ser. No. 16/163,530, the entire contents of which are hereby incorporated by reference. In some embodiments, processors may use an algorithm, such as Dijkstra's algorithm, to determine the most efficient route. In some embodiments, processors determine the best valued parking spot upon entering the parking area based on the distance from entry to the parking spot, distance to exit from the parking spot, and the amount of driving while instructed to remain parked (e.g., due to collaboration). In some embodiments, processors estimate the amount of driving while instructed to remain parked using, for example, $$d_{parked} = \left(\frac{1}{p} - t_{exit} - t_{spot}\right) e_{parked},$$

given an approximation for the expected amount of driving per time step $e_{parked}$ for each parking spot, where p is the exit probability and $t_{exit}$ and $t_{spot}$ refer to the time required to exit from the parking spot and the time to get to the parking spot, respectively. In some embodiments, processors may use Dijkstra's algorithm to estimate distance and times. The event exit describes a robotic chassis getting instruction to exit, finding an efficient exit route, and driving there. In some embodiments, processors used Dijkstra's algorithm to approximate exit time and driving cost. In some embodiments, processors assign edges weights that correspond to the expected driving impact of moving from one space to another (e.g., for an empty space processors use a weight of −1 as only vehicle needs to move one space). If a tile is not empty other robotic chassis must move. An estimate of the weight is adjusted by, for example, subtracting $$\left(\left(\frac{\text{number of robotic chassis}}{\text{number of obstacles}}\right) - 1\right),$$

wherein the maximum is taken over four 2-by-2 cells surrounding the cell corresponding with the parking spot of the robotic chassis. FIG. 21 illustrates an example of four possible 2-by-2 blocks 2100, 2101, 2102, and 2103 of a robotic chassis in parking spot 2104. The event optimize describes processors revaluating their current location and choosing to execute an action based on current known information. In some embodiments, processors of robotic chassis negotiate to determine best actions to execute. In some embodiments, processors use q-learning to adaptively learn parking spot values.

In some embodiments, the processors may represent the parking area and robotic chassis using a graph with nodes connected by edges, the nodes representing parking spots and edges representing a possible path from one parking spot to another. In some embodiments, processors assign nodes additional information (e.g., occupied/unoccupied, entry or exit, etc.). In some embodiments, processors assign edges weights that correspond with the cost of a robotic chassis moving along those edges.

In some embodiments, processors represent the parking area and robotic chassis using a fully continuous model, such as a classical mechanics particle model. In some embodiments, the parking area may be represented as a unit square [0,1]×[0,1] with walls at x=0.1 and y=0.1 with any position within the parking area is indicated by (x, y) coordinates. In some embodiments, each robotic chassis has a position $\vec{x}=(x, y)\in[0,1]\times[0,1]$, velocity $\vec{v}=(v_x, v_y)$ and force acting on the robotic chassis $\vec{f}=(f_x, f_y)$. In some embodiments, processors may update the position, velocity, and force according to Newton's equations of motion. In some embodiments, processors derive the force from a potential function $\vec{f}=-\nabla U(\vec{x})$. The potential function U models an energy surface and the force points in the direction of steepest descent, thus trying to minimize the current energy state. In some embodiments, the processors determine the potential function as the sum over different types of interactions. For example, the potential function for chassis-to-chassis interaction is 1/r, wherein r is the distance between robotic chassis. The function pushes the two robotic chassis away from one another, the effect becoming stronger the closer the chassis are. The potential function for chassis-to-wall interaction is 1/r, wherein r is the distance between the robotic chassis and wall. The function pushes the robotic chassis away from the wall, the effect becoming stronger the closer the chassis is to the wall. The potential function for chassis-to-exit interaction is r, wherein r is the distance between the robotic chassis and the exit. The function constantly pulls the robotic chassis in the direction of the exit. In some embodiments, processors incorporate friction into the computation of using $\vec{f}=-\nabla U(\vec{x})-\gamma\vec{v}$, wherein γ is a friction constant. In some embodiments, processors assign a direction to their respective robotic chassis, are limited to accelerating and steering, and are prohibited from moving in a sideways direction in the above described continuous model for determining most optimal actions to execute. In some embodiments, processors use similar variables as described above to measure performance (e.g., time to exit, distance to exit, privacy of location, etc.).

In some embodiments, the autonomous parking method described above is used for non-autonomous vehicles, wherein autonomous robotic devices transport non-autonomous vehicles and use the same approach described above for autonomous parking of autonomous mobile robotic chassis. In some embodiments, autonomous robotic devices transport non-autonomous vehicles using a towing mechanism such as that described in U.S. Patent Application Nos. 62/626,867 and 62/616,326, the entire contents of which is hereby incorporated by reference. In other embodiments, non-autonomous vehicles are positioned on a platform of the autonomous robotic devices such that they may transport the non-autonomous vehicles. In some embodiments, non-autonomous vehicles drive up a ramp to position the vehicle on the platform and in other embodiments, the platform lowers and the vehicles drives onto the platform. In some embodiments, a lift is place beneath the chassis of the non-autonomous vehicle and raises it for transportation. In other embodiments, a wheel lift is used to transport the non-autonomous vehicle. Other methods of transporting a non-autonomous vehicle are possible. An example of a robotic device with a platform for transportation is described in U.S. patent application Ser. No. 16/127,038, the entire contents of which is hereby incorporated by reference. In some embodiments, non-autonomous vehicles transported by robotic devices and autonomous mobile robotic chassis park within the same parking area.

In some embodiments, all or a portion of the operations described above are applied to different types of autonomous vehicle systems. In some embodiments, all or a portion of the operations executed by the control system managing multiple autonomous vehicles, as described above, are performed by processors of the autonomous vehicles.

In some embodiments, one or more external processing devices compute a portion or all operations described above. In some embodiments, a portion or all information is stored on an external device or in the cloud.

In block diagrams, illustrated components are depicted as discrete functional blocks, but embodiments are not limited to systems in which the functionality described herein is organized as illustrated. The functionality provided by each of the components may be provided by specialized software or specially designed hardware modules that are differently organized than is presently depicted; for example, such software or hardware may be intermingled, conjoined, replicated, broken up, distributed (e.g. within a data center or geographically), or otherwise differently organized. The functionality described herein may be provided by one or more processors of one or more computers executing specialized code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation.

The invention claimed is:
1. A system for robotic collaboration, comprising:
a first robot comprising:
    a chassis;
    a set of wheels;
    a power supply;
    at least one sensor;
    a processor; and
    memory storing instructions that when executed by the processor of the first robot effectuates operations comprising:
        capturing, with the at least one sensor of the first robot, data of an environment of the first robot;
        generating or updating, with the processor of the first robot, a first map of the environment based on at least a portion of the captured data; and
        executing, with the first robot, a first part of a task; wherein the first robot is actuated to execute the first part of the task by a voice command from a user received by a microphone; and
a second robot comprising:
    a chassis;
    a set of wheels;
    a power supply;
    at least one sensor;
    a processor; and
    a memory storing instructions that when executed by the processor of the second robot effectuates operations comprising:
        capturing, with the at least one sensor of the second robot, data of an environment of the second robot; and
        executing, with the second robot, a second part of the task after the first robot completes the first part of the task, the completion of the first part of the task being indicated by a signal received with the processor of the second robot; and
wherein:
    an application of a communication device is paired with the first robot and the second robot;
    the application of the communication device is configured to:
        display at least a battery level of the first robot and the second robot, the first map generated by the processor of the first robot, and obstacle data; and
        receive at least one input designating an instruction for the first robot or the second robot to navigate to a particular area to perform work; and
    the first robot and the second robot provide different services.

2. The system of claim 1, wherein the application of the communication device is further configured to receive at least one input designating a schedule of when the first robot or the second robot are to perform the first part of the task or the second part of the task, respectively.

3. The system of claim 1, wherein the application of the communication device is further configured to receive at least one input designating an instruction for the processor of the first robot to perform the first part of the task and an instruction for the processor of the second robot to perform the second part of the task.

4. The system of claim 1, wherein:
the first robot navigates to a charging station to recharge its power supply during execution of the first part of the task when its power supply level reduces below a predetermined threshold level; or
the second robot navigates to a charging station during execution of the second part of the task when its power supply level reduces below a predetermined threshold level.

5. The system of claim 1, wherein instructions executed by the processor of the second robot effectuates operations further comprising:
generating or updating, with the processor of the second robot, a second map of the environment based on at least a portion of the captured data.

6. The system of claim 1, wherein instructions executed by the processor of the first robot effectuates operations further comprising:
transmitting, with the processor of the first robot, the signal to the processor of the second robot upon completion of the first part of the task, wherein the second robot executes the second part of the task upon receiving the signal transmitted from the processor of the first robot.

7. The system of claim 1, wherein the application of the communication device is further configured to transmit the signal to the processor of the second robot, wherein the second robot executes the second part of the task upon receiving the signal transmitted from the application.

8. The system of claim 1, wherein the application of the communication device is further configured to:
receive at least one input designating a selection, a modification, a deletion, or an addition of a boundary line; a selection of an area of the environment; a name for an area of the environment; a cleaning intensity to be applied within at least one area of the environment; a cleaning frequency to be applied within at least one area of the environment; and a virtual barrier.

9. The system of claim 1, wherein the first robot and the second robot return to a charging station autonomously upon completing their respective part of the task or upon completing a second task.

10. The system of claim 1, wherein instructions executed by the processor of the first robot effectuates operations further comprising:
transmitting, with the processor of the first robot, the first map to the processor of the second robot to use for navigation within the environment.

11. The system of claim 1, wherein the first robot provides vacuum services and the second robot provides mopping services.

12. The system of claim 1, wherein the first robot or the second robot illuminate to provide a notification to a user.

13. The system of claim 1, wherein instructions executed by the processor of the first robot effectuates operations further comprising:
actuating, with the processor of the first robot, the first robot to clean according to a suggested schedule for operating the first robot comprising at least one date and time to a user, wherein:
the application of the communication device is further configured to display the suggested schedule;
the application of the communication device is further configured to receive at least one input designating approval of the suggested schedule; and
the processor of the first robot only actuates the first robot to clean according to the suggested schedule after approval of the suggested schedule.

14. The system of claim 13, wherein the suggested schedule is devised based on at least a plurality of previous days and times the first robot was previously operated.

15. The system of claim 13, wherein the suggested schedule is devised using machine learning.

16. The system of claim 1, wherein at least some processing is executed on the cloud or an external device.

17. The system of claim 1, wherein the processor of the first robot effectuates operations further comprising:
generating, with the processor of the first robot, at least part of a movement path of the first robot, wherein:
the at least the part of the movement path is adjusted in real-time in response to detecting an obstacle positioned on the at least the part of the movement path; and
at least part of the movement path comprises at least a boustrophedon pattern.

18. A method for collaboration between a first robot and a second robot, comprising:
capturing, with at least one sensor of the first robot, data of an environment;
generating or updating, with a processor of the first robot, a first map of the environment based on at least a portion of the captured data;
executing, with the first robot, a first part of a task, wherein the first robot is actuated to execute the first part of the task by a voice command from a user received by a microphone;
capturing, with at least one sensor of the second robot, data of the environment;
executing, with the second robot, a second part of the task after the first robot completes the first part of the task, the completion of the first part of the task being indicated by a signal received with the processor of the second robot;
displaying, with an application of a communication device paired with the first robot and the second robot, at least a battery level of the first robot and the second robot, the first map, and obstacle data; and
receiving, with the application, at least one input designating an instruction for the first robot or the second robot to navigate to a particular area to perform work;
wherein the first robot and the second robot provide differing services.

19. The method of claim 18, wherein:
the first robot navigates to a charging station to recharge its power supply during execution of the first part of the task when its power supply level reduces below a predetermined threshold level or the second robot navigates to a charging station during execution of the second part of the task when its power supply level reduces below a predetermined threshold level;
the first robot provides vacuum services and the second robot provides mopping services;
the first robot or the second robot illuminate to provide a notification to a user; and
the application of the communication device is further configured to:
receive at least one input designating a schedule of when the first robot and the second robot are to perform the task or a second task; an instruction for the first robot and the second robot to begin the task or the second task; a selection, a modification, a deletion, or an addition of a boundary line; a selection of an area of the environment; a name for an area of the environment; a cleaning intensity to be applied within at least one area of the environment; a cleaning frequency to be applied within at least one area of the environment; and a virtual barrier.

20. The method of claim 18, wherein instructions executed by the processor of the first robot effectuates operations further comprising:
   actuating, with the processor of the first robot, the first robot to clean according to a suggested schedule for operating the first robot comprising at least one date and time to a user, wherein:
      the application of the communication device is further configured to display the suggested schedule;
      the application of the communication device is further configured to receive at least one input designating approval of the suggested schedule; and
      the processor of the first robot only actuates the first robot to clean according to the suggested schedule after approval of the suggested schedule; and
   generating, with the processor of the first robot, at least part of a movement path of the first robot,
   wherein:
      the at least the part of the movement path is adjusted in real-time in response to detecting an obstacle positioned on the at least the part of the movement path; and
      at least part of the movement path comprises at least a boustrophedon pattern.

21. The method of claim 20, wherein:
   the suggested schedule is devised based on at least a plurality of previous days and times the first robot was previously operated; and
   the suggested schedule is devised using machine learning.

22. The method of claim 18, wherein:
   instructions executed by the processor of the first robot effectuates operations further comprising:
      transmitting, with the processor of the first robot, the first map to the processor of the second robot to use for navigation within the environment; or
   instructions executed by the processor of the second robot effectuates operations further comprising:
      generating or updating, with the processor of the second robot, a second map of the environment based on at least a portion of the captured data.

23. The method of claim 18, wherein:
   instructions executed by the processor of the first robot effectuates operations further comprising:
      transmitting, with the processor of the first robot, the signal to the processor of the second robot upon completion of the first part of the task, wherein the second robot executes the second part of the task upon receiving the signal transmitted from the processor of the first robot; or
   the application of the communication device is further configured to transmit the signal to the processor of the second robot, wherein the second robot executes the second part of the task upon receiving the signal transmitted from the application.

24. A memory storing instructions that when executed by a processor effectuates collaboration between a first robot and a second robot, the instructions comprising:
   capturing, with at least one sensor of the first robot, data of an environment of the first robot;
   generating or updating, with the processor of the first robot, a first map of the environment based on at least a portion of the captured data; and
   executing, with the first robot, a first part of a task, wherein the first robot is actuated to execute the first part of the task by a voice command from a user received by a microphone;
   wherein:
      a second robot executes a second part of the task after the first robot completes the first part of the task, the completion of the first part of the task being indicated by a signal received with a processor of the second robot;
      an application of a communication device is paired with the first robot and the second robot;
      the application of the communication device is configured to:
         display at least a battery level of the first robot and the second robot, the first map generated by the processor of the first robot, and obstacle data; and
         receive at least one input designating an instruction for the first robot or the second robot to navigate to a particular area to perform work; and
      the first robot and the second robot provide different services.

25. The memory of claim 24, wherein:
   the first robot navigates to a charging station to recharge its power supply during execution of the first part of the task when its power supply level reduces below a predetermined threshold level or the second robot navigates to a charging station during execution of the second part of the task when its power supply level reduces below a predetermined threshold level;
   the first robot provides vacuum services and the second robot provides mopping services;
   the first robot or the second robot illuminate to provide a notification to a user; and
   the application of the communication device is further configured to:
      receive at least one input designating a schedule of when the first robot and the second robot are to perform the task or a second task; an instruction for the first robot and the second robot to begin the task or the second task; a selection, a modification, a deletion, or an addition of a boundary line; a selection of an area of the environment; a name for an area of the environment; a cleaning intensity to be applied within at least one area of the environment; a cleaning frequency to be applied within at least one area of the environment; and a virtual barrier.

26. The memory of claim 24, wherein instructions executed by the processor of the first robot effectuates operations further comprising:
   actuating, with the processor of the first robot, the first robot to clean according to a suggested schedule for operating the first robot comprising at least one date and time to a user, wherein:
      the application of the communication device is further configured to display the suggested schedule;
      the application of the communication device is further configured to receive at least one input designating approval of the suggested schedule; and
      the processor of the first robot only actuates the first robot to clean according to the suggested schedule after approval of the suggested schedule; and
   generating, with the processor of the first robot, at least part of a movement path of the first robot, wherein:
the at least the part of the movement path is adjusted in real-time in response to detecting an obstacle positioned on the at least the part of the movement path; and
at least part of the movement path comprises at least a boustrophedon pattern.

27. The memory of claim 26, wherein:
the suggested schedule is devised based on at least a plurality of previous days and times the first robot was previously operated; and
the suggested schedule is devised using machine learning.

28. The memory of claim 24, wherein:
instructions executed by the processor of the first robot effectuates operations further comprising:
transmitting, with the processor of the first robot, the first map to the processor of the second robot to use for navigation within the environment; or
the processor of the second robot generates or updates a second map of the environment based on at least a portion of the captured data.

29. The memory of claim 24, wherein:
instructions executed by the processor of the first robot effectuates operations further comprising:
transmitting, with the processor of the first robot, the signal to the processor of the second robot upon completion of the first part of the task, wherein the second robot executes the second part of the task upon receiving the signal transmitted from the processor of the first robot; or
the application of the communication device is further configured to transmit the signal to the processor of the second robot, wherein the second robot executes the second part of the task upon receiving the signal transmitted from the application.

* * * * *